(12) United States Patent
Tabata

(10) Patent No.: US 7,092,318 B2
(45) Date of Patent: Aug. 15, 2006

(54) MAGNETO-OPTICAL RECORDING MEDIUM HAVING A PLURALITY OF MAGNETIC LAYERS

(75) Inventor: Masahiro Tabata, Kanagawa-ken (JP)

(73) Assignee: Victor Company of Japan, Limited, Kanagawa-Ken (JP)

(*) Notice: Subject to any disclaimer, the term of this patent is extended or adjusted under 35 U.S.C. 154(b) by 580 days.

(21) Appl. No.: 10/337,297

(22) Filed: Jan. 7, 2003

(65) Prior Publication Data
US 2003/0133366 A1    Jul. 17, 2003

(30) Foreign Application Priority Data
Jan. 11, 2002   (JP) ............................ P2002-004641
Jan. 18, 2002   (JP) ............................ P2002-010436
Oct. 24, 2002   (JP) ............................ P2002-309844

(51) Int. Cl.
G11B 11/00 (2006.01)

(52) U.S. Cl. .............................. 369/13.08; 369/13.42; 428/694 MM

(58) Field of Classification Search ............... None
See application file for complete search history.

(56) References Cited

U.S. PATENT DOCUMENTS

| | | | |
|---|---|---|---|
| 6,265,062 B1 * | 7/2001 | Shiratori ................... | 369/13.06 |
| 6,572,957 B1 * | 6/2003 | Aratani ..................... | 369/13.06 |
| 6,826,131 B1 * | 11/2004 | Kawaguchi et al. ..... | 369/13.07 |
| 2003/0133367 A1 * | 7/2003 | Tabata ..................... | 369/13.47 |

FOREIGN PATENT DOCUMENTS

| | | |
|---|---|---|
| JP | 08-293135 | 11/1996 |
| JP | 10-092031 | 4/1998 |
| JP | 11-86372 | 3/1999 |
| JP | 200-163815 | 6/2000 |

(Continued)

OTHER PUBLICATIONS

Tabata, M., et al., "Stimulation of Wall Motion in Displacement Layer with Reduced Exchange Energy on DWDD Media". J. Magn. Soc., vol. 25, pp. 397-398, published on Nov. 14, 2000.

(Continued)

Primary Examiner—Tan Dinh
(74) Attorney, Agent, or Firm—Nath & Associates PLLC; Gregory B. Kang; Teresa M. Arroyo

(57) ABSTRACT

In a magneto-optical recording medium, a first magnetic layer is made of a material using a Gd—Fe film or a Gd—Fe—Co film as a base so that a magnetic field normalized based on saturation magnetization of a magnetic domain wall driving field can be larger than 1, and an element concentration ratio (at. % ratio) of Gd to Fe or Fe—Co is set in a range of $28.0 \leq Gd \leq 29.0$. A second magnetic layer is made of a material using a Tb—Fe film or a Dy—Fe film as a base, to which a nonmagnetic element such as Al or Cr, and Co are added. A third magnetic layer is made of a material using a Tb—Fe—Co film or a Dy—Fe—Co film as a base, and an element concentration ratio (at. % ratio) of Tb or Dy to Fe—Co is set in a range of $23.5 \leq Tb \leq 25.5$ or $25.5 \leq Dy \leq 28.5$. According to another embodiment, a first magnetic layer is made of a plurality of heavy rare earth and iron family amorphous thin films laminated so that by setting a fixed temperature difference ΔTc as a unit, each Curie temperature can be gradually elevated from a second magnetic layer side.

4 Claims, 31 Drawing Sheets

FOREIGN PATENT DOCUMENTS

| | | |
|---|---|---|
| JP | 2000-187898 | 7/2000 |
| JP | 2000-353344 | 12/2000 |
| JP | 2001-184447 | 7/2001 |
| JP | 2001-184746 | 7/2001 |
| JP | 2002-025136 | 1/2002 |
| JP | 2002-197741 | 7/2002 |
| JP | 2002-208195 | 7/2002 |
| JP | 2002-216401 | 8/2002 |
| JP | 2003-203405 | 7/2003 |
| JP | 2003-272262 | 9/2003 |
| JP | 2003-317335 | 11/2003 |

OTHER PUBLICATIONS

Imamura, N. editor "Ultra High Density Magnetooptical Recording", Tricepts Co. Ltd., pp. 127-144, (May 16, 2000).

* cited by examiner

IRRADIATION DIRECTION
OF LASER BEAM

IRRADIATION DIRECTION
OF LASER BEAM

| Tb CONTENT (at. %) | 23.0 | 23.5 | 24.5 | 25.5 | 26.0 |
|---|---|---|---|---|---|
| NORMALIZED JITTER (%) | 9.82 | 8.05 | 7.76 | 8.17 | 10.03 |

MAGNETO-OPTICAL RECORDING MEDIUM HAVING A PLURALITY OF MAGNETIC LAYERS

BACKGROUND OF THE INVENTION

1. Field of the Invention

The present invention relates to a magneto-optical recording medium for reproducing an information signal while causing a magnetic domain wall movement by laser beam irradiation.

2. Description of the Related Art

A basic principle of a magneto-optical recording system is that a temperature of a ferrimagnetic thin film is locally raised to the vicinity of Curie point or a compensation point, and a coercive force of this portion is reduced to reverse a direction of magnetization toward an externally applied recording magnetic field for an information signal to be recorded. The magnetization reversal portion, i.e., an information bit, forms a magnetic domain and, in magneto-optical recording/reproducing for reading the information bit based on magnetic Kerr effect, in order to Increase a recording density, it is necessary to shorten a recording bit length, that is, to micronize a magnetic domain when the information signal is recorded in the form of the magnetic domain. However, reproducing resolution of the magnetic domain (information signal) is practically decided by a wavelength λ of a laser beam source of an optical reproducing system and a numerical aperture NA of an objective lens, and a spatial frequency 2NA/λ is are producing limit. Accordingly, a conceivable way to increase a recording density is to shorten the wavelength λ of the laser beam source or to reduce a spot diameter of a laser beam in a reproducing device side by using an objective lens of high NA. However, a wavelength of a laser beam source currently at a practical level is only about 640 nm, and the use of the objective lens of high NA results in a shallow focal depth, which requires accuracy of a distance between the objective lens and a magneto-optical recording medium (optical disk or optical card). Consequently, manufacturing accuracy of the magneto-optical recording medium becomes difficult to obtain. Therefore, NA of the objective lens cannot be increased so high, and practical NA of the objective lens is only about 0.6. In other words, there is a limit to the increase of the recording density by the wavelength λ of the laser beam source and the numerical aperture NA of the objective lens.

In connection to this, to solve such problems of the recording density defined by conditions for reproducing, there is a signal reproducing method of a magnetic recording medium for executing reproducing on a magnetic recording medium (magneto-optical recording medium) where a magnetic layer is formed in a 3-layer structure (e.g., see Japanese Patent Laid-Open Hei No. 11(1999)-86372 (p. 4, FIG. 1)). There is also a magnetic recording medium (magneto-optical recording medium) where a magnetic layer is formed in a 4-layer structure (e.g., see Japanese Patent Laid-Open No. 2000-187898 (p. 3 to 4, FIG. 1)).

FIG. 1 is a view for explaining an example of a conventional magneto-optical recording medium: (a) in FIG. 1 schematically shows a layer formation of the magneto-optical recording medium, and (b) in FIG. 1 shows a temperature distribution on the magneto-optical recording medium when the magneto-optical recording medium is irradiated with a laser beam. FIG. 2 is a view for explaining another example of a conventional magneto-optical recording medium: (a) in FIG. 2 schematically shows a layer formation of the magneto-optical recording medium, and (b) in FIG. 2 shows a temperature distribution on the magneto-optical recording medium when the magneto-optical recording medium is irradiated with a laser beam.

The conventional magneto-optical recording medium 110 in the example shown in FIG. 1 is disclosed in the above Japanese Patent Laid-Open No. Hei 11 (1999)-86372. The conventional magneto-optical recording medium 120 in the other example shown in FIG. 2 is disclosed in the above Japanese Patent Laid-Open No. 2000-187898. Here, description is briefly made by referring to the above publications.

First, as shown in FIG. 1, in the conventional magneto-optical recording medium 110 of the example, first to third magnetic layers 111 to 113 are sequentially laminated in a state of exchange coupling at room temperature. The first magnetic layer 111 disposed on a side irradiated with a reproducing laser beam to become a magnetic domain wall displacement layer is made of a magnetic film having a relatively small magnetic domain wall coercive force compared with the third magnetic layer 113 which becomes a recording layer. The second magnetic layer 112 is made of a magnetic layer having Curie temperature lower than those of the first and third magnetic layers 111 and 113.

More specifically, each of the above-described first to third magnetic layers 111 to 113 is made of a rare earth-iron family metal amorphous alloy containing 10 to 40 at. % of one or more types of rare earth metal elements such as Pr, Nd, Sm, Eu, Gd, Tb, Dy, Ho, and Er, and 60 to 90 at. % of one or more types of iron family elements such as Fe, Co, and Ni. It is also described that, to increase a corrosion resistance, a small amount of elements such as Cr, Mn, Cu, Ti, Al, Si, Pt, and in may be added to such an alloy.

In the magneto-optical recording medium 110 constituted in the foregoing manner, by laser beam irradiation from the first magnetic layer 111 side during recording, the information signal is recorded in the third magnetic layer 113 by a not-shown magnetic head to be saved as a magnetization reversal area of an arrow direction (hereinafter, described as a magnetic domain). Furthermore, after the recording, and during non-irradiation with a laser beam, the magnetic domain recorded in the third magnetic layer 113 is exchange-coupled to the first magnetic layer 111 through the second magnetic layer 112. In this case, vertical arrows AS in the first to third magnetic layers 111 to 113 indicate direction of atomic spins. On a boundary of areas where directions of spins are opposite to each other, a magnetic domain wall DW is formed.

Here, if the first magnetic layer 111 is irradiated with a laser beam during reproducing, a medium temperature reaches Curie temperature Ts or higher of the second magnetic layer 112 between shown positions X1 and X2 with respect to the laser beam. Correspondingly, in an area between the positions X1 and X2, because a temperature of the second magnetic layer 112 is raised to Curie temperature Ts or higher, magnetization thereof is lost to cut off the exchange coupling between the first and third magnetic layers 111 and 113. This area is referred to as a decoupling area.

Then, when the magnetic domain wall DW existing in the first magnetic layer 111 enters the decoupling area, this magnetic domain wall DW is moved toward a temperature peak in the first magnetic layer 111 as indicated by an arrow to generate magnetic domain wall movement DWM. Following this magnetic domain wall movement DWM, the magnetic domain exchange-coupled in the first magnetic layer 111 is enlarged by a reproducing laser beam to be read out. On the other hand, since a coercive force (magnetic domain wall coercive force) of the third magnetic layer 113 which becomes a recording layer is sufficiently large, the magnetic domain wall therein is not moved, and a recording state is maintained. Thus, the very small magnetic domain in which reproducing is impossible by normal reproducing resolution is enlarged to execute reproducing, whereby a recording density can be greatly increased.

Then, as shown in FIG. 2, in a conventional magneto-optical recording medium 120 of the other example, magnetic layers are formed by adding one more layer to the magneto-optical recording medium 110 of the foregoing example. Thus, performance is enhanced so that especially by laser beam irradiation, without simultaneous magnetic domain wall movements from the front and rear sides (directions of arrows I1 and I2) of a laser beam moving direction in a temperature elevated area which enables magnetic domain wall movement, only the magnetic domain wall movement from the front side (direction of the arrow I1) of the moving direction can be enlarged and read by a laser beam spot.

In the magneto-optical recording medium 120, first to fourth magnetic layers 121 to 124 are sequentially laminated in a state of exchange coupling at room temperature. The first magnetic layer 121 disposed on a side irradiated with a reproducing laser beam to become a magnetic domain wall displacement layer has a magnetic domain wall coercive force smaller than those of the second to fourth magnetic layers 122 to 124 at room temperature. The second magnetic layer 122 has a magnetic domain wall energy density higher than that of the first magnetic layer 121 at room temperature. The third magnetic layer 113 has Curie temperature set higher than room temperature, but lower than those of the first, second and fourth magnetic layers 121, 122, and 124. The fourth magnetic layer 124 is formed as a recording layer.

More specifically, each of the above-described first to fourth magnetic layers 121 to 124 is made, roughly similar to the first to third magnetic layers 111 to 113 of the magneto-optical recoding medium 110, of a rare earth-iron family metal amorphous alloy containing 10 to 40 at. % of one or more types of rare earth metal elements such as Pr, Nd, Sm, Eu, Gd, Tb, Dy, Ho, and Er, and 60 to 90 at. % of one or more types of iron family elements such as Fe, Co, and Ni. It is also described that, to increase a corrosion resistance, a small amount of elements such as Cr, Mn, Cu, Ti, Al, Si, Pt, and in may be added to such an alloy. Furthermore, it is described that a platinum family metal-iron family metal periodic structure film such as Pt/C, Pd/Co or the like, a platinum family metal-iron family metal alloy film, an antiferromagnetic material such as Co—Ni—O or Fe—Rh based alloy, and a material such as magnetic garnet can be used.

In the magneto-optical recording medium 120 constituted In the foregoing manner, by laser beam irradiation from the first magnetic layer 121 side during recording, an information signal is recorded in the fourth magnetic layer 124 by a not-shown magnetic head to be saved as a magnetic domain of an arrow direction. Furthermore, after the recording, and during non-irradiation with a laser beam, the magnetic domain recorded in the fourth magnetic layer 124 is exchange-coupled to the first magnetic layer 121 through the second and third magnetic layers 122 and 123. In this case, vertical arrows AS in the first to fourth magnetic layers 121 to 124 indicate directions of atomio spins. On a boundary of areas where directions of spins are opposite to each other, a magnetic domain wall DW is formed.

Here, if the first magnetic layer 121 is irradiated with a laser beam during reproducing, a medium temperature reaches Curie temperature Ts or higher of the third magnetic layer 123 between shown positions X1 and X2 with respect to the laser beam. Correspondingly, in an area between the positions X1 and X2, because a temperature of the third magnetic layer 123 is raised to Curie temperature Ts or higher, magnetization thereof is lost to cut off the exchange coupling between the first and second magnetic layers 121 and 122, and the fourth magnetic layer 124. This area is referred to as a decoupling area.

Then, when the magnetic domain wall DW existing in the first and second magnetic layers 121 and 122 enters the decoupling area, this magnetic domain wall DW is moved toward a temperature peak in the first and second magnetic layers 121 and 122 as indicated by an arrow to generate magnetic domain wall movement DWM. Following this magnetic domain wall movement DWM, the magnetic domain exchange-coupled in the first magnetic layer 121 is enlarged by a reproducing laser beam to be read out. On the other hand, since a coercive force (magnetic domain wall coercive force) of the fourth magnetic layer 124 which becomes a recording layer is sufficiently large, the magnetic domain wall therein is not moved, and a recording state is maintained. Thus, the very small magnetic domain in which reproducing is impossible by normal reproducing resolution is enlarged to execute reproducing, whereby a recording density can be greatly increased.

In the Japanese Patent Laid-Open No. 2000-187898, it is described that the magnetic domain wall movement DWM occurs in the first and second magnetic layers 121 and 122. Generally, however, since the second magnetic layer 122 is formed very thin, whether the second magnetic layer 122 functions as a magnetic domain wall displacement layer or as a layer for controlling exchange coupling is not exactly known. Therefore, it may be considered that, during reproducing, a temperature is raised to lose at least magnetization of the third magnetic layer 123 by laser beam irradiation, and magnetic domain wall movement is generated so as to enlarge the magnetic domain exchange-coupled in the first magnetic layer 121.

Incidentally, in each of the conventional magneto-optical recording media 110 and 120 respectively shown in FIG. 1 and FIG. 2, the magnetic domain enlargement reproducing technology by the magnetic domain wall movement DWM is effective for realizing a high-density recording medium, but there is a shift of a reproduced signal on a time axis, i.e., a problem of deteriorated jitter characteristics, which is intrinsic to the magnetic domain wall movement reproducing. To improve the jitter characteristics, a start timing of the magnetic domain wall movement DWM must be set sharp, and time until completion of the magnetic domain wall movement DWM must be shortened.

However, in each film composition of the first to third magnetic layers 111 to 113 and the first to fourth magnetic layers 121 to 124 of the conventional magneto-optical recording media 110 and 120, as described above, each of all the magnetic layers only contains 10 to 40 at. % of one or more types of rare earth metal elements, and 60 to 90 at. % of one or more types of iron family elements such as Fe, Co, and Ni. Based on this, samples were prepared to try an experiment. However, this composition did not lead to any improvements of jitter characteristics during reproducing.

SUMMARY OF THE INVENTION

An object of the present invention is to provide, regarding a magneto-optical recording medium of a 3 magnetic layer structure, and a magneto-optical recording medium of a 4 magnetic layer structure, a high-density magneto-optical recording medium especially capable of clarifying a characteristic change by exchange interaction between a first layer to become a magnetic domain wall displacement layer and a third or fourth magnetic layer to become a recording layer with respect to a composition change of each layer, improving a jitter characteristic more which is one of reproduced signal characteristics in a magnetic domain (recording mark) smaller than 0.1 µm by making strict combination of composition ranges, improving the jitter characteristic more by reducing a stray field leaked from the third or fourth magnetic layer to become a recording layer to the first magnetic layer to become a magnetic domain wall displacement layer in a temperature area for executing reproducing by magnetic domain wall movement, and simultaneously enhancing recoding magnetic field sensitivity.

Another object of the present invention is to provide a magneto-optical recording medium capable of realizing magnetic domain wall movement in a desired track width by controlling magnetic properties of a magnetic domain wall displacement layer (first magnetic layer), enhancing mass productivity, and executing high-density recording/reproducing.

Yet another object of the present invention is to provide a higher-density magneto-optical recording medium capable of improving, even in the case of three or four magnetic layers, reproduced signal quality by making a magnetic domain wall displacement layer (first magnetic layer) multilayer or replacing constituting elements by others to increase an effective magnetic domain wall driving force more.

In order to achieve the foregoing object, there is provided a magneto-optical recording medium comprising: a first magnetic layer; a second magnetic layer; and a third magnetic layer, the first to third magnetic layers being sequentially formed from a side irradiated with a laser beam, an information signal during recording being recorded in a form of a magnetic domain in the third magnetic layer having a magnetization easy axis in a vertical direction by an external magnetic field while the irradiation with the laser beam is executed, then the magnetic domain being switched through the second magnetic layer to be connected to the first magnetic layer and, magnetization of the second magnetic layer being lost by a temperature raised by the irradiation with the laser beam during reproducing, and magnetic domain wall movement being generated to enlarge the magnetic domain formed by the exchange coupling in the first magnetic layer, wherein the first magnetic layer is formed by using a material with a base of a Gd—Fe film or a Gd—Fe—Co film in order to set a normalized magnetic field obtained by normalizing a magnetic domain wall driving field based on saturation magnetization equal to/higher than 1, an element concentration ratio (at. % ratio) of Gd to Fe or Fe—Co is set in a range of $28.0 \leq Gd \leq 29.0$, the second magnetic layer is formed by using a material with a base of a Tb—Fe film or a Dy—Fe film, and adding a nonmagnetic element such as Al or Cr, and Co, the third magnetic layer is formed by using a material with a base of a Tb—Fe—Co film or a Dy—Fe—Co film, an element concentration ratio (at. % ratio) of Tb or Dy to Fe—Co is set in a range of $23.5 \leq Tb \leq 25.5$ or $25.5 \leq Dy \leq 28.5$, and addition amounts of Co and a nonmagnetic element to each magnetic layer are adjusted to set Curie temperatures Tc11, Tc12, and Tc13 of the first, second and third magnetic layers to Tc13>Tc11>Tc12.

According to the present invention, in the magneto-optical recording medium, when the magnetic layers are laminated to form a three-layer structure, especially the first magnetic layer which becomes a magnetic domain wall displacement layer is formed by using the material with a base of the Gd—Fe film or the Gd—Fe—Co film in order to set a normalized magnetic field obtained by normalizing a magnetic domain wall driving field based on saturation magnetization equal to/higher than 1, the element concentration ratio (at. % ratio) of Gd to Fe or Fe—Co is set in the range of $28.0 \leq Gd \leq 29.0$, the third magnetic layer which becomes a recording layer is formed by using the material with a base of the Tb—Fe—Co film or the Dy—Fe—Co film, the element concentration ratio (at. % ratio) of Tb or Dy to Fe—Co is set in the range of $23.5 \leq Tb \leq 25.5$ or $25.5 \leq Dy \leq 28.5$, and Curie temperatures Tc11, Tc12, and Tc13 of the first, second and third magnetic layers are set to Tc13>Tc11>Tc12. Thus, magnetic domain wall movement generated in the first magnetic layer is made faster when irradiation with a laser beam is executed during reproducing, which enables great improvement of a jitter characteristic which is one of reproduced signal characteristics. Therefore, it is possible to provide a higher-density magneto-optical recording medium.

In order to achieve the foregoing object, there is provided a magneto-optical recording medium comprising: a first magnetic layer; a second magnetic layer; a third magnetic layer: and a fourth magnetic layer, the first to fourth magnetic layers being sequentially formed from a side irradiated with a laser beam, an information signal during recording being recorded in a form of a magnetic domain in the fourth magnetic layer having a magnetization easy axis in a vertical direction by an external magnetic field while the irradiation with the laser beam is executed, then the magnetic domain being exchanged through the second and third magnetic layers to be connected to the first magnetic layer and, during reproducing, magnetization of the third magnetic layer being lost by a temperature raised by the irradiation with the laser beam, and magnetic domain wall movement being generated to enlarge the magnetic domain formed by the exchange coupling in the first magnetic layer, wherein the first magnetic layer is formed by using a material with a base of a Gd—Fe film or a Gd—Fe—Co film in order to set a normalized magnetic field obtained by normalizing a magnetic domain wall driving field based on saturation magnetization equal to/higher than 1, an element concentration ratio (at. % ratio) of Gd to Fe or Fe—Co is set in a range of $28.0 \leq Gd \leq 29.0$, each of the second and third magnetic layers is formed by using a material with a base of a Tb—Fe film or a Dy—Fe film, and adding a nonmagnetic element such as Al or Cr, and Co, the fourth magnetic layer is formed by using a material with a base of a Tb—Fe—Co film or a Dy—Fe—Co film, an element concentration ratio (at. % ratio) of Tb or Dy to Fe—Co is set in a range of $23.5 \leq Tb \leq 25.5$ or $25.5 \leq Dy \leq 28.5$, and addition amounts of Co and a nonmagnetic element to each magnetic layer are adjusted to set Curie temperatures Tc21, Tc22, Tc23 and Tc24 of the first, second, third and fourth magnetic layers to Tc24>Tc21>Tc22>Tc23.

According to the present invention, when the magnetic layers are laminated to form a 4-layer structure, especially the first magnetic layer which becomes a magnetic domain wall displacement layer is formed by using the material with a base of the Gd—Fe film or the Gd—Fe—Co film in order to set a normalized magnetic field obtained by normalizing a magnetic domain wall driving field based on saturation magnetization equal to/higher than 1, the element concentration ratio (at. % ratio) of Gd to Fe or Fe—Co is set in a range of $28.0 \leq Gd \leq 29.0$, the fourth magnetic layer which becomes a recording layer is formed by using the material with a base of the Tb—Fe—Co film or the Dy—Fe—Co film, the element concentration ratio (at. % ratio) of Tb or Dy to Fe—Co is set in a range of $23.5 \leq Tb \leq 25.5$ or $25.5 \leq Dy \leq 28.5$, and Curie temperatures Tc21, Tc22, Tc23 and Tc24 of the first, second, third and fourth magnetic layers are set to Tc24>Tc21>Tc22>Tc23. Thus, only magnetic domain wall displacement from the front of the movement direction of the laser beam in a temperature area in which the magnetic domain wall can be moved in the first magnetic layer is made faster when irradiation with a laser beam is executed during reproducing, which enables great improvement of a jitter characteristic which is one of reproduced signal characteristics. Therefore, it is possible to provide a much higher density magneto-optical recording medium.

In order to achieve the foregoing object, there is provided a magneto-optical recording medium comprising: a first magnetic layer; a second magnetic layer; and a third magnetic layer, the first to third magnetic layers being sequentially formed from a side irradiated with a laser beam, an information signal during recording being recorded in a form of a magnetic domain in the third magnetic layer having a magnetization easy axis in a vertical direction by an external magnetic field while the irradiation with the laser beam is executed, then the magnetic domain being exchanged through the second magnetic layer to be connected to the first magnetic layer and, during reproducing, magnetization of the second magnetic layer being lost by a temperature raised by the irradiation with the laser beam, and magnetic domain wall movement being generated to enlarge the magnetic domain formed by the exchange coupling in the first magnetic layer, wherein the first magnetic layer is formed by using a material with a base of a Gd—Fe film or a Gd—Fe—Co film in order to set a normalized magnetic field obtained by normalizing a magnetic domain wall driving field based on saturation magnetization equal to/higher than 1, an element concentration ratio (at. % ratio) of Gd to Fe or Fe—Co is set in a range of $28.0 \leq Gd \leq 29.0$, the second magnetic layer is formed by using a material with a base of a Tb—Fe film or a Dy—Fe film, and adding a nonmagnetic element such as Al or Cr, and Co, the third magnetic layer is made of two films, i.e., a Tb—Fe—Co film and a Gd—Fe—Co film, and anti-parallel coupling is maintained which becomes stable when directions of magnetizations of the two films are opposite to each other in a temperature area in which reproducing is executed by magnetic domain wall displacement in the first magnetic layer.

According to the present invention, when the magnetic layers are laminated to form a 3-layer structure, especially the first magnetic layer which becomes a magnetic domain wall displacement layer is formed by using the material with a base of the Gd—Fe film or the Gd—Fe—Co film in order to set a normalized magnetic field obtained by normalizing a magnetic domain wall driving field based on saturation magnetization equal to/higher than 1, the element concentration ratio (at. % ratio) of Gd to Fe or Fe—Co is set in the range of $28.0 \leq Gd \leq 29.0$, the third magnetic layer is made of two films, i.e., the Tb—Fe—Co film and the Gd—Fe—Co film, and the anti-parallel coupling is maintained which becomes stable when the directions of magnetizations of the two films are opposite to each other in the temperature area in which reproducing is executed by the magnetic domain wall displacement in the first magnetic layer. Thus, stray field leaked from the third magnetic layer which becomes a recording layer to the first magnetic layer which becomes a magnetic domain wall displacement layer is reduced to enable further improvement of a jitter characteristic which is one of reproduced signal characteristics, and simultaneous enhancement of recording magnetic field sensitivity. Therefore, it is possible to provide a much higher density magneto-optical recording medium.

In order to achieve the foregoing object, there is provided a magneto-optical recording medium comprising: a first magnetic layer; a second magnetic layer; a third magnetic layer; and a fourth magnetic layer, the first to fourth magnetic layers being sequentially formed from a side irradiated with a laser beam, an information signal during recording being recorded in a form of a magnetic domain in the fourth magnetic layer having a magnetization easy axis in a vertical direction by an external magnetic field while the irradiation with the laser beam is executed, then the magnetic domain being switched through the second and third magnetic layers to be connected to the first magnetic layer and, magnetization of the third magnetic layer during reproducing being lost by a temperature raised by the irradiation with the laser beam and magnetic domain wall displacement being generated to enlarge the magnetic domain formed by the exchange coupling in the first magnetic layer, wherein the first magnetic layer is formed by using a material with a base of a Gd—Fe film or a Gd—Fe—Co film in order to set a normalized magnetic field obtained by normalizing a magnetic domain wall driving field based on saturation magnetization equal to/higher than 1, an element concentration ratio (at. % ratio) of Gd to Fe or Fe—Co is set in a range of $28.0 \leq Gd \leq 29.0$, each of the second and third magnetic layers is formed by using a material with a base of a Tb—Fe film or a Dy—Fe film, and adding a nonmagnetic element such as Al or Cr, and Co, the fourth magnetic layer is made of two films, i.e., a Tb—Fe—Co film and a Gd—Fe—Co film, and anti-parallel coupling is maintained which becomes stable when directions of magnetizations of the two films are opposite to each other in a temperature area in which reproducing is executed by magnetic domain wall movement in the first layer.

According to the present invention, when the magnetic layers are laminated to form a 4-layer structure, especially the first magnetic layer which becomes a magnetic domain wall displacement layer, is formed by using the material with a base of the Gd—Fe film or the Gd—Fe—Co film in order to set a normalized magnetic field obtained by normalizing a magnetic domain wall driving field based on saturation magnetization equal to/higher than 1, the element concentration ratio (at. % ratio) of Gd to Fe or Fe—Co is set in the range of $28.0 \leq Gd \leq 29.0$, the fourth magnetic layer which becomes a recording layer is made of two films, i.e., the Tb—Fe—Co film and the Gd—Fe—Co film, and the anti-parallel coupling is maintained which becomes stable when the directions of magnetizations of the two films are opposite to each other in the temperature area in which reproducing is executed by the magnetic domain wall displacement in the first layer. Thus, stray field leaked from the fourth magnetic layer which becomes a recording layer to the first magnetic domain wall layer which becomes a magnetic domain wall displacement layer is reduced to enable further improvement of a jitter characteristic which is one of reproduced signal characteristics, and for simultaneous enhancement of recording magnetic field sensitivity.

Therefore, it is possible to provide a much higher density magneto-optical recording medium.

In order to achieve the foregoing object, there is provided a magneto-optical recording medium comprising: a first magnetic layer functioning as a magnetic domain wall displacement layer; a third magnetic layer functioning as a recording layer, the first and third magnetic layers being sequentially laminated on a substrate; and a second magnetic layer inserted between the first and the third magnetic layers to control an exchange interaction for transferring a magnetic domain of the third magnetic layer to the first magnetic layer, wherein the first magnetic layer is made of a plurality of heavy rare earth and iron family metal amorphous thin films laminated to gradually raise each Curie temperature from the second magnetic layer side by using a fixed temperature difference as a unit.

In order to achieve the foregoing object, there is provided a magneto-optical recording medium comprising: a first magnetic layer functioning as a magnetic domain wall displacement layer; a fourth magnetic layer functioning as a recording layer, the first and fourth magnetic layers being sequentially laminated on a substrate; and second and third magnetic layers inserted between the first and the fourth magnetic layers to control an exchange interaction for transferring a magnetic domain of the fourth magnetic layer to the first magnetic layer, wherein the first magnetic layer is made of a plurality of heavy rare earth and iron family metal amorphous thin films laminated to gradually raise each Curie temperature from the second magnetic layer side by using a fixed temperature difference as a unit.

According to the preferred embodiment of the present invention, the plurality heavy rare earth and iron family metal amorphous thin films of the first magnetic layer is a laminated film of 3 to 5 layers different from one another in composition.

According to the preferred embodiment of the present invention, the fixed temperature difference is in a range of 10° C. to 50° C.

According to the preferred embodiment of the present invention, the plurality of heavy rare earth and iron family metal amorphous thin films of the first magnetic layer is a ferrimagnetic perpendicular magnetization film with a base of gadolinium and iron (Gd—Fe) or gadolinium, iron and cobalt (Gd—Fe—Co).

According to the preferred embodiment of the present invention, at least one of the plurality of heavy rare earth and iron family metal amorphous thin films of the first magnetic layer is a heavy rare earth and transition metal amorphous thin film having small exchange energy between rare earth and transition metal.

According to the preferred embodiment of the present invention, at least one of the plurality of heavy rare earth and iron family metal amorphous thin films of the first magnetic layer is one selected from gadolinium iron, cobalt and bismuth (Gd—Fe—Co—Bi), gadolinium, iron, cobalt and tin (Gd—Fe—Co—Sn), and gadolinium, cobalt and nickel (Gd—Co—Ni).

According to the preferred embodiment of the present invention, at least one of the plurality of heavy rare earth and iron family metal amorphous thin films of the first magnetic layer has a composition in which a super heavy rare earth element of a mass number larger than that of terbium (Tb) is added, or a composition in which at least a part of the gadolinium (Gd) of the first magnetic layer is replaced by the super heavy rare earth element.

According to the preferred embodiment of the present invention, Curie temperature of at least one of the plurality of heavy rare earth and iron family metal amorphous thin films of the first magnetic layer is controlled by addition of a nonmagnetic element.

In order to achieve the foregoing object, there is provided a magneto-optical recording medium comprising: a first magnetic layer functioning as a magnetic domain wall displacement layer; a third magnetic layer functioning as a recording layer, the first and third magnetic layers being sequentially laminated on a substrate; and a second magnetic layer inserted between the first and the third magnetic layers to control an exchange interaction for transferring a magnetic domain of the third magnetic layer to the first magnetic layer, wherein the first magnetic layer is made of a heavy rare earth and transition metal amorphous thin film having small exchange energy between rare earth and transition metal.

In order to achieve the foregoing object, there is provided a magneto-optical recording medium comprising: a first magnetic layer functioning as a magnetic domain wall displacement layer; a fourth magnetic layer functioning as a recording layer, the first and fourth magnetic layers being sequentially laminated on a substrate: and second and third magnetic layers inserted between the first and the fourth magnetic layers to control an exchange interaction for transferring a magnetic domain of the fourth magnetic layer to the first magnetic layer, wherein the first magnetic layer is made of a heavy rare earth and transition metal amorphous thin film having small exchange energy between rare earth and transition metal.

According to the preferred embodiment of the present invention, the first magnetic layer is one selected from gadolinium iron, cobalt and bismuth (Gd—Fe—Co—Bi), gadolinium, iron, cobalt and tin (Gd—Fe—Co—Sn), and gadolinium, cobalt and nickel (Gd—Co—Ni).

According to the preferred embodiment of the present invention, the first magnetic layer has a composition in which a superheavy rare earth element of a mass number larger than that of terbium (Tb) is added, or a composition in which at least a part of the gadolinium (Gd) of the first magnetic layer is replaced by the super heavy rare earth element.

According to the preferred embodiment of the present invention, Curie temperature of the heavy rare earth and iron family metal amorphous thin film of the first magnetic layer is controlled by addition of a nonmagnetic element.

The nature, principle and utility of the invention will become more apparent from the following detailed description when read in conjunction with the accompanying drawings.

DESCRIPTION OF THE PREFERRED EMBODIMENTS

Next, detailed description will be made of the preferred embodiments of magneto-optical recording media of the present invention with reference to FIGS. 3 to 39.

Figure 3:
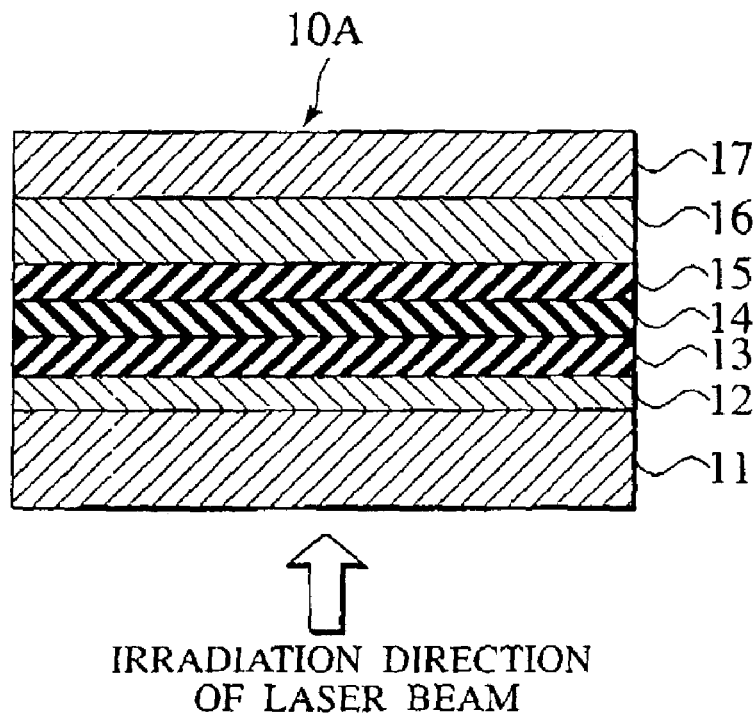
FIG. 3 is a sectional vies schematically showing layer formation of a magneto-optical recording medium according to a first embodiment of the present invention.
Figure 4:
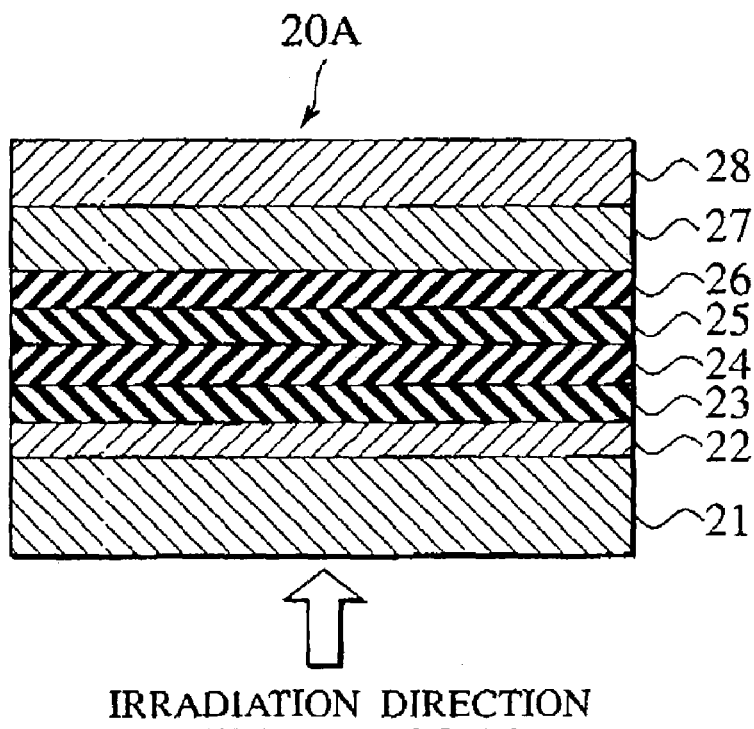
FIG. 4 is a sectional view schematically showing layer formation of a magneto-optical recording medium according to a second embodiment of the present invention.

First, layer formations of magneto-optical recording media of first and second embodiments of the present invention are described by referring to FIGS. 3 and 4.

FIG. 3 is a sectional view schematically showing layer formation of the magneto-optical recording medium of the first embodiment of the invention, and FIG. 4 is a sectional view schematically showing layer formation of the magneto-optical recording medium of the second embodiment of the invention.

In the drawings, identical or similar portions are denoted by identical or similar reference numerals. However, it should be noted that the drawings are schematic, and a relation of a thickness with a planar dimension, a ratio of a thickness of each layer, and the like are different from actual ones. Accordingly, specific thickness and dimensions must be determined based on the following explanation. Needless to say, between the drawings, portions different from each other in dimensional relation or ratio are included.

First Embodiment

Figure 1:
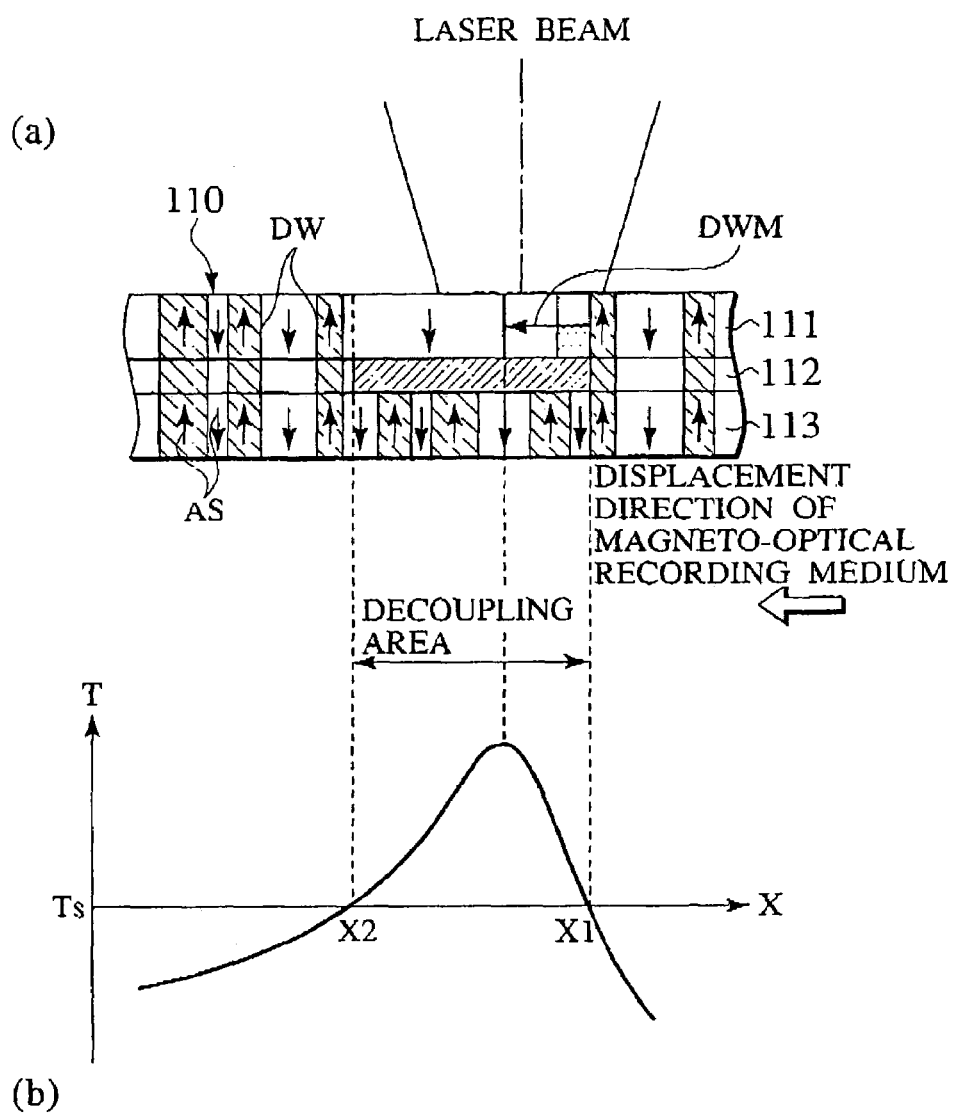
FIG. 1 is a view for explaining an example of a conventional magneto-optical recording medium.

As shown in FIG. 3, as in the case of the magneto-optical recording medium 110 (FIG. 1) of the example described above in the section of the related art, a magneto-optical recording medium 10A of the first embodiment of the present invention is constituted of a 3 magnetic layer structure to generate magnetic domain wall movement similarly to the conventional magneto-optical recording medium 110. However, in the magneto-optical recording medium 10A of the first embodiment of the invention, a composition of each magnetic layer is made stricter than that of the conventional magneto-optical recording medium 110, whereby magnetic domain wall movement is made faster to greatly improve a jitter characteristic which is one of reproduced signal characteristics.

Thus, as in the case of the foregoing conventional magneto-optical recording medium 110 (FIG. 1), the magneto-optical recording medium 10A of the first embodiment of the invention, first, second and third magnetic layers 13, 14 and 15 are sequentially formed from a side irradiated with a laser beam, an information signal is recorded in a form of a magnetic domain in the third magnetic layer 15 having a magnetization easy axis in a vertical direction by an external magnetic field while executing the irradiation with the laser beam during recording, and then the magnetic domain is exchange-coupled to the first magnetic layer 13 through the second magnetic layer 14. During reproducing, because a temperature is raised by the irradiation with the laser beam, magnetization of the second magnetic layer 14 is lost to generate magnetic domain wall movement in such a way as to enlarge the magnetic domain exchange-coupled in the first magnetic layer 13.

That is, the magneto-optical recording medium 10A of the first embodiment of the invention has an outer shape formed as an optical disk having a circular shape or an optical card having a card shape, and is constituted to enable superhigh-density recording/reproducing of an information signal.

In the above-described magneto-optical recording medium 10A of the first embodiment, on a light transmissible substrate 11 formed by using a transparent glass plate, transparent polycarbonate or the like, the first, second and third magnetic layers 13, 14 and 15 are sequentially laminated with a transparent first dielectric layer 12 therebetween which becomes a protective film or a multiple interference layer, for example by continuous sputtering or the like in vacuum, to form a 3 magnetic layer structure. Further, on the third magnetic layer 15, a second dielectric layer 16 made of a nonmagnetic metal film or a dielectric film is formed and, on this second dielectric layer 16, a protective layer 17 made of a UV cured resin or the like is formed when necessary. In this case, irradiation of the magneto-optical recording medium 10A of the first embodiment with a laser beam is executed from the light transmissible substrate 11 side toward the first to third magnetic layers 13 to 15.

Here, in the magneto-optical recording medium 10A of the first embodiment, among the first to third magnetic layers 13 to 15 of the 3-layer structure, the first magnetic layer 13 which becomes a side to be irradiated with the laser beam is a film of small magnetic anisotropy to facilitate movement of a magnetic domain wall by a temperature gradient made by the irradiation with the laser beam, and functions as a magnetic domain wall displacement layer.

The first magnetic layer 13 is formed as an amorphous thin film made of heavy rare earth and iron family metal which becomes a film having an easy magnetization direction in a vertical direction (direction vertical to a film surface), i.e., a so-called perpendicular magnetization film, and a material with a base of a Gd—Fe film or a Gd—Fe—Co film is used. As described later, the film is formed to be treated when a magnetic domain wall displacement operation in the first magnetic layer 13 greatly exceeds Walker breakdown field. Specifically, an element concentration ratio (at. % ratio) of heavy rare earth (Gd) to iron family metal (Fe or Fe—Co) in the first magnetic layer 13 is set in a range of $28.0 \leq Gd \leq 29.0$, whereby the film is formed to set a normalized magnetic field, which is obtained by normalizing a magnetic domain wall driving field based on saturation magnetization, to be larger than 1. The range of this element concentration ratio will be described later. In this case, an addition amount of Co in the first magnetic layer 13 is adjusted and, further, by adding a nonmagnetic element such as Al or Cr, Curie temperature Tc11 of the first magnetic layer 13 is adjusted. For the added nonmagnetic element such as Al or Cr, a relatively low atomic number in a periodic table of the elements is applied.

The second magnetic layer 14 functions as a film for controlling an exchange coupling force when the magnetic domain (recording mark) is transferred from the third magnetic layer 15 to the first magnetic layer 13. This second magnetic layer 14 is also formed as an amorphous thin film made of heavy rare earth and iron family metal which becomes a film having an easy magnetization direction in a vertical direction (direction vertical to a film surface), i.e., a so-called perpendicular magnetization film. A material with a base of a Tb—Fe film or a Dy—Fe film is used, and the film is formed by adding a nonmagnetic element such as Al or Cr and Co to adjust Curie temperature Tc12 of the second magnetic layer 14.

The third magnetic layer 15 needs to be a film having a coercive force enough to stably hold a magnetic domain recorded at room temperature after an information signal is recorded in the form of the magnetic domain (magnetization reversal area) in a film surface having a magnetization easy axis in a vertical direction by an external magnetic field of a not-shown magnetic head or the like while irradiation with a laser beam is executed, and having Curie temperature Tc13 suitable for information signal recording, and functions as a recording layer (memory layer).

This third magnetic layer 15 is also formed as an amorphous thin film made of heavy rare earth and iron family metal which becomes a film having an easy magnetization direction in a vertical direction (direction vertical to a film surface), i.e., a so-called perpendicular magnetization film. A material with a base of a Tb—Fe—Co film or a Dy—Fe—Co film is used, a nonmagnetic element such as Al or Cr is added to adjust Curie temperature Tc13 of the third magnetic layer 15, and an element concentration ratio (at. % ratio) of heavy rare earth (Tb or Dy) to iron family metal (Fe—Co) in the third magnetic layer 15 is set in a range of $23.5 \leq Tb \leq 25.5$ or $25.5 \leq Dy \leq 28.5$. The range of this element concentration ratio will be described later.

For the magneto-optical recording medium 10A of the first embodiment constituted in the foregoing manner, considering a raised temperature state by the laser beam during recording and reproducing, preferably, Curie temperatures Tc11, Tc12, and Tc13 of the first to third magnetic layers 13, 14 and 15 are respectively set near about 530K, about 420K, and about 590K. Here, each of Curie temperatures Tc11, Tc12, and Tc13 of the first to third magnetic layers 13, 14, and 15 can be raised by increasing the addition amount of Co in each magnetic layer. On the other hand, each Curie temperature can be reduced by increasing the addition amount of the nonmagnetic element such as Al or Cr which does not change magnetic properties of each magnetic layer greatly. Accordingly, the addition amount of Co or the nonmagnetic element of each magnetic layer is adjusted to set Curie temperatures Tc11, Tc12, and Tc13 to Tc13>Tc11>Tc12.

Furthermore, preferably, film thicknesses t11, t12, and t13 of the first to third magnetic layers 13, 14, and 15 are respectively set near about 30 nm, about 10 nm, and about 60 to 80 nm.

Second Embodiment

Figure 2:
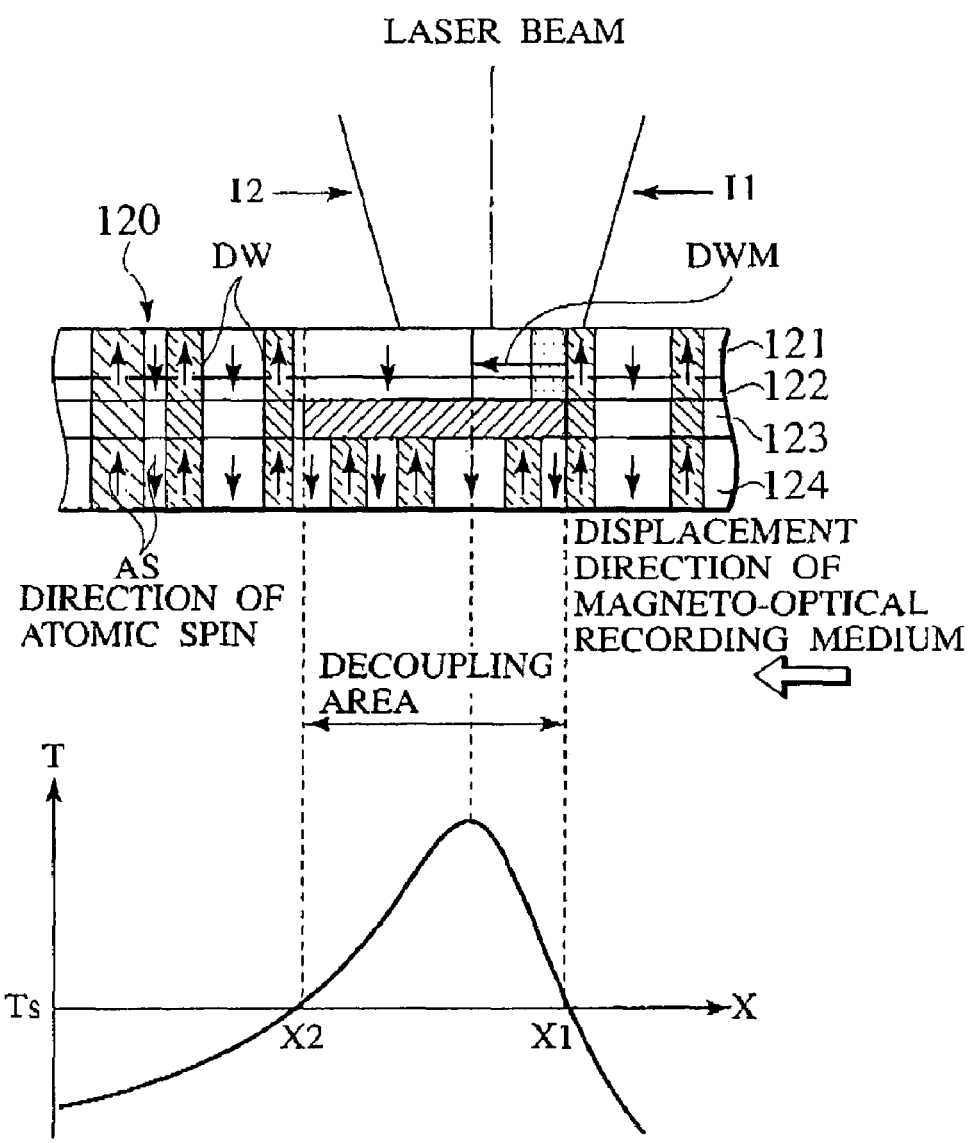
FIG. 2 is a view for explaining another example of a conventional magneto-optical recording medium.

As shown in FIG. 4, as in the case of the magneto-optical recording medium 120 (FIG. 2) of the other example described above in the section of the related art, a magneto-optical recording medium 20A of the second embodiment of the present invention is constituted of a 4 magnetic layer structure to generate magnetic domain wall movement from a front side of a laser beam displacement direction of a temperature elevated area (about 430K to about 490K) which enables magnetic domain wall movement by laser beam irradiation similarly to the conventional magneto-optical recording medium 120. However, in the magneto-optical recording medium 20A of the second embodiment of the invention, a composition of each magnetic layer is made stricter than that of the conventional magneto-optical recording medium 120, whereby magnetic domain wall movement is made faster to greatly improve a jitter characteristic which is one of reproduced signal characteristics.

Thus, as in the case of the foregoing conventional magneto-optical recording medium 120 (FIG. 2), the magneto-optical recording medium 20A of the second embodiment of the invention, first, second, third and fourth magnetic layers 23, 24, 25 and 26 are sequentially formed from a side irradiated with a laser beam, an information signal is recorded in a form of a magnetic domain in the fourth magnetic layer 26 having a magnetization easy axis in a vertical direction by an external magnetic field while executing the irradiation with the laser beam during recording, and then the magnetic domain is exchange-coupled to the first magnetic layer 23 through the second and third magnetic layers 24 and 25. During reproducing, because a temperature is raised by the irradiation with the laser beam, at least magnetization of the third magnetic layer 25 is lost to generate magnetic domain wall movement in such a way as to enlarge the magnetic domain exchange-coupled in the first magnetic layer 23.

That is, the magneto-optical recording medium 20A of the second embodiment of the invention has an outer shape formed as an optical disk having a circular shape or an optical card having a card shape, and is constituted to enable superhigh-density recording/reproducing of an information signal.

In the above-described magneto-optical recording medium 20A of the second embodiment, on a light transmissible substrate 21 formed by using a transparent glass plate, transparent polycarbonate or the like, the first, second, third and fourth magnetic layers 23, 24, 25 and 26 are sequentially laminated with a transparent first dielectric layer 22 therebetween which becomes a protective film or a multiple interference layer, for example by continuous sputtering or the like in vacuum, to form a 4 magnetic layer structure. Furthermore, on the fourth magnetic layer 26, a second dielectric layer 27 made of a nonmagnetic metal film or a dielectric film is formed and, on this second dielectric layer 27, a protective layer 28 made of a UV cured resin or the like is formed when necessary. In this case, irradiation of the magneto-optical recording medium 20A of the second embodiment with a laser beam is executed from the light transmissible substrate 21 side toward the first to fourth magnetic layers 23 to 26.

Here, in the magneto-optical recording medium 20A of the second embodiment, among the first to fourth magnetic layers 23 to 26 of the 4-layer structure, the first magnetic layer 23 which becomes a side to be irradiated with the laser beam is, as in the case of the first magnetic layer 13 formed in the foregoing magneto-optical recording medium 10A of the first embodiment, with a film of small magnetic anisotropy to facilitate movement of a magnetic domain wall by a temperature gradient made by the irradiation with the laser beam, and functions as a magnetic domain wall displacement layer.

The first magnetic layer 23 is formed as an amorphous thin film made of heavy rare earth and iron family metal which becomes a film having an easy magnetization direction in a vertical direction (direction vertical to a film surface). i.e., a so-called perpendicular magnetization film, and a material with a base of a Gd—Fe film or a Gd—Fe—Co film is used. Also in this case, as described later, the film is formed to be treated when a magnetic domain wall displacement operation in the first magnetic layer 23 greatly exceeds Walker breakdown field. Specifically, an element concentration ratio (at. % ratio) of heavy rare earth (Gd) to iron family metal (Fe or Fe—Co) in the first magnetic layer 23 is set in a range of $28.0 \leq Gd \leq 29.0$, whereby the film is formed to set a normalized magnetic field, which is obtained by normalizing a magnetic domain wall driving field based on saturation magnetization, to be larger than a magnetic field 1. The range of this element concentration ratio will be described later. In this case, an addition amount of Co in the first magnetic layer 23 is adjusted and, further, by adding a nonmagnetic element such as Al or Cr, Curie temperature Tc11 of the first magnetic layer 23 is adjusted.

The second and third magnetic layers 24 and 25 are formed to be a double layer different from the second magnetic layer 14 formed in the foregoing magneto-optical recording medium 10A of the first embodiment. Of the second and third magnetic layers 24 and 25, the second magnetic layer 24 is formed to be very thin, whereby the second magnetic layer 24 is provided with a function of generating only magnetic domain wall movement from the front of a displacement direction of the laser beam in a temperature elevated area (about 430K to about 490K) which enables magnetic domain wall movement.

Of the second and third magnetic layers 24 and 25, at least the third magnetic layer 25 functions, if a later-described magnetic domain recorded in the fourth magnetic layer 26 is exchange-coupled to the first magnetic layer 23 through the second and third magnetic layers 24 and 25, as a film whose magnetization is lost because of a temperature raised by laser beam irradiation during reproducing. Each of these second and third magnetic layers 24 and 25 is also formed as an amorphous thin film made of heavy rare earth and iron family metal which becomes a film having an easy magnetization direction in a vertical direction (direction vertical to a film surface). i.e., a so-called perpendicular magnetization film. A material with a base of a Tb—Fe film or a Dy—Fe film is used, and the film is formed by adding a nonmagnetic element such as Al or Cr, and Co to adjust Curie temperatures Tc22 and Tc23 of the second and third magnetic layers 24 and 25.

As in the case of the third magnetic layer 15 formed in the foregoing magneto-optical recording medium 10A of the first embodiment, the fourth magnetic layer 26 needs to be a film having a coercive force enough to stably hold a magnetic domain recorded at room temperature after an information signal is recorded in the form of the magnetic domain (magnetization reversal area) in a film surface having a magnetization easy axis in a vertical direction by an external magnetic field of a not-shown magnetic head or the like while irradiation with a laser beam is executed during recording, and Curie temperature Tc24 suitable for information signal recording, and functions as a recording layer (memory layer).

This fourth magnetic layer 26 is also formed as an amorphous thin film made of heavy rare earth and iron family metal which becomes a film having an easy magnetization direction in a vertical direction (direction vertical to a film surface), i.e., a so-called perpendicular magnetization film. A material with a base of a Tb—Fe—Co film or a Dy—Fe—Co film is used, a nonmagnetic element such as Al or Cr is added to adjust Curie temperature Tc24 of the fourth magnetic layer 26, and an element concentration ratio (at. % ratio) of heavy rare earth (Tb or Dy) to iron family metal (Fe—Co) in the fourth magnetic layer 26 is set in a range of 23.5≦Tb≦25.5 or 25.5≦Dy≦28.5. The range of this element concentration ratio will be described later.

For the magneto-optical recording medium 20A of the second embodiment constituted in the foregoing manner, considering a raised temperature state by the laser beam during recording and reproducing, preferably, Curie temperatures Tc21, Tc22, Tc23 and Tc24 of the first to fourth magnetic layers 23, 24, 25 and 26 are respectively set near about 530K, about 430K, about 420K, and about 590K. Here, each of Curie temperatures Tc21, Tc22, Tc23, and Tc24 of the first to fourth magnetic layers 23, 24, 25, and 26 can be raised by increasing the addition amount of Co in each magnetic layer. On the other hand, each Curie temperature can be reduced by increasing the addition amount of the nonmagnetic element such as Al or Cr which does not change magnetic properties of each layer greatly. Accordingly, the addition amount of Co or the nonmagnetic element of each magnetic layer is adjusted to set Curie temperatures Tc21, Tc22, Tc23, and Tc24 to Tc24>Tc21>Tc22>Tc23.

Furthermore, preferably, film thicknesses t21, t22, t23 and t24 of the first to fourth magnetic layers 23, 24 25, and 26 are respectively set near about 30 nm, about 5 to 15 nm, about 10 nm, and about 60 to 80 nm.

Now, detailed description will be made of magnetic domain wall movement of the first magnetic layer 13 or 23 in the magneto-optical recording medium 10A or 20A of the first or second embodiment of the invention.

Figure 5:
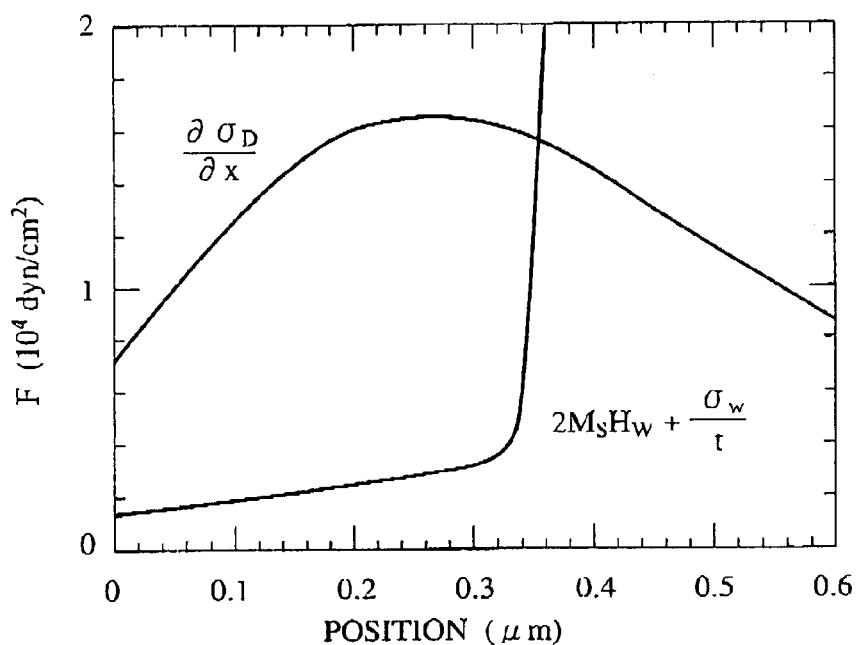
FIG. 5 is a view for explaining magnetic domain wall movement of a first magnetic layer (magnetic domain wall displacement layer) in the magneto-optical recording medium of each of the first and second embodiments of the invention.

FIG. 5 is a view for explaining magnetic domain wall movement of the first magnetic layer (magnetic domain wall displacement layer) in the magneto-optical recording medium of the first or second embodiment of the invention.

In each of the magneto-optical recording media 10A and 20A of the first and second embodiments of the invention, as described above, for the first magnetic layer 13 or 23, the material with a base of the Gd—Fe film or the Gd—Fe—Co film is used, and the element concentration ratio (at. % ratio) of Gd to Fe or Fe—Co is set in the range of 28.0≦Gd≦29.0. For the third or fourth magnetic layer 15 or 26, the material with a base of the Tb—Fe—Co film or the Dy—Fe—Co film is used, and the element concentration ratio (at. % ratio) of Tb or Dy to Fe—Co is set in the range of 23.5≦Tb≦25.5 or 25.5≦Dy≦28.5. Thus, the films can be treated considering that Walker breakdown field, described later, is greatly exceeded. Thus, the magnetic domain wall movement can be made faster to greatly improve a jitter characteristic which is one of reproduced signal characteristics.

Hereinafter, a calculation result based on a theory of micromagnetics, and an experiment result for verification thereof are shown to describe effectiveness of the present invention. The theoretical calculation is executed by molecular field approximation. Temperature characteristics of each magnetic layer of the foregoing example are actually measured, and a calculation curve is fitted on a value thereof to decide a parameter to be used for calculation. A magnetic domain wall displacement velocity is calculated by solving Landau-Lifshitz-Gilbert equation of a ferrimagnetic material to a single magnetic domain structure.

Generally, in the magneto-optical recording medium, magnetic domain wall movement of the first magnetic layer (magnetic domain wall displacement layer) 13 or 23 is started when a relation of the following equation (1) is established.

$$\frac{\partial \sigma_D}{\partial x} > 2M_s H_w + \frac{\sigma_w}{t} \quad (1)$$

In the equation (1), $\sigma_D$ denotes magnetic domain magnetic domain wall energy, $\sigma_W$ denotes interface magnetic domain wall energy by exchange coupling between the magnetic domain wall displacement layer (first magnetic layer) and the recording layer (third or fourth magnetic layer), x denotes a position coordinate of a track direction. $M_s$, $H_w$, and t denote magnetization, a magnetic domain wall coercive force, and a film thickness of the magnetic domain wall displacement layer, respectively. A left side of the equation (1) indicates a driving force of magnetic domain wall movement, and a right side thereof indicates a force for blocking the magnetic domain wall movement. In a separated state of the left and right sides of the equation (1) and in a case shown in FIG. 5, magnetic domain wall movement is started from a point of intersection between curve characteristics of the left and right sides toward a shown left side (position 0 side).

The characteristic curves shown in FIG. 5 are results in the magneto-optical recording media 10A and 20A of the first and second embodiments of the invention. An abscissa shown in FIG. 5 is a position coordinate where a spot center of a reproducing laser beam is an origin 0, and a traveling direction of the reproducing laser beam is positive. An ordinate indicates a driving force of magnetic domain wall movement and a blocking force of the magnetic domain wall movement.

Here, to take a magnetic domain wall displacement velocity into consideration, Landau-Lifshitz-Gilbert (LLG) equation must be applied. The magnetic domain wall movement is realized by continuous magnetization reversal. However, since magnetic moment is obtained as a sum of magnetism of an electron orbit and an electron spin, and accompanied by angular momentum, in a reverse operation thereof, Larmor precession (motion where axis direction of the magnetic moment is changed) occurs. Thus, introduction of a gyromagnetic ratio necessitates the LLG equation which explains this dynamic magnetization mechanism. Furthermore, the magnetic domain wall is moved while maintaining its structure if a driving field of the magnetic domain wall is small. If a driving field of the magnetic domain wall becomes larger, the magnetic domain wall is moved while its structure itself is changed. In the former case (the driving field of the magnetic domain wall is small), a magnetic domain wall displacement velocity is substantially proportional to the driving field. In the latter case (the driving field of the magnetic domain wall is large), the magnetic domain wall displacement velocity exhibits a complex behavior with respect to the driving field, and a boundary between the former and the latter is called Walker breakdown field.

Here, magnetic domain wall displacement velocities V in the magneto-optical recording media 10A and 20A of the invention can both be treated with the assumption that Walker breakdown field is greatly exceeded. Thus, displacement velocities can be obtained by the following equations (2) and (3), and of the equations (2) and (3), the magnetic domain wall displacement velocity V obtained by the equation (2) is a main.

$$1 < h, 1/\alpha_{eff} \ll h : V = \frac{\alpha_{eff}}{1+\alpha_{eff}^2} \gamma_{eff} \Delta_0 H \quad (2)$$

$$h < 1 : V = \frac{\gamma_{eff}}{\alpha_{eff}} \Delta_0 H \quad (3)$$

K: effective anisotropic constant $M_s$: saturation magnetization h: normalized magnetic field; $h=H/(2\pi M_s \alpha_{eff})$ $\alpha_{eff}$: Gilbert damping factor $\gamma_{eff}$: gyromagnetic ratio $\Delta_0$: magnetic domain wall width parameter; $\Delta_0 = \sqrt{A/K}$ A: exchange stiffness constant H: magnetic domain wall driving field V: magnetic domain wall displacement velocity In each of the above-described equations (2) and (3), the magnetic domain wall driving field H is normalized by a constant $2\pi$, saturation magnetization $M_s$, and Gilbert damping constant $\alpha_{eff}$, a magnetic domain wall displacement velocity V is obtained in accordance with whether a normalized magnetic field h satisfies 1<h or h<1. When this normalized magnetic field h becomes larger than 1, the magnetic domain wall displacement velocity V obtained by the equation (2) is considered to be a main magnetic domain wall displacement velocity in the magneto-optical recording media 10A and 20A of the invention.

Phenomena above and below the Walker breakdown field are caused by a difference in temperature characteristics of magnetization of the magnetic domain wall displacement layer. Because of the characteristic difference, actual magnetic domain wall movement is realized in the former case when the normalized magnetic field satisfies 1<h, and in the latter case when the normalized magnetic field satisfies h>1.

Here, Gilbert damping constant $\alpha_{eff}$ can be represented by the following equation (4) using Landau-Lifshitz loss constant $\lambda_{eff}$.

$$\alpha_{eff} = \frac{\lambda_{eff}}{\gamma_{eff} M_s} \quad (4)$$

$\lambda_{eff}$: Landau-Lifshitz loss constant

In this approximate calculation, $\lambda_{eff}/\gamma_{eff}$=roughly 10 (emu/cm$^3$). The magnetic domain wall driving field H is represented by the following equation (5) in the magnetic domain wall displacement layer of a small magnetic domain wall coercive force.

$$H = \frac{1}{2M_s} \frac{\partial \sigma_D}{\partial x} \quad (5)$$

Therefore, under an effective anisotropic constant $K \gg 2\pi M_s^2$, from the equations (4) and (5), the equation (2) can be modified to the following equation (6).

$$V = \frac{\lambda_{eff}}{M_s^2 + \frac{\lambda_{eff}^2}{\gamma_{eff}^2}} \Delta_0 \frac{1}{2} \frac{\partial \sigma_D}{\partial x} \quad (6)$$

From the equation (6), it can be understood that if the saturation magnetization $M_s$ is reduced to move the magnetic domain wall by a magnetic field much larger than Walker breakdown field, a magnetic domain wall displacement velocity will be at its fastest when saturation magnetization $M_s$=0. In other words, this feature means that shifted from the saturation magnetization $M_s$=0, a magnetic domain wall displacement velocity becomes slower. Thus, saturation magnetization of a temperature range in which the magnetic domain wall movement is realized greatly depends on a heavy rare earth element content of the magnetic domain wall displacement layer as a ferrimagnetic material, and in order to realize good magnetic domain wall movement, a composition of the heavy rare earth (Gd) element of the magnetic domain wall displacement layer must be strictly controlled. Thus, time until completion of magnetic domain wall movement was calculated based on a calculation result of the magnetic domain wall displacement velocity, and composition dependence of the magnetic domain wall displacement layer was examined.

Figure 6:
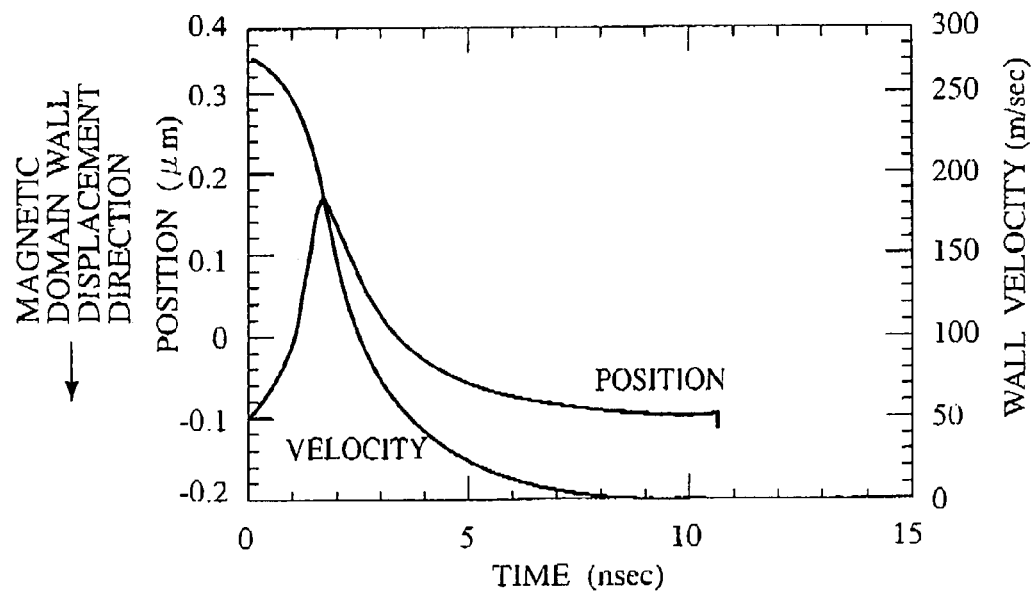
FIG. 6 is a plot of changes of a displacement velocity and a position of the magnetic domain wall in the first magnetic layer (magnetic domain wall displacement layer) with respect to time in the magneto-optical recoding medium of the invention.

FIG. 6 shows a plot of changes of a magnetic domain wall displacement velocity and a magnetic domain wall position in the first magnetic layer (magnetic domain wall displacement layer) with respect to time in the magneto-optical recording medium of the invention.

In FIG. 6, a position of an ordinate is a position coordinate of a track direction where a spot center of a reproducing laser beam is an origin 0, and a traveling direction of the reproducing laser beam is positive. Here, an element concentration ratio of head rare earth (Gd) contained in the first magnetic layer 13 or 23 which becomes a magnetic domain wall displacement layer to iron family metal (Fe or Fe—Co) is 28.5 at. %. A result shows that magnetic domain wall movement for enlarging and reproducing the magnetic domain (recording mark) is completed slightly rearward from the center of the reproducing laser beam (beam traveling direction is a front side). If the magnetic domain wall movement stops in the midway or takes long time to complete the movement, reproduced signal quality of magnetic domain wall movement is lost.

Figure 7:
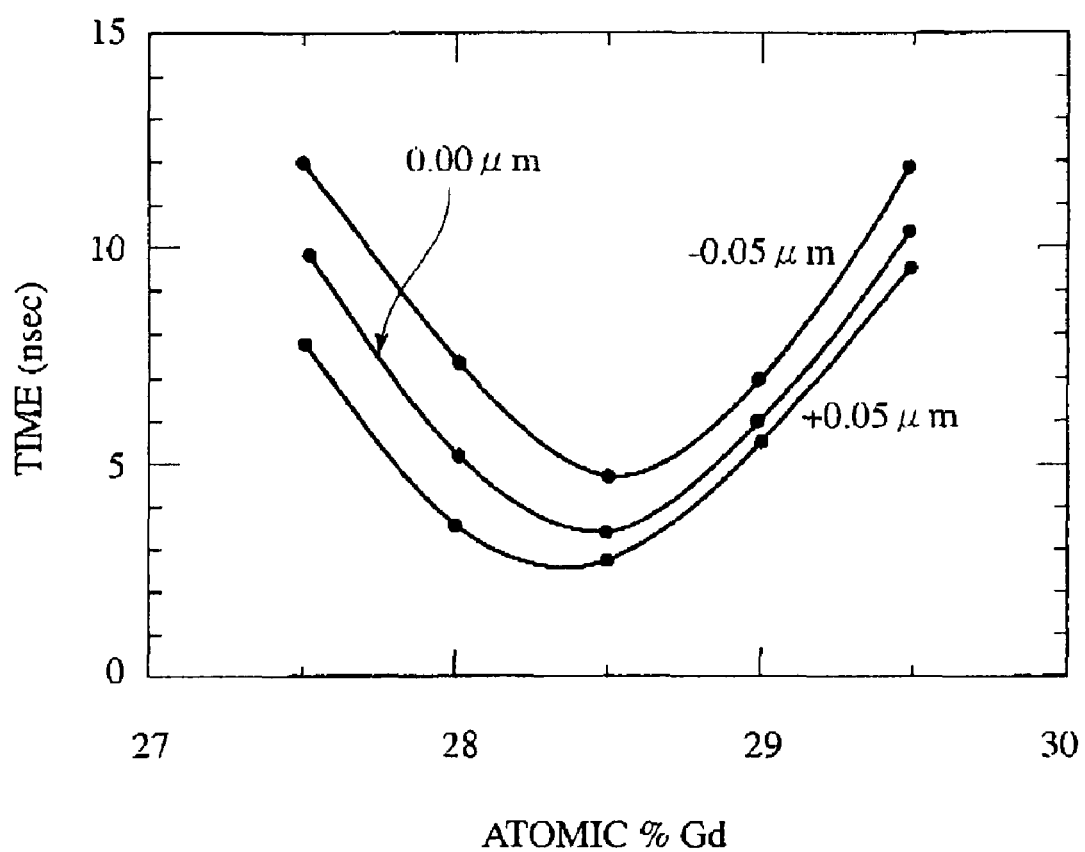
FIG. 7 is a view showing a result of plotting a change of time necessary for the displacement of the magnetic domain wall to reach the vicinity of a center of a reproducing laser beam (−0.05 μm, 0.00 μm, and +0.05 μm) with respect to a composition of heavy rare earth (Gd) contained in the first magnetic layer (magnetic domain wall displacement layer) in the magneto-optical recording medium of the invention.

FIG. 7 shows a result of plotting a change of time necessary for the displacement of the magnetic domain wall to reach the vicinity of the center of the reproducing laser beam(−0.05 μm, 0.00 μm, +0.05 μm) with respect to a composition of the heavy rare earth (Gd) in the first magnetic layer (magnetic domain wall displacement layer) in the magneto-optical recording medium of the invention.

As shown in FIG. 7, it can be understood that time necessary to complete magnetic domain wall movement in the first magnetic layer 13 or 23 which becomes a magnetic domain wall displacement layer greatly fluctuates with respect to a change of the composition of the heavy rare earth (Gd). From this result, preferably, an element concentration ratio (at. % ratio) of heavy rare earth (Gd) in the first magnetic layer 13 or 23 which becomes a magnetic domain wall displacement layer to iron family metal (Fe—Co) should be set in a range of $28.0 \leq Gd \leq 29.0$.

On the other hand, in each of the magneto-optical recording media 10A and 20A of the invention, in the magnetic domain wall movement in a magnetic domain wall driving field greatly exceeding Walker breakdown field, as described above, more complex behavior is exhibited as the magnetic domain wall driving field becomes larger. Therefore, to smoothly execute the magnetic domain wall movement, it is necessary to take into consideration a stray field which blocks the movement. In the vicinity of a magnetic domain wall movement starting position, since a temperature of a traveling direction forward area of the magnetic domain wall is high, and magnetization of the magnetic domain wall movement area becomes smaller compared with other areas, a stray field is large in a magnetic domain to be enlarged. As magnetostatic energy is reduced to be stabilized in a magnetic domain wall formed in an area of large magnetization, a stray field has a function of blocking the magnetic domain wall movement. On the other hand, in the vicinity of a magnetic domain wall movement completion position, since a repulsive force from a magnetic domain wall of a magnetic domain of a former signal becomes larger in proportion to the stray field, if the stray field is large, a range of magnetic domain wall movement is limited to reduce S/N of a reproduced signal. According to the invention, the composition of the heavy rare earth (Gd) element in the first magnetic layer 13 or 23 which becomes a magnetic domain wall displacement layer is set in the above-described range, and saturation magnetization of the magnetic domain wall displacement layer in a temperature elevated area (about 430K to about 490K) which causes magnetic domain wall movement is extremely small. Thus, there may be almost no stray field effects from the magnetic domain wall displacement layer, but it is necessary to take into consideration stray field effects from the third or fourth magnetic layer 15 or 26 which becomes a recording layer.

Therefore, in the magneto-optical recording media 10A and 20A of the first and second embodiments according to the invention, to solve the above-described problem, studies were conducted to improve the third or fourth magnetic layer 15 or 26 which becomes a recording layer as follows.

Hereinafter, description is made of the third or fourth magnetic layer 15 or 26 in the magneto-optical recording medium 10A or 20A of the first or second embodiment of the invention by referring to FIGS. 8 to 12.

Figure 8:
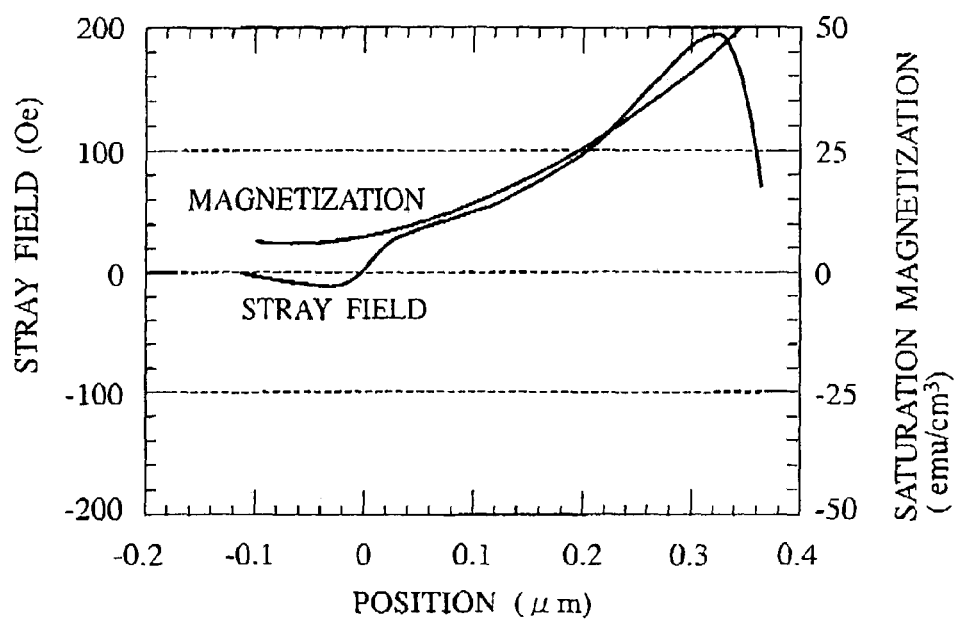
FIG. 8 is a view showing a change of a stray field when an element concentration ratio of heavy rare earth (Tb) to iron family metal (Fe—Co) contained in a third magnetic layer 15 or a fourth magnetic layer 26 is 27.5 at. % in the magneto-optical recording medium of each of the first and second embodiments of the invention.
Figure 9:
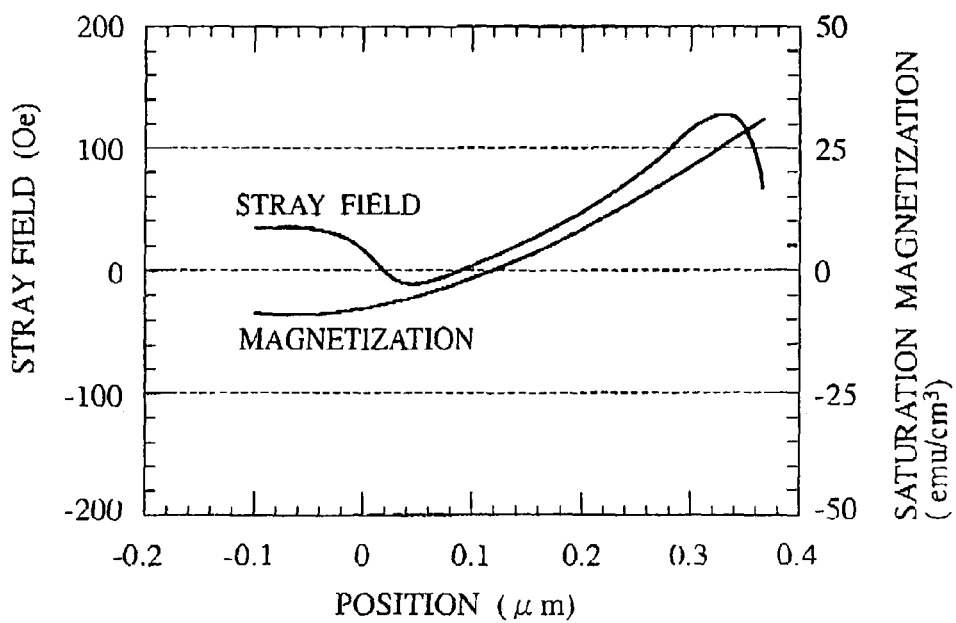
FIG. 9 is a view similarly showing a change of the stray field when an element concentration ratio is 26.5 at. %.
Figure 10:
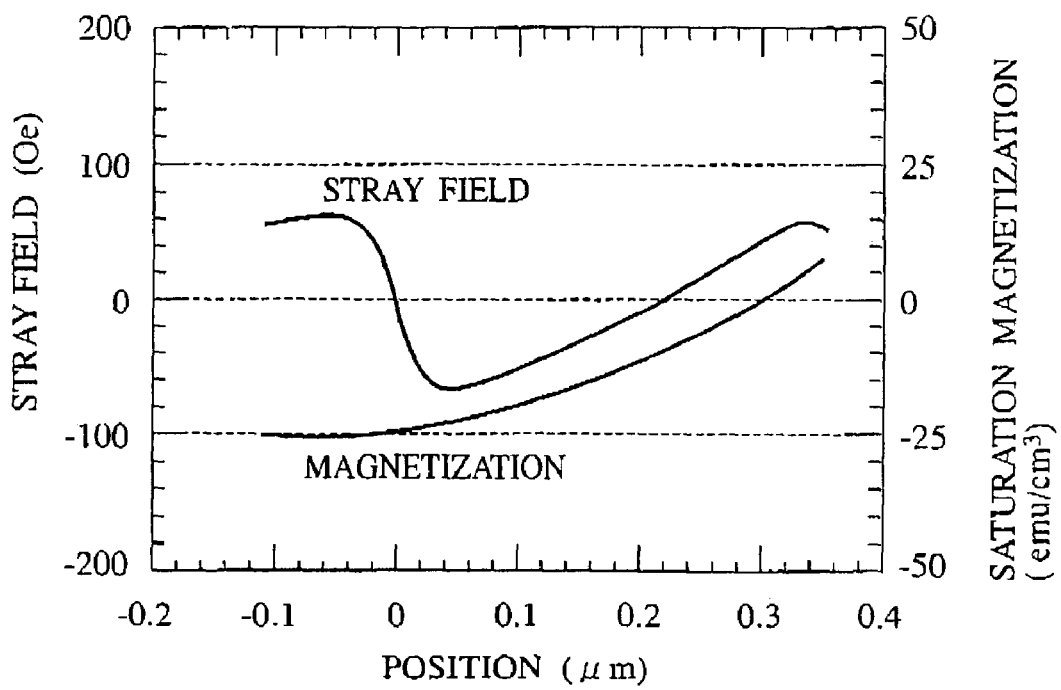
FIG. 10 is a view similarly showing a change of the stray field when an element concentration ratio is 25.5 at. %.
Figure 11:
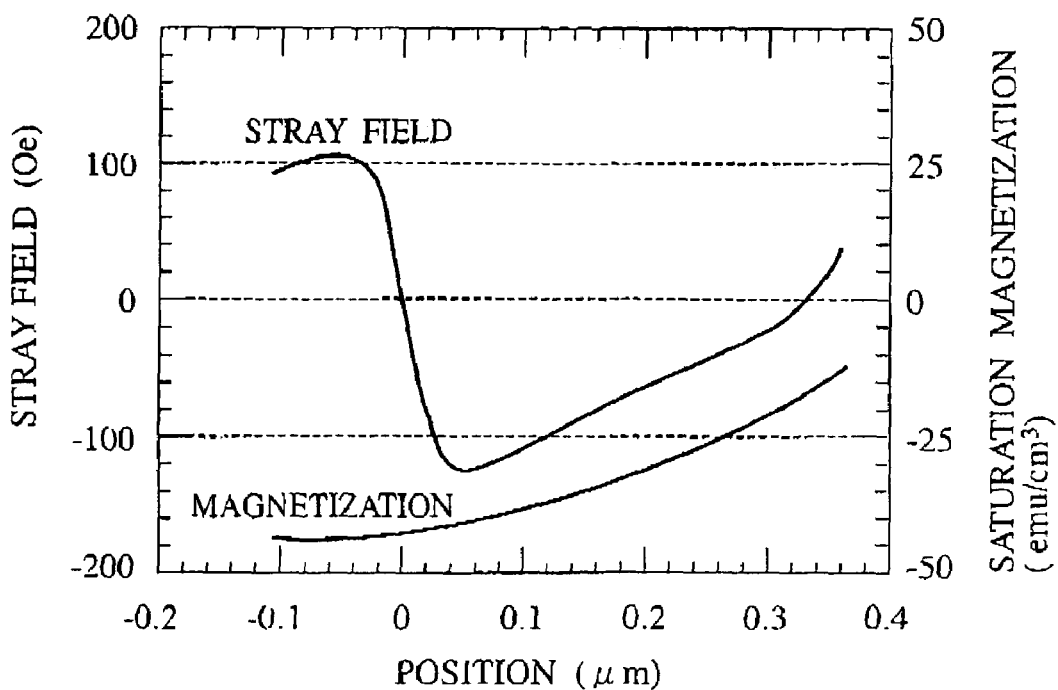
FIG. 11 is a view similarly showing a change of the stray field when an element concentration ratio is 24.5 at. %.
Figure 12:
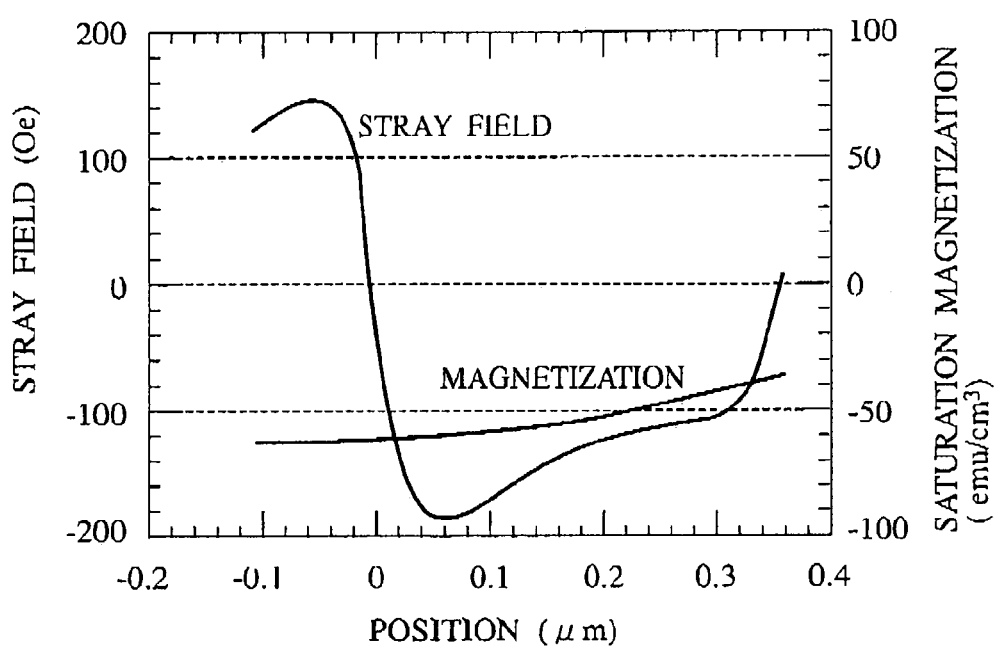
FIG. 12 is a view similarly showing a change of the stray field when an element concentration ratio is 23.5 at. %.

FIG. 8 shows a change of a stray field when an element concentration ratio of heavy rare earth (Tb) to iron family metal (Fe—Co) contained in the third or fourth magnetic field 15 or 26 is 27.5 at. % in the magneto-optical recording medium of the first or second embodiment of the invention. FIG. 9 similarly shows a change of a stray field when an element concentration ratio is 26.5 at. %. FIG. 10 similarly shows a change of a stray field when an element concentration ratio is 25.5 at. %. FIG. 11 similarly shows a change of a stray field when an element concentration ratio is 24.5 at. %. FIG. 12 similarly shows a change of a stray field when an element concentration ratio is 23.5 at. %.

Studies were conducted on a change of a stray field from the third or fourth magnetic layer 15 or 26 with respect to a composition change of the third or fourth magnetic layer 15 or 26 which becomes a recording layer in the magneto-optical recording medium 10A or 20A of the first or second embodiment of the invention. Results are shown in each of FIGS. 8 to 12 Each of FIGS. 8 to 12 shows an example where a Tb—Fe—Co film is formed in the third or fourth magnetic layer 15 or 26 which becomes a recording layer. A position of an abscissa is a position coordinate of a track direction where a spot center of a reproducing laser beam is an origin 0, and a traveling direction of the laser beam is positive. In this case, the position of the abscissa also indirectly indicates a temperature change by Gaussian distribution of the reproducing laser beam.

In each of FIGS. 8 to 12, together with a stray field, saturation magnetization of the third fourth magnetic layer 15 or 26 in which the stray field is generated is also shown as a reference. In an ordinate of each of the stray field and the saturation magnetization, a − direction indicates downward magnetization if a + direction indicates upward magnetization, and a scale unit of the saturation magnetization of only FIG. 12 is double of that of each of FIGS. 8 to 11.

The magnetic domain wall of a very small recording mark recorded in the third or fourth magnetic layer 15 or 26 which becomes a recording layer is moved toward a former recording mark. Accordingly, when a random modulation signal is recorded in the third or fourth magnetic layer 15 or 26 which becomes a recording layer, a repulsive force from the former recording mark must also be taken into consideration. Thus, the studies here assume the presence of a magnetic domain wall in the third or fourth magnetic layer 15 or 26 directly below the center of the reproducing laser beam (origin position in track direction position coordinate). Results shown in FIGS. 8 to 12 respectively correspond to cases where element concentration ratios of heavy rare earth (Tb) to iron family metal (Fe—Co) contained in the third or fourth magnetic layer 15 or 26 are 27.5 at. %, 26.5 at. % 25.5%, 24.5%, and 23.5%. As can be understood from FIGS. 8 to 12, when the element concentration ratio is smaller, a stray field in the magnetic domain wall movement starting position becomes smaller, but a stray field in the vicinity of the origin which becomes a last reached point of the displacement of the magnetic domain wall becomes larger.

Figures 13, 14:
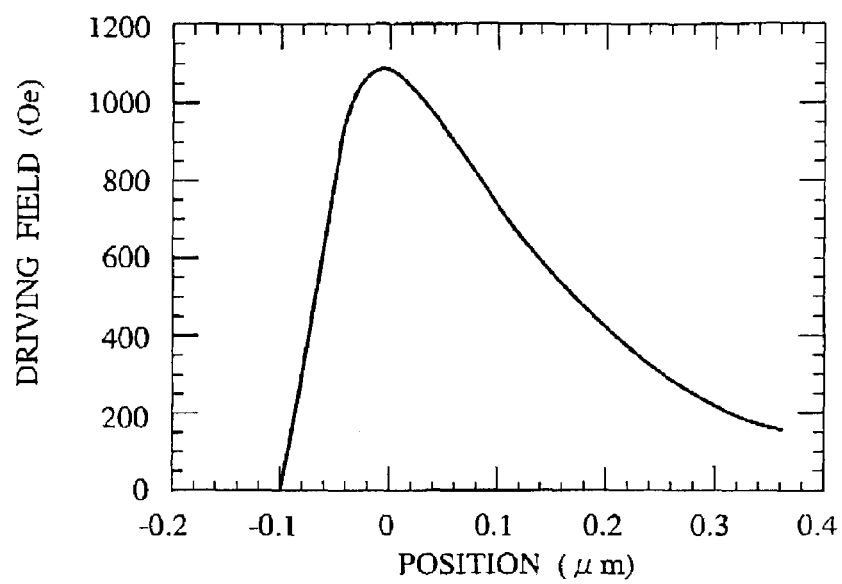
FIG. 13 is a view showing a magnetic domain wall driving field on a track direction position coordinate in the magneto-optical recording medium of the invention.
FIG. 14 is a view showing a result of measuring normalized jitters when an element concentration ratio of heavy rare earth (Tb) to iron family metal (Fe—Co) contained in the third or fourth magnetic layer which becomes a recording layer is changed in the magneto-optical recording medium of the invention.

FIG. 13 shows a magnetic domain wall driving field with respect to a track direction position coordinate in the magneto-optical recording medium of the invention.

FIG. 14 shows a result of measuring normalized jitters when an element concentration ratio of heavy rare earth (Tb) to iron family metal (Fe—Co) contained in the third or fourth magnetic layer which becomes a recording layer is changed in the magneto-optical recording medium of the invention.

As shown in FIG. 13, a magnetic domain wall driving field is relatively small in a magnetic domain wall movement starting position in the vicinity of 0.3 μm, and suddenly enlarged from the magnetic domain wall movement starting position toward a highest temperature position (last reached point of the displacement of the magnetic domain wall). Thus, it is important to consider effects of the stray field in the movement starting position. As shown in FIGS. 8 to 12, the stray field on the magnetic domain wall movement starting position is gradually reduced as the element concentration ratio of heavy rare earth (Tb) to iron family metal (Fe—Co) contained in the third or fourth magnetic layer 15 or 26 which becomes a recording layer becomes smaller. Conversely, the stray field in the highest temperature position is suddenly enlarged. According to the invention, in the first magnetic layer 13 or 23 which becomes a magnetic domain wall displacement layer, magnetization of a heavy rare earth sub-lattice is predominant in a magnetic domain wall movement temperature area (about 430K to about 490K). Accordingly, in the case where a stray field from the third or fourth magnetic layer 15 or 26 which becomes a recording layer is minus, the stray field acts in a direction of assisting the magnetic domain wall movement of the magnetic domain wall displacement layer. In the cases of FIGS. 11 and 12, when the magnetic domain wall displacement layer is slightly moved, the stray field from the recording layer is changed in a direction assisting the magnetic domain wall movement. However, immediately before the highest temperature position, the stray field is changed in a direction of blocking the magnetic domain wall movement to be suddenly enlarged. Thus, considering that, when the magnetic domain wall driving field becomes large, the displacement of the magnetic domain wall exhibits complex behavior while a magnetic domain wall structure itself is changed, it is not desirable to reduce the composition of the rare earth (Tb) more, and the cases of FIGS. 11 and 12 are considered to be desirable states.

To substantiate the foregoing result, in a state where an element concentration ratio of heavy rare earth (Gd) to iron family metal (Fe or Fe—Co) contained in the first magnetic layer 13 or 23 which became a magnetic domain wall displacement layer was 28.5 at. %, normalized jitters are measured and compared when an element concentration ratio of heavy rare earth. (Tb) to iron family metal (Fe—Co) contained in the third of fourth magnetic layers 15 or 26 which became recording layers is varied. A result is shown in FIG. 14. In this case, a modulation signal of a shortest mark length 0.08 µm was recorded, and evaluation of magnetic domain wall movement reproducing was executed. A tendency is shown that a best jitter value is exhibited when an element concentration ratio of heavy rare earth (Tb) to iron family metal (Fe—Co) contained in the third or fourth magnetic layer 15 or 26 which becomes a recording layer is 24.5 at. %, and jitter characteristics are deteriorated in both cases of an increase and a decrease of the composition of the heavy rare earth (Tb). This result bears out the above-described consideration result of the stray field. Thus, preferably, an element concentration ratio (at. % ratio) of heavy rare earth (Tb) to iron family metal (Fe—Co) in the third or fourth magnetic layer 15 or 26 is set in a range of $23.5 \leq Tb \leq 25.5$.

Characteristics shown in FIGS. 8 to 12, and FIG. 14 are present in the case of forming the Tb—Fe—Co film in the third or fourth magnetic layer 15 or 26 which becomes a recording layer. However, studies were conducted similarly to the foregoing for the case of forming a Dy—Fe—Co film in the third or fourth magnetic layer 15 or 26, and it was found that an element concentration ratio (at. % ratio) of Dy to Fe—Co should preferably be set in a range of $25.5 \leq Dy \leq 28.5$ when the Dy—Fe—Co film was used for the third or fourth magnetic layer 15 or 26.

In the above composition range, by combination of the first magnetic layer 13 with the third magnetic layer 15 in the magneto-optical recording medium 10A, or by combination of the first magnetic layer 23 with the fourth magnetic layer 26 in the magneto-optical recording medium 20A, effects from the stray field are reduced, the magneto-optical recording medium 10A or 20A of the invention always having a fast magnetic domain wall displacement velocity is realized, and a jitter characteristic which is one of reproduced signal characteristics is greatly improved.

MODIFIED EXAMPLES 1 AND 2

Next, description will be made of other improved examples capable of reducing a stray field leaked from the third or fourth magnetic layer 15 or 26 which becomes a recording layer to the first magnetic layer 13 or 23 which becomes a magnetic domain wall displacement layer, and simultaneously enhances recording magnetic field sensitivity with reference to FIGS. 15 to 22.

Figure 15:
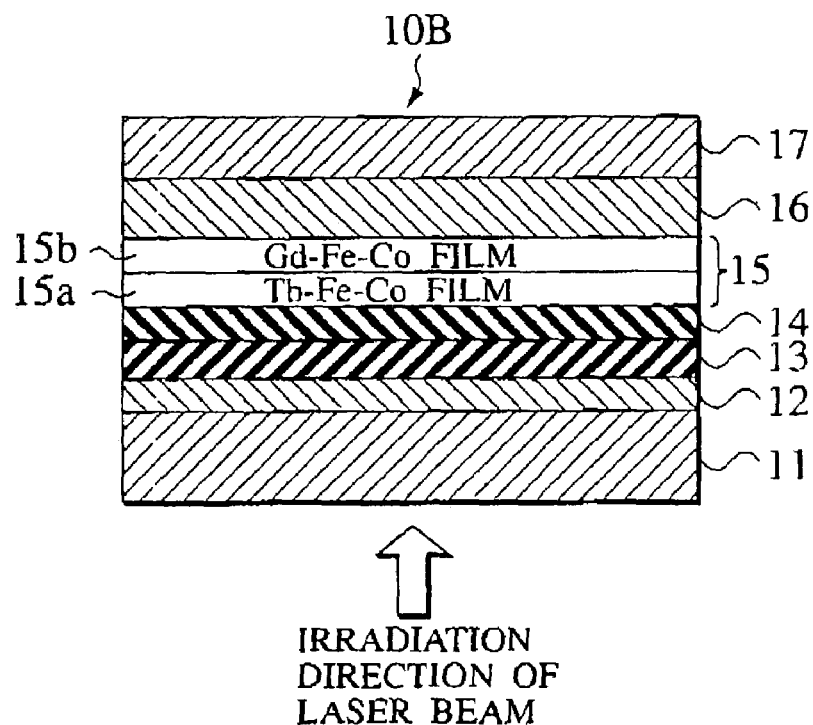
FIG. 15 is a sectional view schematically showing layer formation of a modified example 1 obtained by partially modifying the magneto-optical recording medium of the first embodiment of the invention.
Figure 16:
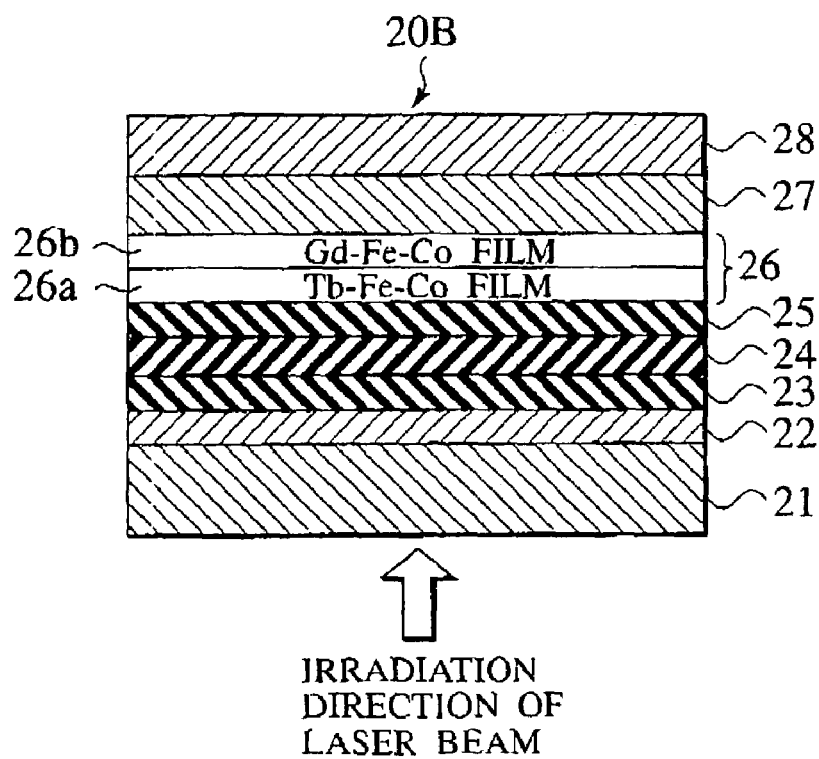
FIG. 16 is a sectional view schematically showing layer formation of a modified example 2 obtained by partially modifying the magneto-optical recording medium of the second embodiment of the invention.

FIG. 15 is a sectional view schematically showing layer structure of a modified example 1 of a partially modified magneto-optical recording medium of the first embodiment of the invention. FIG. 16 is a sectional view schematically showing layer structure of a modified example 2 of a partially modified magneto-optical recording medium of the second embodiment of the invention.

Figure 17:
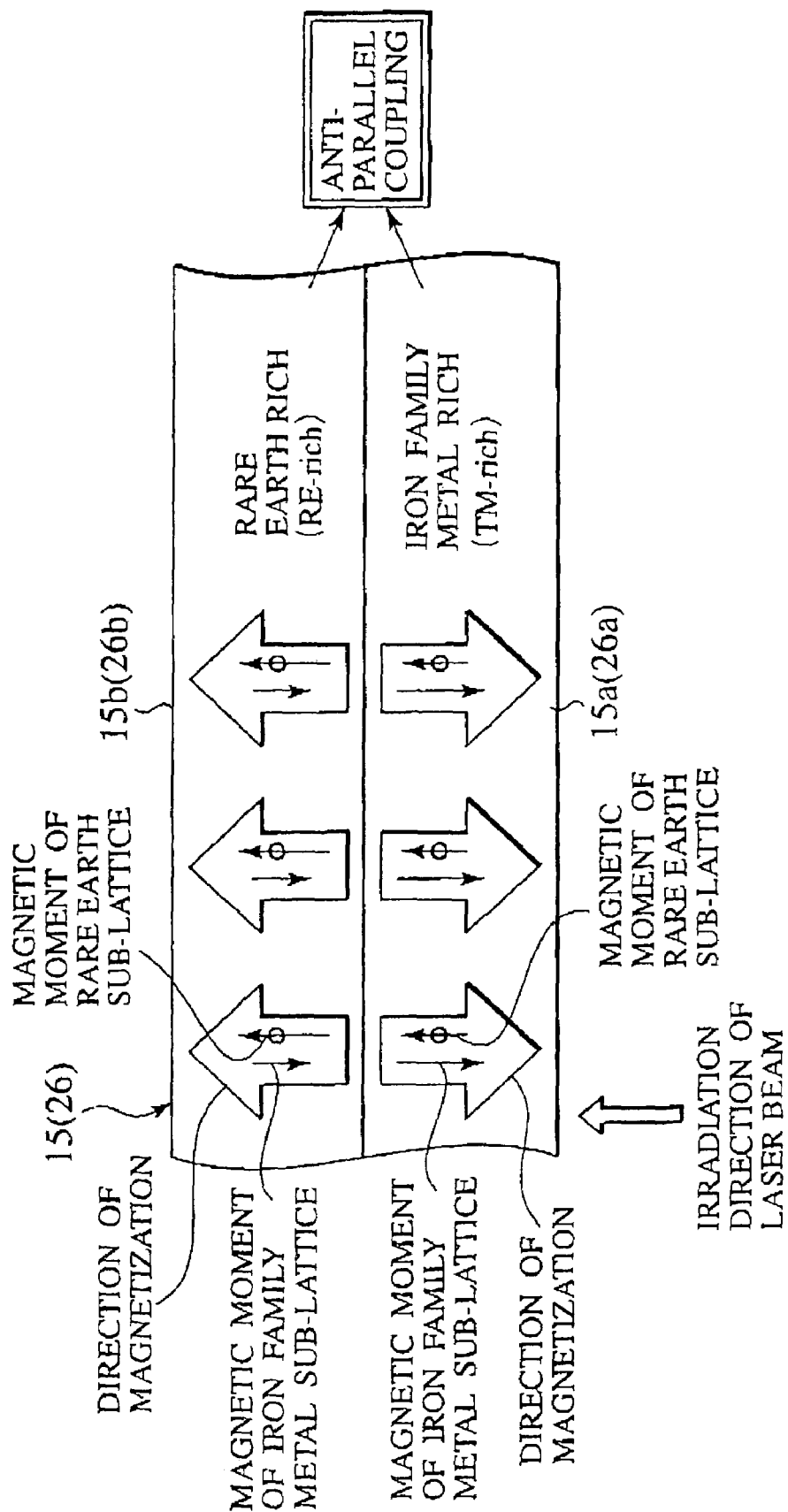
FIG. 17 is a view schematically showing anti-parallel coupling which becomes stable if magnetization directions of two layers are opposite to each other when the third (or fourth) magnetic layer is formed as a two-layer film made of a Tb—Fe—Co film and a Gd—Fe—Co film, in the magneto-optical recording medium of the modified example 1 (or magneto-optical recording medium of the modified example 2)

FIG. 17 is a view schematically showing anti-parallel coupling which becomes stable if magnetization directions of two films are opposite to each other when the third (or fourth) magnetic layer is made of the two films, i.e., a Tb—Fe—Co film and a Gd—Fe—Co film, in the magneto-optical recording medium of the modified example 1 (or magneto-optical recording medium of the modified example 2).

Figure 18:
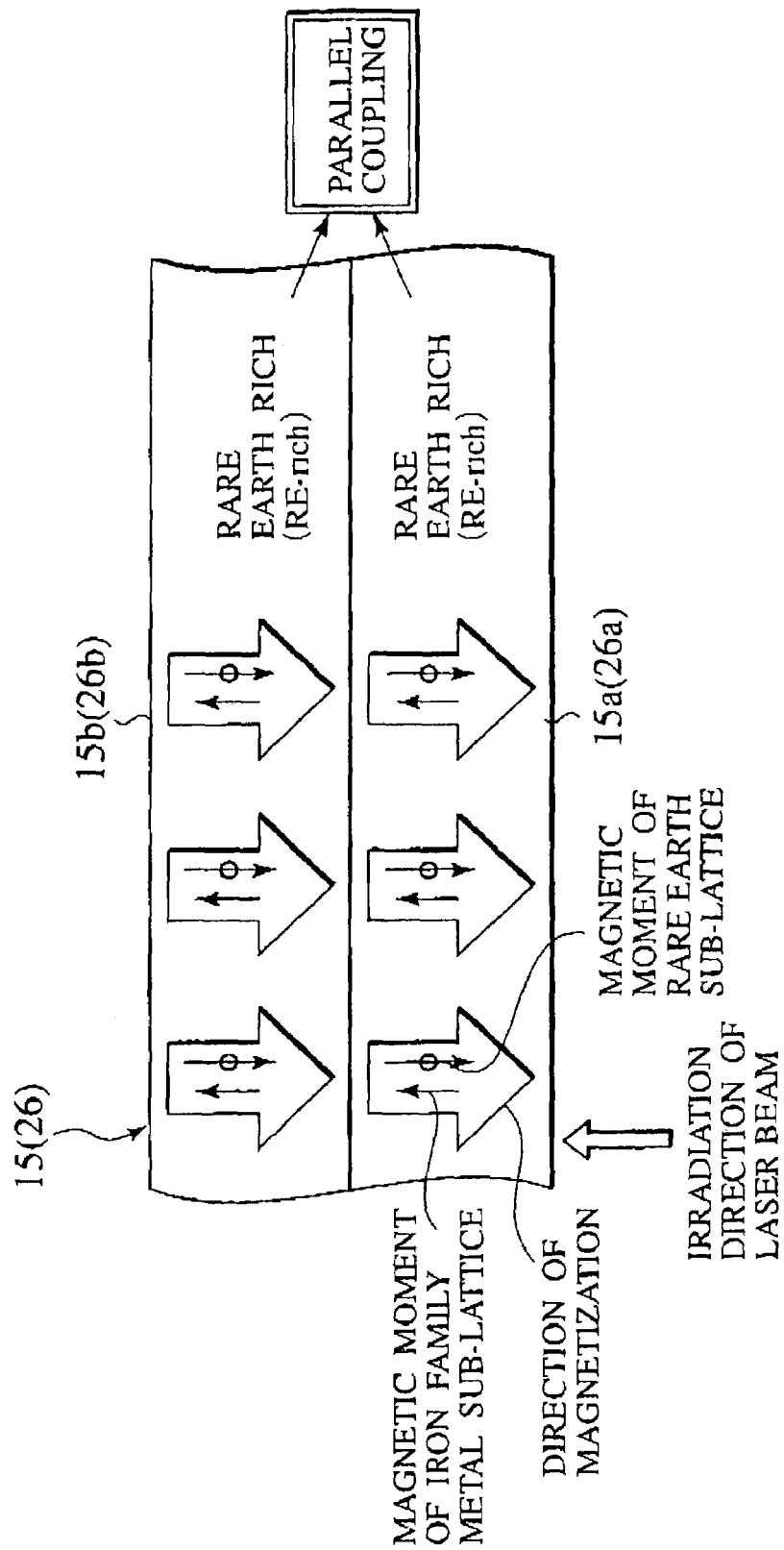
FIG. 18 is a view schematically showing rare earth rich (RE-rich) parallel coupling which becomes stable if magnetization directions of two layers are the same as each other when the third (or fourth) magnetic layer is formed as a two-layer film made of a Tb—Fe—Co film and a Gd—Fe—Co film, in the magneto-optical recording medium of the modified example 1 (or magneto-optical recording medium of the modified example 2)

FIG. 18 is a view schematically showing rare earth rich (RE-rich) parallel coupling which becomes stable if magnetization directions of two films are similar to each other when the third (or fourth) magnetic layer is made of the two films, i.e., a Tb—Fe—Co film and a Gd—Fe—Co film, in the magneto-optical recording medium of the modified example 1 (or magneto-optical recording medium of the modified example 2).

Figure 19:
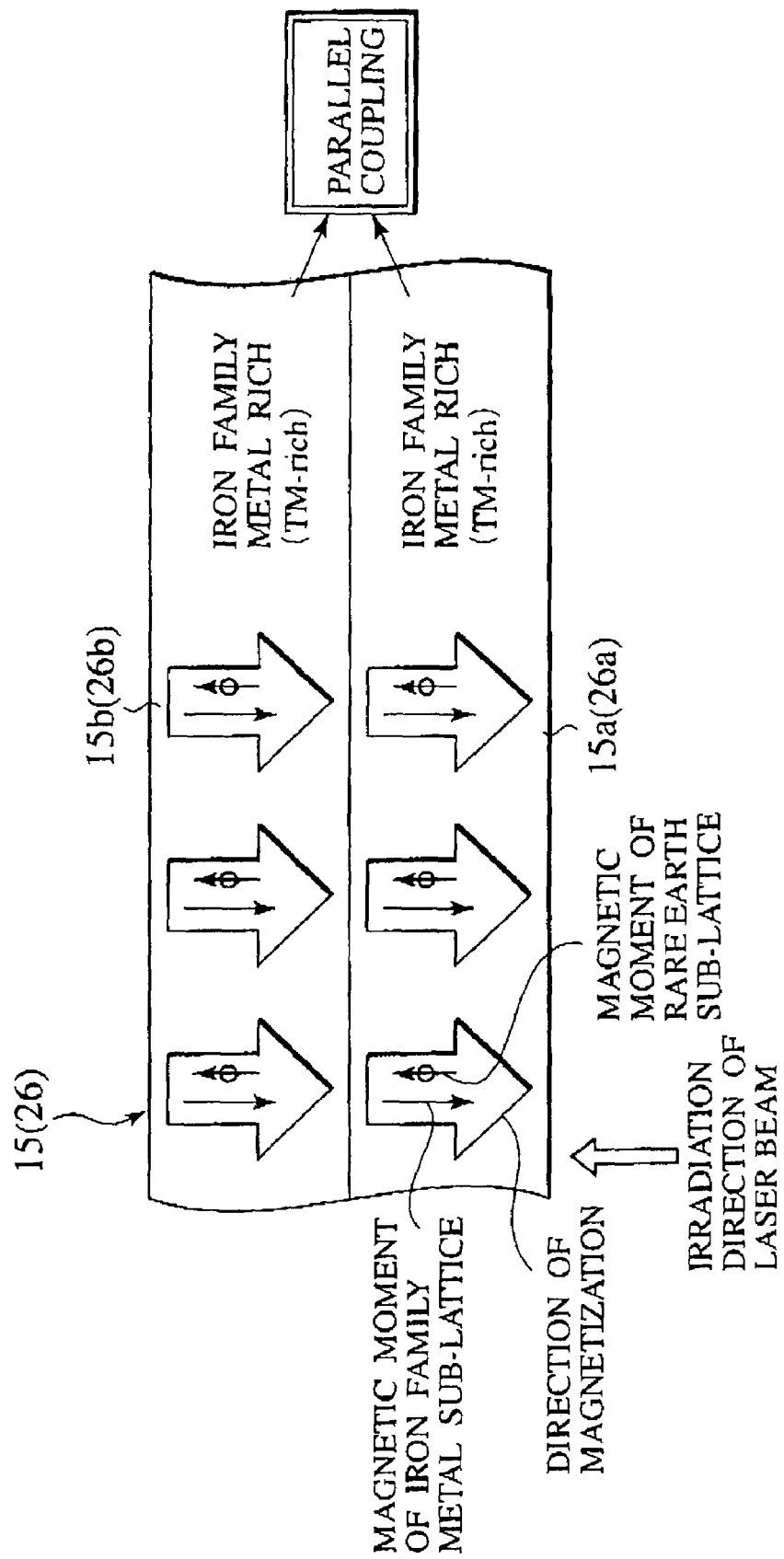
FIG. 19 is a view schematically showing iron family metal rich (TM-rich) parallel coupling which becomes stable if magnetization directions of two layers are the same as each other when the third (or fourth) magnetic layer is formed as a two-layer film made of a Tb—Fe—Co film and a Gd—Fe—Co film, in the magneto-optical recording medium of the modified example 1 (or magneto-optical recording medium of the modified example 2)

FIG. 19 is a view schematically showing iron family metal rich (TM-rich) parallel coupling which becomes stable if magnetization directions of two films are similar to each other when the third (or fourth) magnetic layer is made of the two films, i.e., a Tb—Fe—Co film and a Gd—Fe—Co film, in the magneto-optical recording medium of the modified example 1 (or magneto-optical recording medium of the modified example 2).

Figure 20:
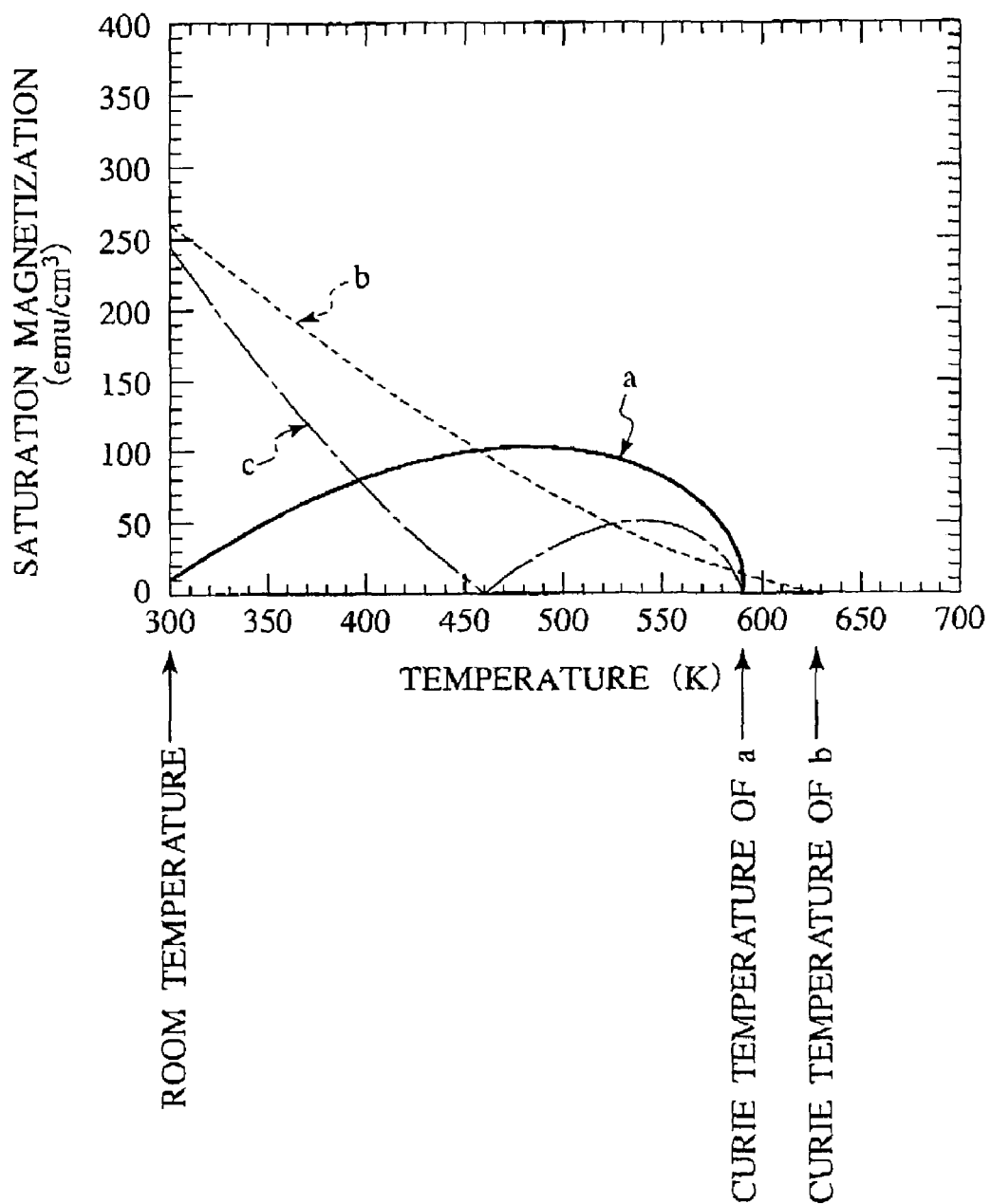
FIG. 20 is a characteristic view of a two-layer film which always maintains anti-parallel coupling from room temperature to Curie temperature when the third (or fourth) magnetic layer is formed as a two-layer film made of a Tb—Fe—Co film and a Gd—Fe—Co film, in the magneto-optical recording medium of the modified example 1 (or magneto-optical recording medium of the modified example 2)

FIG. 20 is a characteristic view of two films which always maintain anti-parallel coupling from room temperature to Curie temperature when the third (or fourth) magnetic layer is made of the two films, i.e., a Tb—Fe—Co film and a Gd—Fe—Co film, in the magneto-optical recording medium of the modified example 1 (or magneto-optical recording medium of the modified example 2).

Figure 21:
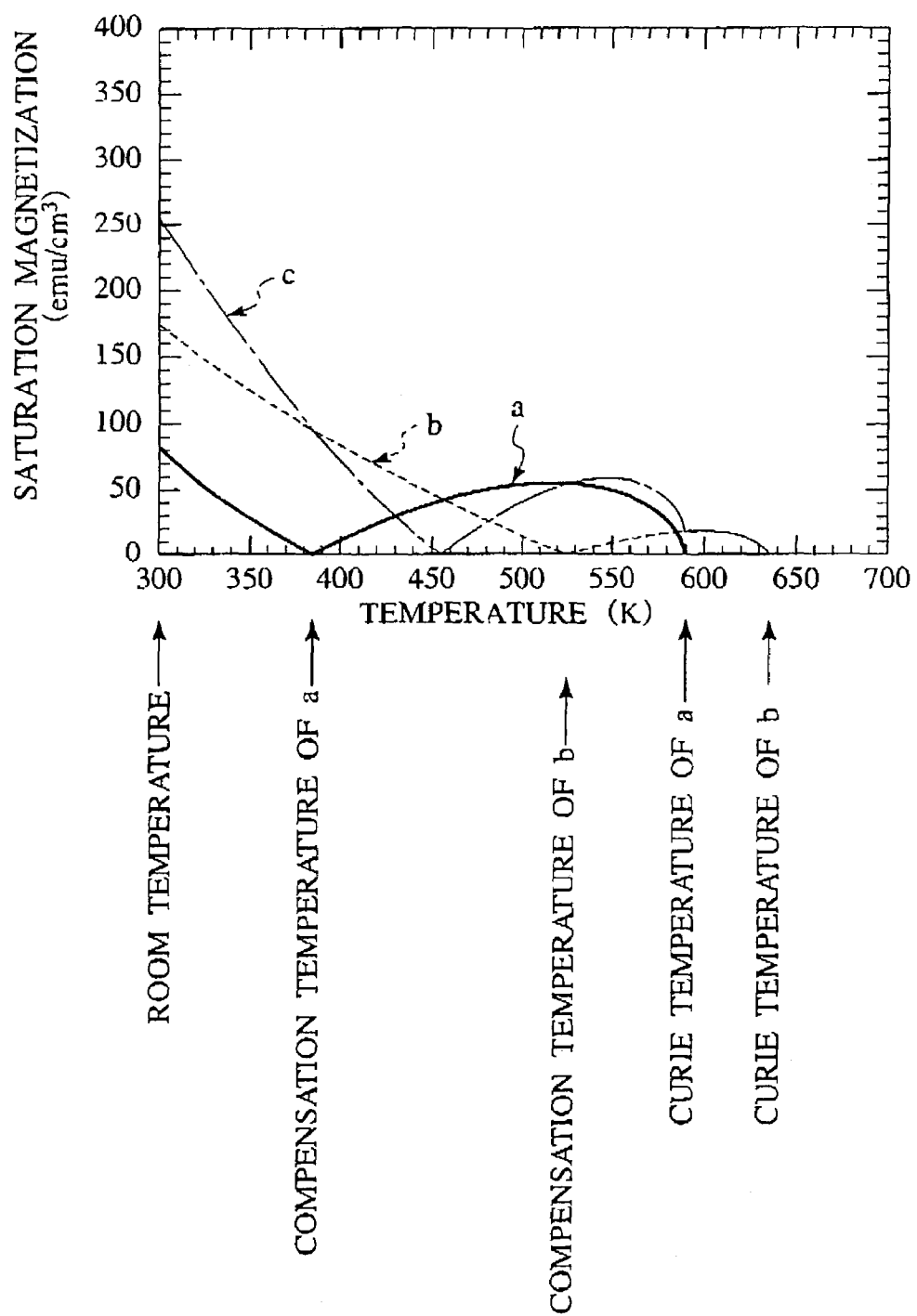
FIG. 21 is a characteristic view of a two-layer film which becomes parallel coupling of an RE-rich film from room temperature to about 385 K (compensation temperature of a), anti-parallel coupling from about 385 K to about 530 K (compensation temperature of b), and parallel coupling of a TM-rich film from about 530 K to Curie temperature, when the third (or fourth) magnetic layer is formed as a two-layer film made of a Tb—Fr—Co film and a Gd—Fe—Co film, in the magneto-optical recording medium of the modified example 1 (or magneto-optical recording medium of the modified example 2)

FIG. 21 is a characteristic view of two layers which become parallel coupling of an RE-rich film from room temperature to about 385 K (compensation temperature of a), anti-parallel coupling from about 385 K to about 530 K (compensation temperature of b), and parallel coupling of a TM-rich film from about 530 K to Curie temperature, when the third (or fourth) magnetic layer is made of the two films, i.e., a Tb—Fr—Co film and a Gd—Fe—Co film, in the magneto-optical recording medium of the modified example 1 (or magneto-optical recording medium of the modified example 2).

Figure 22:
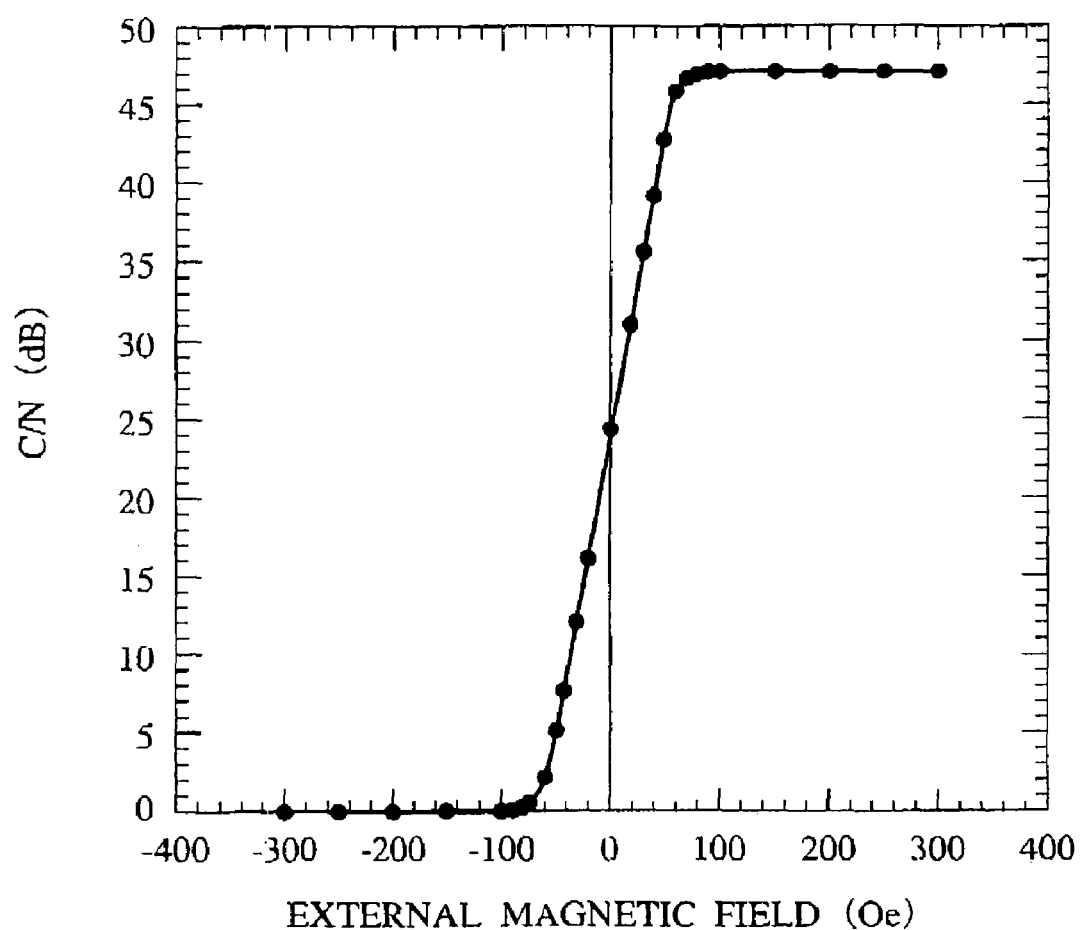
FIG. 22 is a view showing a result of reducing a recording magnetic field of the third (or fourth) magnetic field made of a Tb—Fe—Co film and a Gd—Fe—Co film in the magneto-optical recording medium of the modified example 1 (or magneto-optical recording medium of the modified example 2)

FIG. 22 shows a result of reducing a recording magnetic field of the third (or fourth) magnetic field made of a Tb—Fe—Co film and a Gd—Fe—Co film in the magneto-optical recording medium of the modified example 1 (or magneto-optical recording medium of the modified example 2).

First, as shown in FIG. 15, a magneto-optical recording medium 10B of the modified example 1 which is a partial modification of the magnet-optical recording medium of the first embodiment of the invention, is different from the magneto-optical recording medium 10A of the first embodiment described above with reference to FIG. 3 only in a film forming method of a third magnetic layer 15 and similar in other components. Thus only differences are described. In the modified example 1, the third magnetic layer 15 is made of two films, i.e., a Tb—Fe—Co film 15a and a Gd—Fe—Co film 15b, to become a ferrimagnetic perpendicular magnetization film made of heavy rare earth and iron family metal. In this case, in the third magnetic layer 15 made of the Tb—Fe—Co film 15a and the Gd—Fe—Co film 15b, preferably, the Tb—Fe—Co film 15a of large magnetic anisotropy is formed towards a side irradiated with a laser beam and, accordingly, the Gd—Fe—Co film 15b is laminated on the Tb—Fe—Co film 15a.

Then, as shown in FIG. 16, a magneto-optical recording medium 20B of the modified example 2 which is a partial modification of the magnet-optical recording medium of the second embodiment of the invention is different from the magneto-optical recording medium 20A of the second embodiment described above with reference to FIG. 4 only in a film forming method of a fourth magnetic layer 26, and similar in other components. Thus, only differences are described. In the modified example 2, the fourth magnetic layer 26 is made of two films, i.e., a Tb—Fe—Co film 26a and a Gd—Fe—Co film 26b, to become a ferrimagnetic perpendicular magnetization film made of heavy rare earth and iron family metal. In this case, in the fourth magnetic layer 26 made of the Tb—Fe—Co film 26a and the Gd—Fe—Co film 26b, preferably, the Tb—Fe—Co film 26a of large magnetic anisotropy is formed towards a side irradiated with a laser beam and, accordingly, the Gd—Fe—Co film 26b is laminated on the Tb—Fe—Co film 26a.

As shown in each of FIGS. 17 to 19, in the third magnetic layer 15 (or fourth magnetic layer 26) made of the Tb—Fe—Co film 15a (or 26a) and the Gd—Fe—Co film 15b (or 26b), an arrow having no ○ mark indicates magnetic moment of an iron sub-lattice, an arrow having a ○ mark indicates magnetic moment of a rare earth sub-lattice, and a length of the arrow indicating the magnetic moment of each sub-lattice represents a magnitude of each sub-lattice magnetization. Furthermore, a large arrow having space inside which includes arrows of a rare earth sub-lattice and an iron sub-lattice indicates a direction of magnetization. In this case, a case where rare earth metal is more predominant than transition metal, it is called rare earth rich (RE-rich), and a case where transition metal is more predominant than rare earth metal, it is called iron rich (TM-rich).

The Tb—Fe—Co film 15a (or 26a) and the Gd—Fe—Co film 15b (or 26b) in the third magnetic layer 15 (or fourth magnetic layer 26) can take one of the anti-parallel coupling which becomes stable in an anti-parallel state where magnetization directions of two films are opposite to each other as shown in FIG. 17, the rare earth rich (RE-rich) parallel coupling which becomes stable in a parallel state where magnetization directions of two films are similar to each other as shown in FIG. 18, and the iron rich (TM-rich) parallel coupling which becomes stable in a parallel state where magnetization directions of two films are similar to each other as shown in FIG. 19, under the following conditions shown in FIG. 20 or 21.

That is, as shown in FIG. 20, in the 2-layer film of the third magnetic layer 15 (or fourth magnetic layer 26), a reference code a denotes temperature characteristics of the iron rich (TE-rich) Tb—Fe—Co film 15a (or 26a), and b denotes temperature characteristics of the rare earth rich (RE-rich) Gd—Fe—Co film 15b (or 26b). Both films 15a and 15b (or 26a and 26b) always maintain anti-parallel coupling similar to that shown in FIG. 17 from room temperature near 300K to Curie temperature of the Tb—Fe—Co film 15a (or 26a).

Here, while the two films of the third magnetic layer 15a (or fourth magnetic layer 26) maintain the anti-parallel coupling, a difference c=a−b between the temperature characteristics a of the iron rich (TE-rich) Tb—Fe—Co film 15a (or 26) and the temperature characteristics b of the rare earth rich (RE-rich) Gd—Fe—Co film 15b (or 26b) is calculated to obtain apparent magnetization temperature characteristics.

As obvious from the drawings, in a temperature area in which reproducing is executed by magnetic domain wall displacement in the first magnetic layer 13 (or 23), i.e., about 430K to about 490K, because of the anti-parallel coupling of the two films of the third magnetic layer 15 (or fourth magnetic layer 26), the apparent magnetization is limited small to about 20 emu/$^3$cm or lower. In this case, a exchange coupling force which is a micro-scale interaction of atoms is applied between the iron rich (TE-rich) Tb—Fe—Co film 15a (or 26a) and the rare earth rich (RE-rich) Gd—Fe—Co film 15b (or 26b), while a force by a stray field leaked from the third magnetic layer 15 (or fourth magnetic layer 26) which becomes a recording layer to the first magnetic layer 13 (or 23) which becomes a magnetic domain wall displacement layer is a macro-scale magnetostatic force. It can be understood that such a stray field in the two anti-parallel films can be reduced by making directions of magnetization of the films 15a and 15b (or 26a and 26b) opposite to each other, and reducing a difference in magnetization, that is, reducing the apparent magnetization. Thus, in the temperature range (about 430K to about 490K) in which reproducing is executed by the magnetic domain wall displacement in the first magnetic layer 13 (or 23), the anti-parallel coupling which becomes stable when the directions of magnetization of the two films of the third magnetic layer 15 (or fourth magnetic layer 26) become opposite to each other is maintained, whereby the stray field leaked from the recording layer to the magnetic domain wall displacement layer can be reduced.

Then, when the amount of Tb in the Tb—Fe—Co film 15a (or 26a) is increased, and the amount of Gd in the Gd—Fe—Co film 15b (or 26b) is reduced in the two films of the third magnetic layer 15 (or fourth magnetic layer 26) shown in FIG. 20, two films of the third magnetic layer (or fourth magnetic layer 26) having characteristics shown in FIG. 21 are obtained. In FIG. 21, a reference code a denotes temperature characteristics of the Tb—Fe—Co film 15 (or 26a), and b temperature characteristics of the Gd—Fe—Co film 15b (or 26b). Furthermore, a reference code c denotes apparent magnetization temperature characteristics by the temperature characteristics a of the Tb—Fe—Co film 15a (or 26a) and the temperature characteristics b of the Gd—Fe—Co film 15b (or 26b).

In the example shown in FIG. 21, in the case of the Tb—Fe—Co film 15a (or 26a) of the third magnetic layer 15 (or fourth magnetic layer 26), a coercive force maximizes in the vicinity of about 385K, and there is a compensation temperature where sub-lattice magnetizations of the rare earth and the iron family metal become roughly equal to each other. On the other hand, in the case of the Gd—Fe—Co film 15b (or 26b), a coercive force is maximized in the vicinity of about 530K, and there is a compensation temperature where sub-lattice magnetizations of the rare earth and the iron metal become roughly equal to each other. Each of the above compensation temperatures has characteristics that a direction of magnetization decided by a magnitude relation of the sub-lattice magnetizations of the rare earth metal and the iron family metal is reversed at the boundary of the compensation temperature.

More specifically, in the third magnetic layer 15 (or fourth magnetic layer 26), parallel coupling of the RE-rich film similar to that shown in FIG. 18 is set from the room temperature near 300K to about 385K (compensation temperature of a). At the time of the parallel coupling of the RE-rich film, the temperature characteristics c of the apparent magnetization becomes a value which is an addition of the temperature characteristics a of the Tb—Fe—Co film 15a (or 26a) and the temperature characteristics b of the Gd—Fe—Co film 15b (or 26b). From about 385K to about 530K (compensation temperature of b), anti-parallel coupling similar to that shown in FIG. 17 is set. At the time of this anti-parallel coupling, the temperature characteristics c of the apparent magnetization becomes a value of a difference between the temperature characteristics a of the Tb—Fe—Co film 15a (or 26a) and the temperature characteristics b of the Gd—Fe—Co film 15b (or 26b). Furthermore, from about 530K to Curie temperature of the Tb—Fe—Co film 15a (or 26a), parallel coupling of a TM-rich film similar to that shown in FIG. 19 is set. At the time of this parallel coupling of the TM-rich film, the temperature characteristics of the apparent magnetization take a value which is an addition of the temperature characteristics a of the Tb—Fe—Co film 15a (or 26a) and the temperature characteristics b of the Gd—Fe—Co film 15b (or 26b). In other words, the parallel coupling of the RE-rich film shown in FIG. 18 is set at the room temperature, the anti-parallel coupling shown in FIG. 17 is set at the reproducing temperature, and the parallel coupling of the TE-rich film shown in FIG. 19 is set at the recording temperature.

Also in the example shown in FIG. 21, as obvious from the drawing, in a temperature range in which reproduction is executed by the magnetic domain wall displacement in the first magnetic layer 13 (or 23), i.e., from about 430K to about 490K, because of the anti-parallel coupling of the two films of the third magnetic layer 15 (or fourth magnetic layer 26), the apparent magnetization is limited minimally to about 20 emu/cm$^3$. Thus, in the temperature range (about 430K to about 490K) in which the reproducing is executed by the magnetic domain wall movement in the first magnetic layer 13 (or 23), the anti-parallel coupling is set, which becomes stable when directions of the magnetizations of the two films of the third magnetic layer 15 (or fourth magnetic layer 26) are made opposite to each other. Accordingly, a stray field leaked from the recording layer to the magnetic domain wall displacement layer can be reduced.

By using the two films, i.e., the Tb—Fe—Co film 15a (or 26a) and the Gd—Fe—Co film 15b (or 26b) for the third magnetic layer 15 (or fourth magnetic layer 26) which becomes a recording layer, a recoding magnetic field can be simultaneously reduced as shown in FIG. 22. That is, FIG. 22 shows a result of examining recording magnetic field sensitivity by optical modulation recording. When a recording external magnetic field of an abscissa is changed from a negative side which is a deletion direction to a positive side which is a recording side, an absolute value of a negative magnetic field in which C/N rises, and a magnitude of a positive magnetic field in which C/N is saturated are reduced, whereby magnetic field sensitivity is enhanced. In the case of the optical modulation recording, generally, a weak DC external magnetic field is applied in a recording direction, and a laser beam is applied to this to add heat in accordance with presence of a signal. Then, a coercive force is reduced to the reverse direction of magnetization in accordance with the external magnetic field. Thus, based on a direction of a magnetic domain thereof, information of "1", and "0" is recorded.

From the result of FIG. 22, it can be understood that the recording magnetic field sensitivity of the two layers of the anti-parallel exchange coupling in the third magnetic layer 15 (or fourth magnetic layer 26) is greatly reduced by about 60 Oe. Normally, compared with the Tb—Fe—Co film 15a (or 26a) used as the recording layer, vertical magnetic anisotropy of the Gd—Fe—Co film 15b (or 26b) of the anti-parallel exchange coupling is small, and a coercive force is extremely small at a temperature off the compensation temperature, whereby recording can be executed by a small external magnetic field. Accordingly, a recording mechanism is employed where the recorded magnetic domain is transferred to the Tb—Fe—Co film 15a (or 26a) by exchange coupling to be maintained stable. Thus, recording magnetic sensitivity can be enhanced.

Next, description will be made of the third and fourth embodiments of the present invention.

Figure 23:
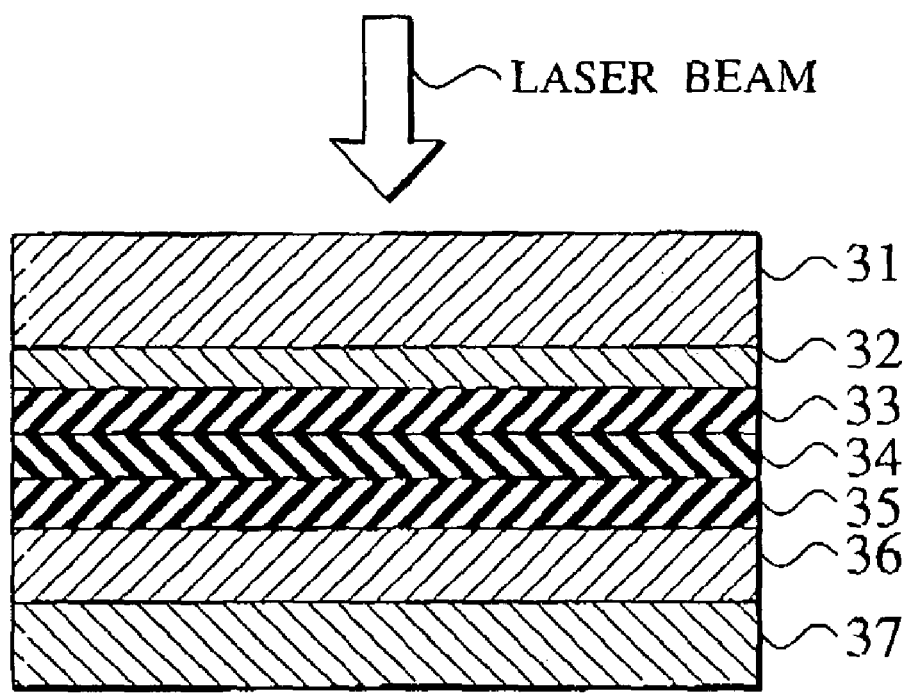
FIG. 23 is a schematic sectional view showing in outline structures of magneto-optical recording media of a third embodiment of the present invention and a modified example 3 thereof.
Figure 25:
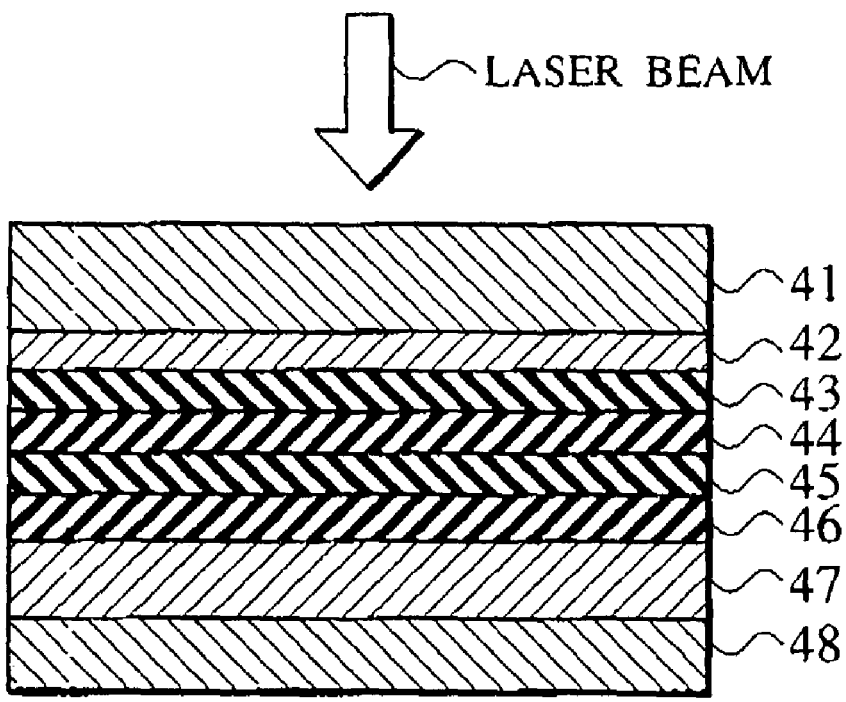
FIG. 25 is a schematic sectional view showing in outline structures of magneto-optical recording media of a fourth embodiment of the present invention and a modified example 4 thereof.

FIG. 23 is a sectional view schematically showing the layer structure of each of magneto-optical recording media of a third embodiment of the present invention and its modified example 3. FIG. 25 is a sectional view schematically showing layer structure of each of magneto-optical recording media of the fourth embodiment of the present invention and its modified example 4.

Third Embodiment

In the magneto-optical recording, medium of the third embodiment of the invention, as shown in FIG. 23, on a light transmissible substrate 31 made of glass plate, polycarbonate or the like (it should be noted that in FIG. 23, the structure is shown upside down, that is, in this case, on the bottom surface of the light transmissible substrate 31), first, second and third magnetic layers 33, 34, and 35 are sequentially laminated through a transparent first dielectric layer 32 which becomes a protective film or a multiple interference film and, further, on this third magnetic layer 35 (its bottom surface in FIG. 23), a protective film made of a second dielectric layer (or nonmagnetic metal film) 36 is formed. Furthermore, when necessary, a protective layer 37 made of a UV cured resin or the like may be formed thereon (its bottom surface in FIG. 23). The three magnetic films, i.e. the first, second and third magnetic layers 33, 34 and 35, may be sequentially laminated in vacuum, for example by continuous sputtering or the like. Irradiation with a laser beam or the like is executed from the light transmissible substrate 31 side.

The first magnetic layer 33 of the magneto-optical recording medium of the third embodiment of the invention is a film having an easy magnetization direction in a vertical direction (direction vertical to a film surface) at room temperature, i.e., a so-called amorphous thin film made of heavy rare earth and iron family metal which becomes a perpendicular magnetization film. The first magnetic layer 33 is made of 3 to 5 laminated films different from one another in composition. Curie temperature Tc33 (z) of each layer constituting the first magnetic layer 33 is gradually elevated in a thickness direction z from the second magnetic layer 34 side by a constant temperature difference $\Delta Tc=10°$ C. to 50° C., e.g., by about 45° C. To facilitate magnetic domain wall displacement, preferably, the first magnetic layer 33 is made of a film of small magnetic anisotropy. Here, the second magnetic layer 34 controls an exchange interaction for transferring a recorded magnetic domain of the third magnetic layer 35 to the first magnetic layer 33.

Figure 24:
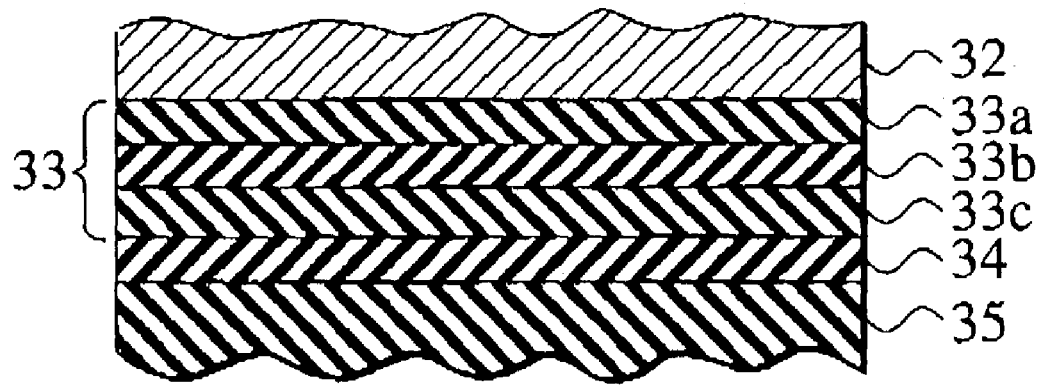
FIG. 24 is a schematic sectional view showing an example of a detailed structure of a first magnetic layer in the magneto-optical recording medium of each of the third embodiment of the invention and the modified example 3.

As an example of a detailed structure of the first magnetic layer 33 of the magneto-optical recording medium of the third embodiment of the invention, FIG. 24 schematically shows in cross section the first magnetic layer 33 of the 3-layer structure. On the second magnetic layer 34 made of terbium and iron (Tb 0.215, Fe 0.785), a first layer 33c made of gadolinium and iron (Gd 0.21, Fe 0.53, Co 0.08, Al 0.18), a second layer 33b made of gadolinium, iron and cobalt (Gd 0.23, Fe 0.57, Co 0.08, Al 0.12). and a third layer 33a made of gadolinium, iron and cobalt (Gd 0.25, Fe 0.61, Co 0.08, Al 0.06) are laminated. The first, second and third layers 33c, 33b and 33a are equal to one another in thickness, i.e., 10 nm. By adding cobalt (Co) by 1 at. %, Curie temperature Tc33 (z) of each of the first, second and third layers 33c, 33b and 33a can be raised by ΔTc=6 to 7° C. By adding aluminum (Al) by 1 at. %, Curie temperature Tc33 (z) of each of the first, second and third layers 33c, 33b and 33a can be reduced by ΔTc=8 to 9° C. By increasing a composition of gadolinium (Gd) by 2 at. %, Curie temperature Tc33 (z) of each of the first, second and third layers 33c, 33b and 33a is raised by ΔTc=about 45° C.

Each of the second and third magnetic layers 34 and 35 is a film having an easy magnetization axis in a vertical direction (direction vertical to a film surface), i.e., a so-called amorphous thin film made of heavy rare earth and iron metal which is a perpendicular magnetization film. Considering temperature states during recording and reproducing by a laser beam, preferably. Curie temperatures Tc33, Tc34 and Tc35 of the first, second and third magnetic layers 33, 34 and 35 are set as follows.

$$Tc35 > Tc33 > Tc34 \quad (7)$$

Here, Curie temperature Tc33 of the first magnetic layer 33 with respect to Tc35 is defined by Curie temperature Tc33 ($Z_{max}$) of an uppermost layer of the multilayer structure. On the other hand, Curie temperature Tc33 of the first magnetic layer 33 with respect to Tc34 is defined by Curie temperature Tc33 ($Z_{min}$) of a lowermost layer of the multilayer structure.

To facilitate magnetic domain wall displacement, the first magnetic layer 33 which becomes a magnetic domain wall displacement layer must be a film of small anisotropy and a small coercive force. Accordingly, preferably, a material with a base of a Gd—Fe film is used. On the other hand, the third magnetic layer 35 which becomes a memory layer for holding recording information must be a film having a coercive force sufficient for making a recording mark (magnetic domain) at room temperature stably exist, and Curie temperature Tc35 suitable for recording. Accordingly, preferably, for the third magnetic layer 35, a material with a base of a Tb—Fe—Co film or Dy—Fe—Co film is used. Moreover, preferably, Curie temperatures Tc33, Tc34 and Tc35 are adjusted by adding nonmagnetic elements which cause no great changes in magnetic properties thereof.

Fourth Embodiment

In the magneto-optical recording medium of the fourth embodiment of the invention, as shown in FIG. 25, on a light transmissible substrate 41 made of glass plate, polycarbonate or the like (it should be noted that in FIG. 25 is described upside down, that is, in this case, on the bottom surface of the light transmissible substrate 41), first, second, third and fourth magnetic layers 43, 44, 45 and 46 are sequentially laminated through a transparent first dielectric layer 42 which becomes a protective film or a multiple interference film and, further, on this fourth magnetic layer 46 (its bottom surface in FIG. 25), a protective film made of a second dielectric layer (or nonmagnetic metal film) 47 is formed. Furthermore, when necessary, a protective layer 48 made of a UV cured resin or the like may be formed thereon (its bottom surface in FIG. 25). The four magnetic films, i.e., the first, second, third and fourth magnetic layers 43, 44, 45 and 46 maybe sequentially laminated in vacuum, for example by continuous sputtering or the like. Irradiation with a laser beam or the like is executed through the light transmissible substrate 41 side.

The first magnetic layer 43 of the magneto-optical recording medium of the fourth embodiment of the invention is a film having an easy magnetization direction in a vertical direction (direction vertical to a film surface) at room temperature, i.e., a so-called amorphous thin film made of heavy rare earth and iron family metal which becomes a perpendicular magnetization film. The first magnetic layer 43 is made of 3 to 5 laminated films different from one another in composition. Curie temperature Tc43 (z) of each layer constituting the first magnetic layer 43 is gradually elevated in a thickness direction z from the second magnetic layer 44 side by a fixed temperature difference ΔTc=10° C. to 50° C., e.g., by about 45° C. To facilitate magnetic domain wall displacement, preferably, the first magnetic layer 43 is made of a film of small magnetic anisotropy. Here, each of the second and third magnetic layers 44 and 45 controls an exchange coupling for transferring a recorded magnetic domain of the fourth magnetic layer 46 to the first magnetic layer 43.

Figure 26:
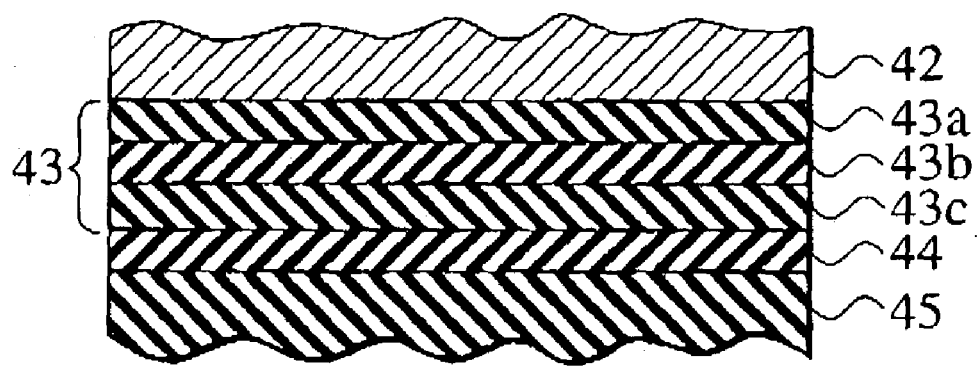
FIG. 26 is a schematic sectional view showing an example of a detailed structure of a first magnetic layer in the magneto-optical recording medium of each of the fourth embodiment of the invention and the modified example 4.

As an example of a detailed structure of the first magnetic layer 43 of the magneto-optical recording medium of the fourth embodiment of the invention, FIG. 26 schematically shows in cross section the first magnetic layer 43 of the 3-layer structure. On the second magnetic layer 44 made of terbium and iron (Tb 0.215, Fe 0.785), a first layer 43c made of gadolinium and iron (Gd 0.21, Fe 0.53, Co 0.08, Al 0.18), a second layer 43b made of gadolinium, iron and cobalt (Gd 0.23, Fe 0.57, Co 0.08, Al 0.12), and a third layer 43a made of gadolinium, iron and cobalt (Gd 0.25, Fe 0.61, Co 0.08, Al 0.06) are laminated. The first, second and third layers 43c, 43b and 43a are equal to one another in thickness, i.e., 10 nm. By adding cobalt (Co) by 1 at. %, Curie temperature Tc43 (z) of each of the first, second and third layers 43c, 43b and 43a can be raised by ΔTc=6 to 7° C. By adding aluminum (Al) by 1 at. %, Curie temperature Tc43 (z) of each of the first, second and third layers 43c, 43b and 43a can be reduced by ΔTc=8 to 9° C. Furthermore, by increasing a composition of gadolinium (Gd) by 2 at. %, Curie temperature Tc43 (z) of each of the first, second and third layers 43c, 43b and 43a is raised by ΔTc about 45° C.

Each of the second, third and fourth magnetic layers 44, 45 and 46 is a film having an easy magnetization axis in a vertical direction (direction vertical to a film surface), i.e., a so-called amorphous thin film made of heavy rare earth and iron family metal which is a perpendicular magnetization film. Considering temperature states during recording and reproducing by a laser beam, preferably, Curie temperatures Tc43, Tc44, Tc45, and Tc46 of the first, second, third and fourth magnetic layers 43, 44, 45, and 46 are set as follows, $$Tc46 > Tc43 > Tc44 > Tc45 \quad (8)$$

Here, Curie temperature Tc43 of the first magnetic layer 43 with respect to Tc46 is defined by Curie temperature Tc43 ($Z_{max}$) of an uppermost layer of the multilayer structure. On the other hand, Curie temperature Tc43 of the first magnetic layer 43 with respect to Tc44 is defined by Curie temperature Tc43 ($Z_{min}$) of a lowermost layer of the multilayer structure.

To facilitate magnetic domain wall displacement, the first magnetic layer 43 which becomes a magnetic domain wall displacement layer must be a film of small anisotropy and a small coercive force. Accordingly, preferably, a material with a base of a Gd—Fe film is used. On the other hand, the fourth magnetic-layer 46 which becomes a memory layer for holding recording information must be a film having a coercive force sufficient for stable presence of a recording mark (magnetic domain) at room temperature, and Curie temperature Tc46 suitable for recording. Accordingly, preferably, for the fourth magnetic layer 46, a material with a base of a Tb—Fe—Co film or Dy—Fe—Co film is used.

Moreover, preferably, Curie temperatures Tc43, Tc44, Tc45, and Tc46 are adjusted by adding nonmagnetic elements which cause no great changes in magnetic properties thereof.

Now, description will be made on effects of the first magnetic layer of each of the third and fourth embodiments of the invention.

Figures 27A, 27B:
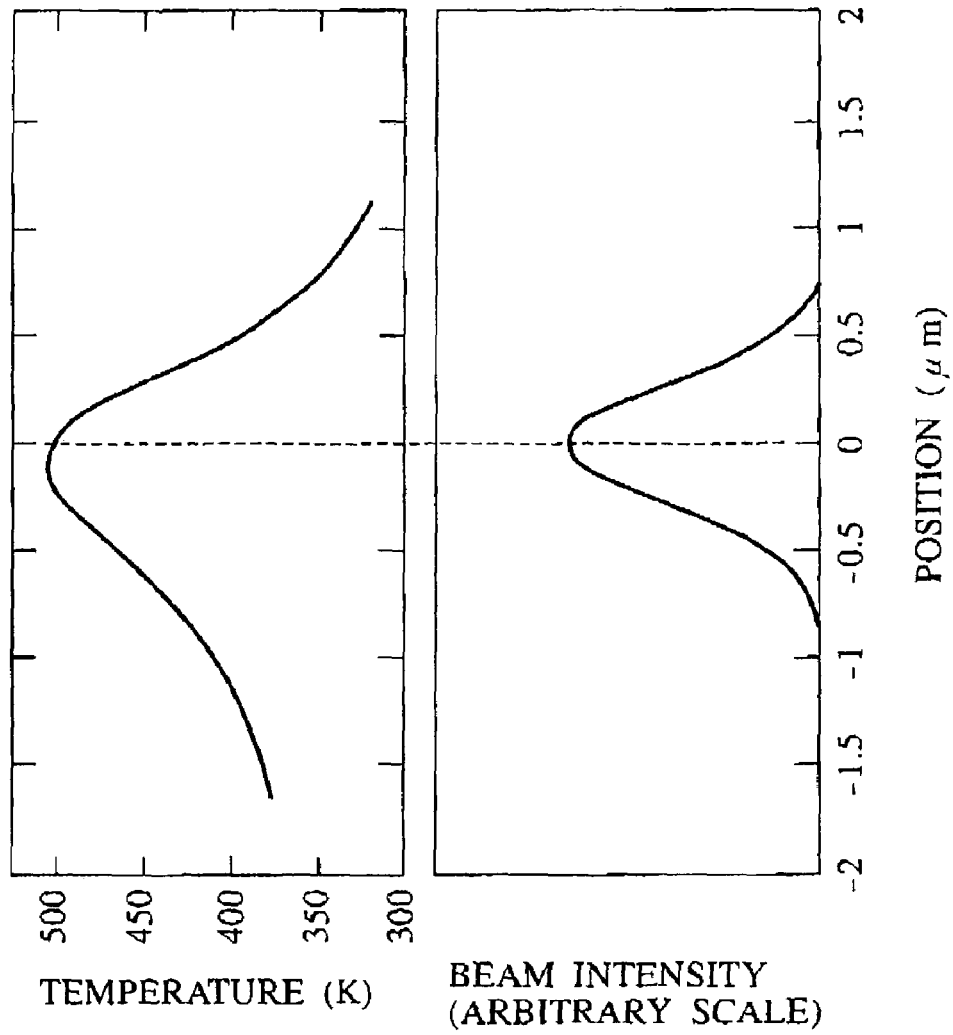
FIG. 27A is a view showing a track direction temperature distribution during reproducing by laser beam irradiation.
FIG. 27B is a view showing a beam intensity profile of a used laser beams.

FIG. 27A shows a temperature distribution when a laser beam is moved at a fixed linear velocity relative to a disk, i.e., by a laser beam intensity profile during reproducing.

FIG. 27B is a view showing a beam intensity profile of a used laser beams. The laser beam intensity becomes a Gaussian distribution as shown in FIG. 27B. As shown in FIGS. 27A and 27B, if a center position of a laser beam is 0, and a coordinate axis is taken in a track direction, a temperature distribution in the track direction during reproducing becomes similar to that shown in FIG. 27A. Here, in a position coordinate, a traveling direction of the laser beam is positive. A highest temperature reached point is positioned slightly rearward from the laser beam center. Magnetic domain wall displacement for enlarging and reproducing a magnetic domain occurs on a positive side of the abscissa, i.e., the front side of the traveling beam, which is referred to as "front process".

Figure 28:
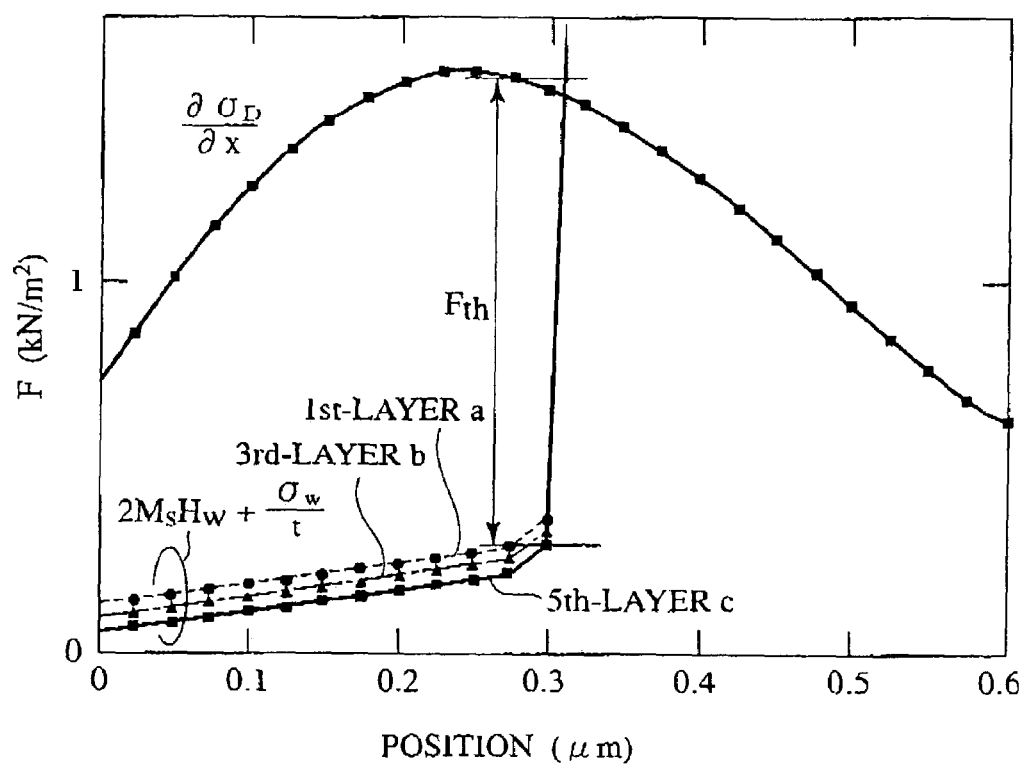
FIG. 28 is a plot of a magnetic domain wall driving force generated by a temperature gradient and a force blocking magnetic domain wall driving force the with respect to a position in the magneto-optical recording medium of each of the third and fourth embodiments of the invention.

Here, consideration is given to a magnetic domain wall driving force in the front process. FIG. 28 shows a plotting of a change of magnetic domain wall energy of a magnetic domain generated by a temperature gradient with respect to a position x in which a front process occurs, i.e., a magnetic domain wall driving force $\partial\sigma_D/\partial x$ and its blocking force $2M_B H_w + \sigma w/t$.

$$\frac{\partial \sigma_D}{\partial x} > 2M_s H_w + \frac{\sigma_w}{t} \quad (9)$$

When the above (9) is established, magnetic domain wall displacement starts. Here, $\sigma_D$ denotes magnetic domain wall energy of a magnetic domain of a recording mark, i.e., Bloch magnetic domain wall energy, x a position coordinate of a track direction, $M_s$ saturation magnetization of a displacement layer, $H_w$ a magnetic domain wall coercive force of the displacement layer, $\sigma_w$ interface magnetic domain wall energy by exchange coupling between the displacement layer and a recording layer, and t a film thickness of the displacement layer.

FIG. 28 shows a blocking force of magnetic domain wall displacement in each of the cases where the magnetic domain wall displacement layer (first magnetic layer 33, 43) is 1 layer (a in the drawing), and laminated structure of 3 (b in the drawing) and 5 (c in the drawing) layers. In the drawing, an abscissa indicates a position from a laser beam center when a laser beam traveling direction is positive. The magnetic domain wall displacement layer (first magnetic layer 33, 43) is set so that Curie temperature Tc33, 43 (z) of each layer can be gradually raised from the second magnetic layer 34 or 44 by ΔTc=10° C. to 50° C., e.g., by about 10° C. A temperature of saturation magnetization exhibits characteristics that together with an elevation of Curie temperature Tc33, 43 (z), a curve of temperature dependence is moved in parallel without any effect to its changing rate. To satisfy such characteristics, by adding nonmagnetic elements which have no effect on magnetic properties, a distribution of a thickness (z) direction of Curie temperature Tc43, 44 (z) must be controlled. For the magnetic domain wall displacement, it is only necessary to consider a threshold $F_{th}$ of the beginning of the magnetic domain wall displacement given by a difference between left and right sides of the equation (9). If this threshold $F_{th}$ is compared with another, from the results of FIGS. 27A and 27B, it can be understood that the multilayer structure of 3 or 5 layers of the magnetic domain wall displacement layer (first magnetic layer 33, 43) is effective for improving reproduced signal characteristics. It can be understood that by the multilayer formation of 3 or 5 layers, a force of blocking the magnetic domain wall movement is steeply reduced. That is, the multilayer formation of the magnetic domain wall displacement layer (first magnetic layer 33, 43) enables the magnetic domain wall displacement to be sharper. As a result, jitters in a reproduced signal can be reduced.

MODIFIED EXAMPLE 3

A magneto-optical recording medium of a modified example 3 of the third embodiment of the invention has a basic structure similar to that of the third embodiment. That is, similarly to that shown in FIG. 23, on a light transmissible substrate 31 made of glass plate, polycarbonate or the like (its bottom surface in FIG. 23), first, second and third magnetic layers 33, 34, and 35 are sequentially laminated through a transparent first dielectric layer 32 which becomes a protective film or a multiple interference film. Furthermore, on this third magnetic layer 35 (its bottom surface in FIG. 23), a protective film made of a second dielectric layer (or nonmagnetic metal film) 36 is formed and, on its bottom surface in FIG. 23, a protective layer 37 made of a UV cured resin or the like is formed. However, the modified example 3 is different from the third embodiment in that the first magnetic layer is made of one amorphous thin film layer of heavy rare earth (HRE) and transition metal (TM) where exchange energy is small between rare earth (RE) and transition metal (TM). The first magnetic layer 33 is a film having an easy magnetization direction in a vertical direction (direction vertical to a film surface) at room temperature, i.e., a so-called amorphous thin film which becomes a perpendicular magnetization film.

That is, the first magnetic layer 33 of the magneto-optical recording medium of the modified example 3 of the third embodiment of the invention is an amorphous thin film made of heavy rare earth and iron family metal, in which exchange energy between heavy rare earth and iron family metal is small. To facilitate magnetic domain wall displacement, preferably, the first magnetic layer 33 is a film of small magnetic anisotropy. Each of the second and third magnetic layers 34 and 35 is a film having an easy magnetization axis in a vertical direction (direction vertical to a film surface), i.e., a so-called amorphous thin film made of heavy rare earth and iron family metal which is a perpendicular magnetization film. Considering temperature states during recording and reproducing by a laser beam, preferably, Curie temperatures Tc33, Tc34 and Tc35 of the first, second and third magnetic layers 33, 34 and 35 satisfy the above-described equation (7).

For easy occurrence of magnetic domain wall displacement, the first magnetic layer 33 which becomes a magnetic domain wall displacement layer must be a film of small anisotropy and, a small coercive force. Accordingly, preferably, a material such as Cd—Fe—Co—Bi or Gd—Fe—Co—Sn with a base of a Gd—Fe film is used. On the other hand, the third magnetic layer 35 which becomes a memory layer for holding recording information must be a film having a coercive force sufficient for stable presence of a recording mark (magnetic domain) at room temperature, and Curie temperature Tc35 suitable for recording. Accordingly, preferably, a material with a base of a Tb—Fe—Co film or Dy—Fe—Co film is used. Moreover, preferably, Curie temperatures Tc33, Tc34 and Tc35 are adjusted by adding nonmagnetic elements which do not cause significant changes in magnetic properties thereof.

MODIFIED EXAMPLE 4

A magneto-optical recording medium of a modified example 4 of the fourth embodiment of the invention has a basic structure similar to that of the fourth embodiment. That is, similarly to that shown in FIG. 25, on a light transmissible substrate 41 made of glass plate, polycarbonate or the like (its bottom surface in FIG. 25), first, second, third and fourth magnetic layers 43, 44, 45 and 46 are sequentially laminated to form a 4-layer magnetization film through a transparent first dielectric layer 42 which becomes a protective film or a multiple interference film. Furthermore, on this fourth magnetic layer 46 (its bottom surface in FIG. 25), a protective film made of a second dielectric layer (or nonmagnetic metal film) 47 is formed and, on its bottom surface in FIG. 25, a protective layer 48 made of a UV cured resin or the like is formed. However, the modified example 4 is different from the fourth embodiment in that the first magnetic layer is made of one amorphous thin film layer of heavy rare earth (HRE) and transition metal (TM) where exchange energy is small between rare earth (RE) and transition metal (TM). The first magnetic layer 43 is a film having an easy magnetization direction in a vertical direction (direction vertical to a film surface) at room temperature, i.e., a so-called amorphous thin film which becomes a perpendicular magnetization film.

That is, the first magnetic layer 43 of the magneto-optical recording medium of the modified example 4 of the fourth embodiment of the invention is an amorphous thin film made of heavy rare earth and iron family metal, in which exchange energy between heavy rare earth and iron family metal is small. To facilitate magnetic domain wall displacement, preferably, the first magnetic layer 43 is a film of small magnetic anisotropy. Each of the second, third and fourth magnetic layers 44, 45 and 46 is a film having a magnetization easy axis in a vertical direction (direction vertical to a film surface), i.e., a so-called amorphous thin film made of heavy rare earth and iron family metal which is a perpendicular magnetization film. Considering temperature states during recording and reproducing by a laser beam, preferably, Curie temperatures Tc43, Tc44, Tc45 and Tc46 of the first, second, third and fourth magnetic layers 43, 44, 45, and 46 satisfy the above-described equation (8).

For an easy occurrence of magnetic domain wall displacement, the first magnetic layer 43 which becomes a magnetic domain wall displacement layer must be a film of small anisotropy and a small coercive force. Accordingly, preferably, a material such as Gd—Fe—Co—Bi or Gd—Fe—Co—Sn with a base of a Gd—Fe film is used. On the other hand, the fourth magnetic layer 46 which becomes a memory layer for holding recording information must be a film having a coercive force sufficient for stable presence of a recorded mark (magnetic domain) at room temperature, and Curie temperature Tc35 suitable for recording. Accordingly, preferably, a material with a base of a Tb—Fe—Co film or Dy—Fe—Co film is used. Moreover, preferably, Curie temperatures Tc43, Tc44, Tc45, and Tc46 are adjusted by adding nonmagnetic elements which cause no significant changes in magnetic properties thereof.

Here, description will be made of effects of the first magnetic layer of each of the third and fourth embodiments of the invention where the plurality of heavy rare earth and iron family metal amorphous thin films constituting the first magnetic layer is a laminated film of 3 to 5 layers different from one another in composition, and at least one layer thereof is a heavy rare earth (HRE) and transition metal (TM) amorphous thin film where exchange energy between rare earth (RE) and transition metal (TM) is small, and description will be made of effects of the first magnetic layer of each of the modified examples 3 and 4 of the third and fourth embodiments of the invention.

Figure 29:
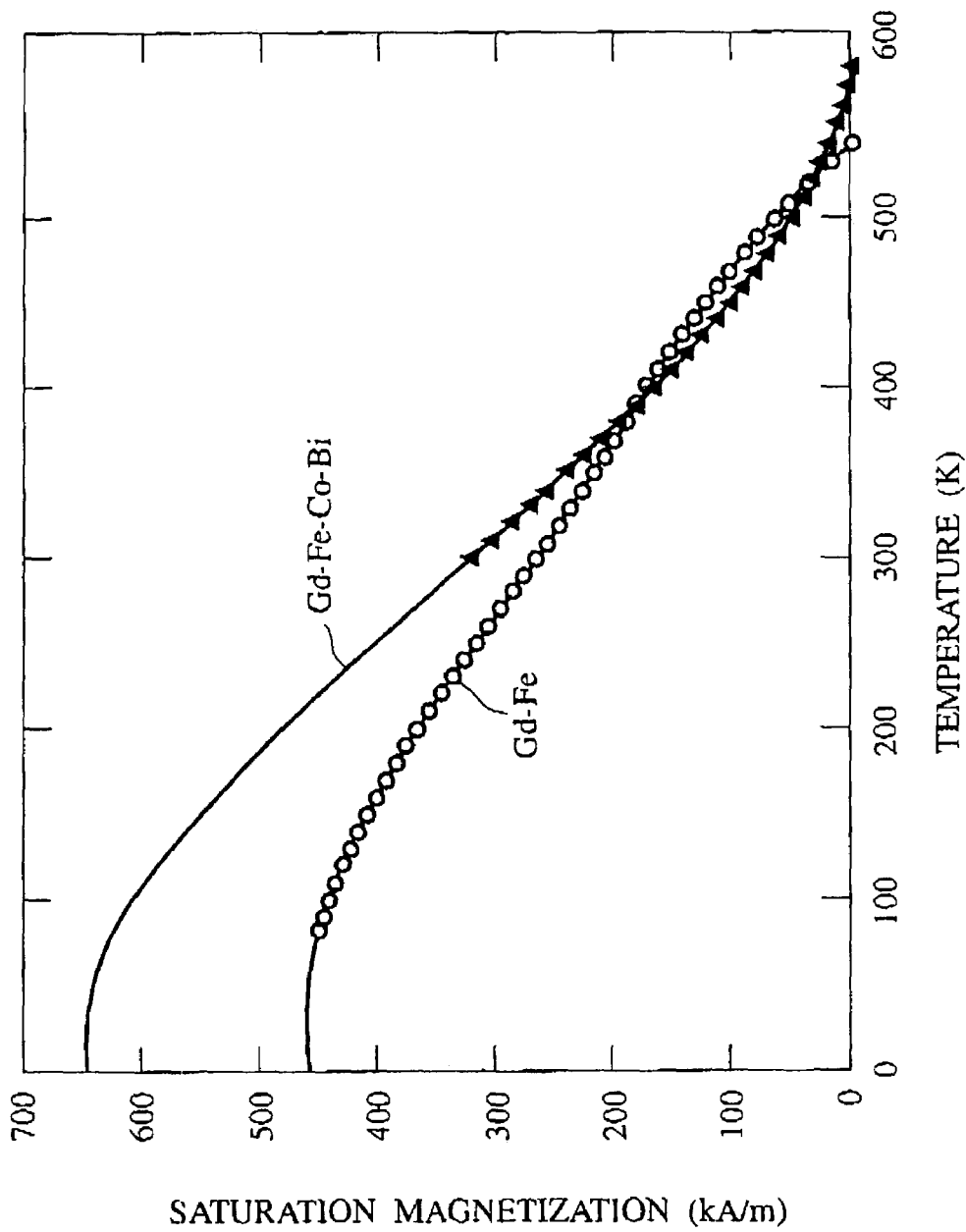
FIG. 29 is a view showing comparison of temperature characteristics of saturation magnetization of a Gd—Fe film with those of a Gd—Fe—Co—Bi film used as a material of a first magnetic layer in a case where in each of the third and fourth embodiments of the invention, a plurality of heavy rare earth-iron family metal amorphous thin films forming the first magnetic layer are formed as a laminated film of three to five layers different from one another in composition and at least one of the layers is made of a heavy rare earth (HRE)/transition metal (TM) amorphous thin film having small exchange energy between rare earth (RE) and transition metal (TM), and in the case of the magneto-optical recording medium of each of the modified examples 3 and 4 of the third and fourth embodiments of the invention.

FIG. 29 shows temperature characteristics of saturation magnetization $M_s$ of a Gd—Fe film and a Gd—Fe—Co—Bi film. An open circle mark denotes an actual measured value of saturation magnetization $M_s$ of the Gd—Fe film, and a closed triangle mark an actual measured value of saturation magnetization $M_s$ of the Gd—Fe—Co—Bi film. Solid lines respectively indicate calculated values of saturation magnetization $M_s$ of the Gd—Fe film and the Gd—Fe—Co—Bi film based on a molecular field theory. For both of the Gd—Fe film and the Gd—Fe—Co—Bi film, by adjusting a composition of Gd, a temperature change of the saturation magnetization can be made sharper. A temperature change of the saturation magnetization $M_s$ of the Gd—Fe film of FIG. 29 is in a case where the Gd composition is adjusted to cause a sharpest temperature change. From FIG. 29, it can be understood that in the Gd—Fe—Co—Bi film, the saturation magnetization $M_s$ is reduced more sharply than that of the Gd—Fe film whose Gd composition is changed to cause a sharpest temperature change. That is, from the temperature change of the saturation magnetization $M_s$ of the Gd—Fe film of FIG. 29, it can be understood that the temperature change of the saturation magnetization $M_s$ of the Gd—Fe film can be made sharper than that of the saturation magnetization $M_s$ of the Gd—Fe—Co—Bi film.

Figure 30:
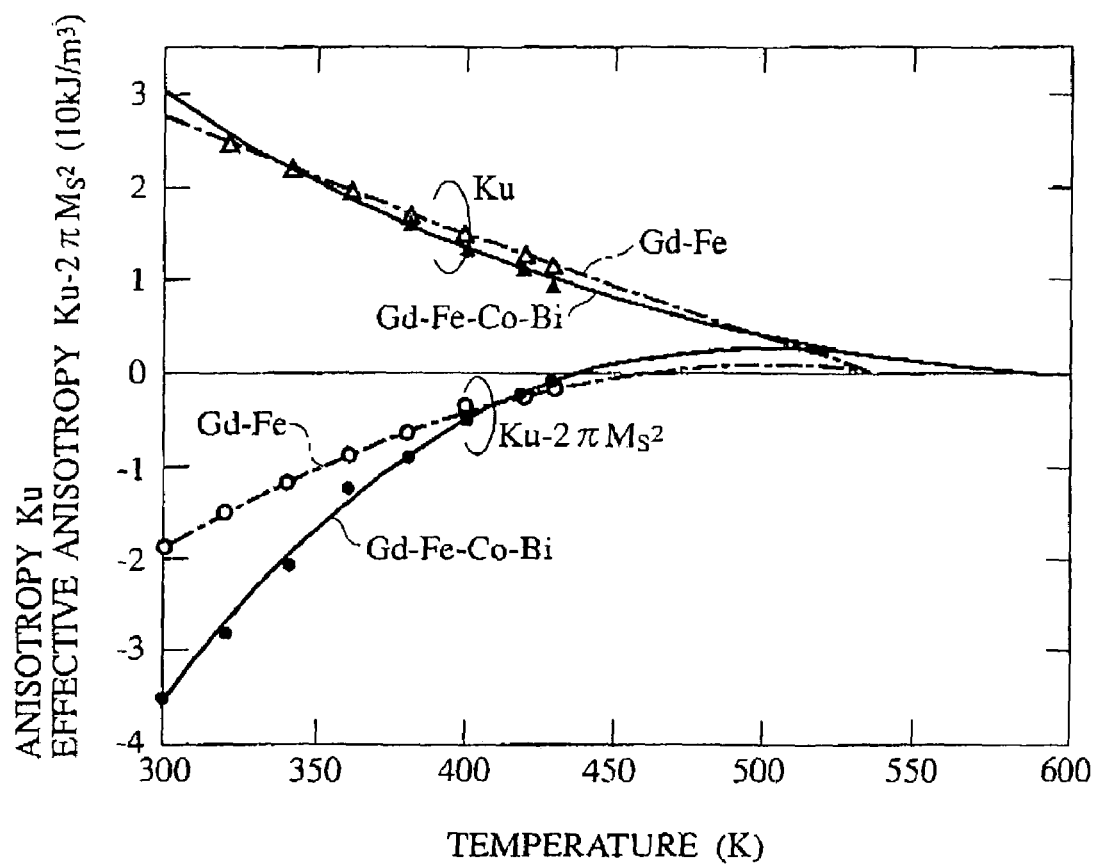
FIG. 30 is a view showing temperature changes of true anisotropy and effective anisotropy of each of the Gd—Fe film and the Gd—Fe—Co—Bi film.

FIG. 30 shows temperature changes of true anisotropy Ku and effective anisotropy $Ku-2\pi M_s^2$ of the Gd—Fe film and the Gd—Fe—Co—Bi film. The sharper the temperature change of the saturation magnetization $M_s$ of FIG. 29, the sharper the temperature change of demagnetizing field energy $2\pi M_s^2$. Accordingly, it can be understood that compared with the Gd—Fe film, the temperature change of effective anisotropy in the Gd—Fe—Co—Bi film is sharper. Control of this anisotropic temperature change solves the problems of the conventional art.

The above good results can be attributed to effects of Bi addition, that is, a reduction of an exchange integral between the rare earth (RE) and the transition metal (TM). The reduced exchange integral causes a reduction of exchange energy between the rare earth (RE) and the transition metal (TM), whereby magnetization is sharply reduced.

Generally, a magnitude of exchange energy between the rare earth (RE) and the transition metal (TM) is represented as follows, where $S_{RE}$ is a spin of rare earth (RE), $S_{Fe}$ a spin of iron (Fe), and $S_{Co}$ a spin of cobalt (Co).

$$J_{RE-Fe} \cdot S_{RE} \cdot S_{Fe} + J_{RE-Co} \cdot S_{RE} \cdot S_{Co} \quad (10)$$

Here, $J_{RE-Fe}$ is an exchange integral of the rare earth (RE) and Fe, and $J_{RE-Co}$ is an exchange integral of the rare earth (RE) and Co. When exchange energy is reduced between the rare earth (RE) and the transition metal (TM), sub-lattice magnetization of the rare earth (RE) supported by sub-lattice magnetization of the transition metal (TM) is weakened, whereby the sub-lattice magnetization of the rare earth (RE) is sharply reduced along with temperature. As a result, temperature change of the saturation magnetization $M_s$ may become sharper. The addition of Bi or Sn to the Gd—Fe film is equivalent to a reduction of $J_{RE-Fe}$ in the equation (10).

Thus, a result similar to that when the Gd—Fe—Co—Bi film is used occurs in the case of using a Gd—Fe—Co—Sn film.

The reduction of the exchange energy between the rare earth (RE) and the transition metal (TM) can solve the foregoing problems of the conventional art. From the equation (4), it can be understood that a reduction of the spin of Fe can also reduce the exchange energy. The reduction of the spin of Fe can be made by addition of Ni or replacement of Fe done by Co.

Figure 31A:
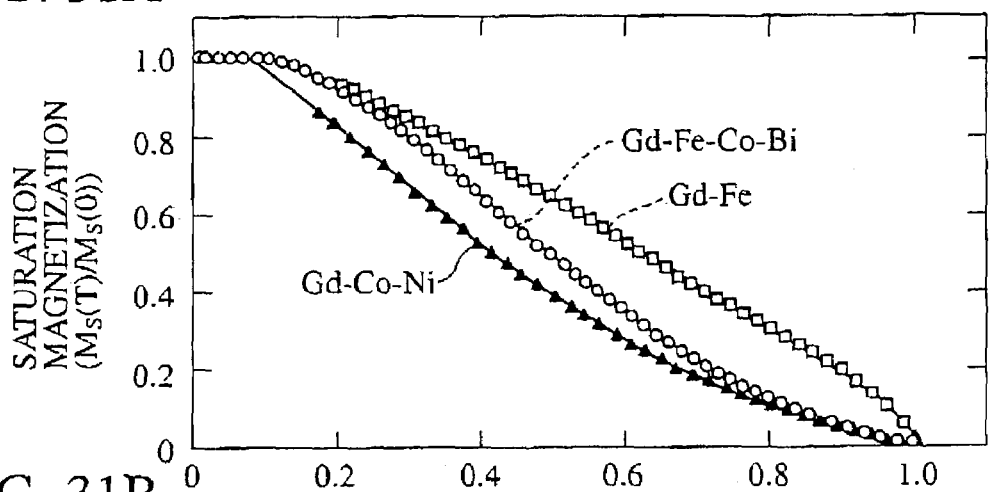
FIG. 31A is a graph showing comparison of temperature changes of saturation magnetization of three types of films with one another.
Figure 31B:
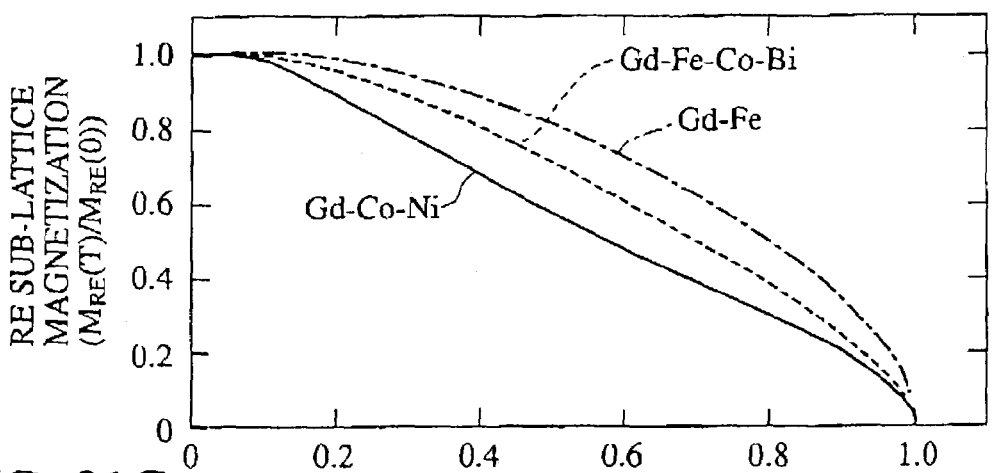
FIG. 31B is a graph showing comparison of temperature changes of rare earth (RE) sub-lattice magnetization of the three types of films with one another.
Figure 31C:
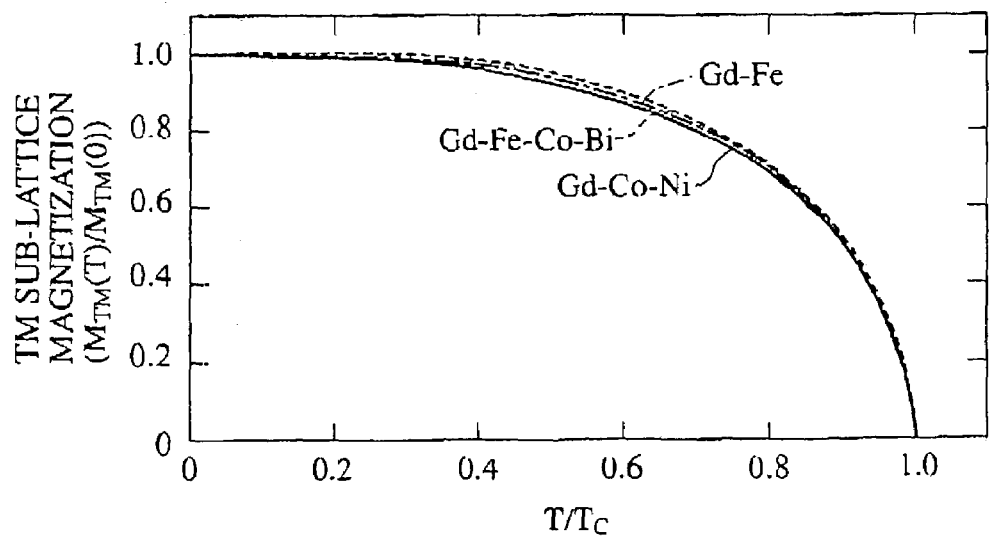
FIG. 31C is a graph showing comparison of temperature changes of transition metal (TM) sub-lattice magnetization of the tree types of films with one another.

FIGS. 31A to 31C show results which substantiate the above-described effects. In each of graphs of FIGS. 31A to 31C, in order to directly compare temperature changes of three types of films having differences in Curie temperatures Tc31, 41 and absolute values of saturation magnetization $M_s$, an ordinate and an abscissa are both normalized. A closed triangle mark indicates an actual measured value of saturation magnetization $M_s$ of a Gd—Co—Ni film, an open circle mark an actual measured value of saturation magnetization $M_s$ of a Gd—Fe—Co—Bi film, and a void square mark an actual measured value of saturation magnetization $M_s$ of a Gd—Fe film. A solid line indicates a calculated value. FIG. 31A is a graph showing comparison of temperature changes of saturation magnetizations. In order to show that a difference in temperature changes of the saturation magnetization $M_s$ is caused by a difference in temperature changes of the above-described sub-lattice magnetization, each of FIGS. 31B and 31C shows a comparison graph of temperature changes of rare earth (RE) sub-lattice magnetization and transition metal (TM) sub-lattice magnetization. It can be understood that in the temperature changes of the saturation magnetization $M_s$ of the three types of films, a difference in changes of the rare earth (RE) sub-lattice magnetization of the respective films causes a difference in reduction rates with respect to temperature increases. To solve the above-described problem, when taking into consideration that a sharp reduction of the saturation magnetization $M_s$ is desirable, Gd—Co—Ni film can be effective in problem solving when used to constitute the first magnetic layers 33 and 43.

Figure 32:
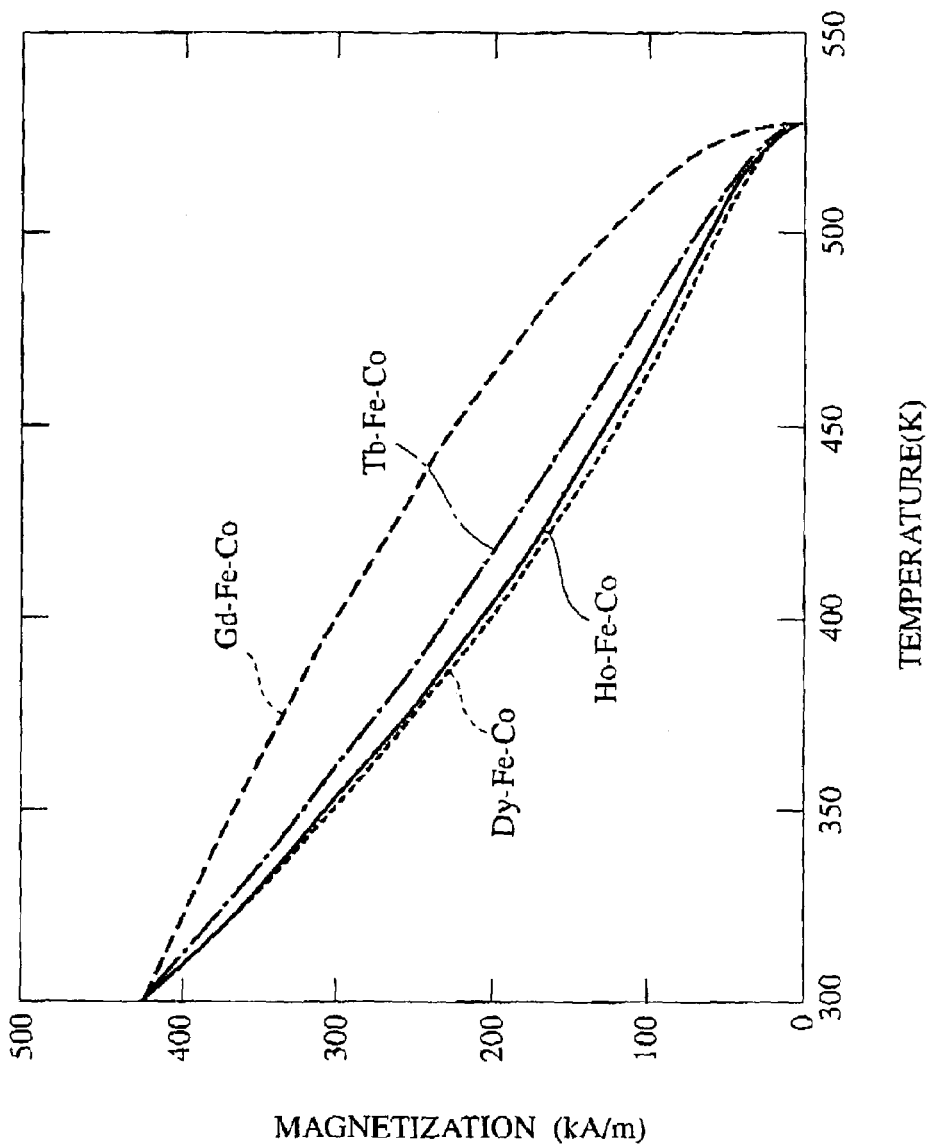
FIG. 32 is a view showing comparison of results of calculating temperature changes of saturation magnetization Ms based on a molecular field theory when Gd of the Gd—Fe—Co film is replaced by other heavy rare earth.

A spin of rare earth (RE) becomes smaller toward a larger atomic number. Accordingly, from the relation of the equation (4), replacement of Gd of the Gd—Fe—Co film by heavy rare earth of a larger atomic number may reduce a magnitude of exchange energy between the rare earth (RE) and the transition metal (TM) as well as in the cases of the reduction of the exchange integral between the rare earth (RE) and the transition metal (TM) and the spin reduction of Fe. Thus, a temperature change of the saturation magnetization $M_s$ by the replacement of Gd of the Gd—Fe—Co film by another heavy rare earth was calculated to be compared with another by a parameter of Hund rule based on the molecular field theory. A result thereof is shown in FIG. 32. It can be understood that saturation magnetization $M_s$ of each of the Tb—Fe—Co film, the Dy—Fe—Co film, and the Ho—Fe—Co film is sharply reduced with respect to a temperature increase compared with that of the Gd—Fe—Co film. However, since the Tb—Fe—Co film and the Dy—Fe—Co film are films of large magnetic anisotropy, use thereof are not desirable here. From the result shown, it can be understood that the addition of heavy rare earth to the first magnetic layer 33, 34 or the replacement, i.e., the addition of a super heavy rare earth element such as Ho, Er, Tm, Yb or Lu, or replacement, is effective for solving the above-described problem.

Figure 33:
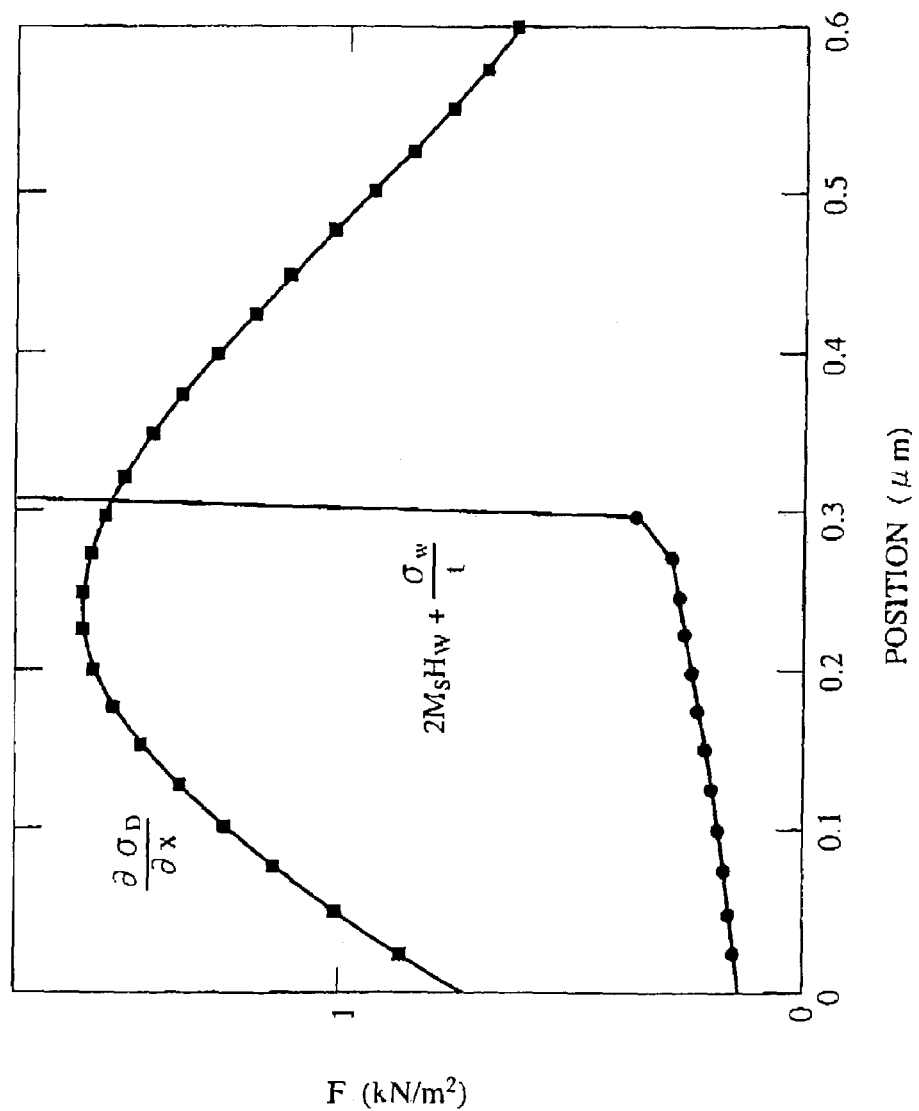
FIG. 33 is a plot of a magnetic domain wall driving force generated by a temperature gradient and a force blocking magnetic domain wall driving force with respect to a position when the Gd—Fe—Co film is used for the first magnetic layer.

FIG. 33 shows, with respect to a position in the Gd—Fe—Co film in which a front process occurs, as in the case shown in FIG. 28, plotting of a change of magnetic domain wall energy of a magnetic domain caused by a temperature gradient, i.e., a magnetic domain wall driving force $\partial\sigma_D/\partial x$, and its blocking force $2M_sH_w+\sigma_w/t$. If the equation (9) described above with reference to the third and fourth embodiments is satisfied, magnetic domain wall displacement begins.

Now, consideration is given to a case where the above-described magnetic disconnection is not present, i.e., a magnetic domain wall is present on a track boundary. When the magnetic domain wall is moved by dx because of a temperature gradient in an x direction, magnetic domain wall energy $\sigma_D$ is reduced by $d\sigma_D$. Since a sectional area of the magnetic domain wall is twif a track width (mark width) is w, a reduction of magnetic domain wall energy becomes $tw \cdot d\sigma_D$. On the other hand, energy is increased in the magnetic domain wall of the track boundary because of an increased area, and the increase of the magnetic domain wall energy is $2t\sigma_D dx$, Thus, if the following is established, $$tw \cdot d\sigma_D > 2t\sigma_D dx \qquad (11)$$

magnetic domain wall displacement occurs, and thus a condition for occurrence of magnetic domain wall displacement is as follows even when there is a magnetic domain wall on the track boundary, $$\partial\sigma_D/\partial x > 2\sigma_D/w \qquad (12)$$

Figure 34:
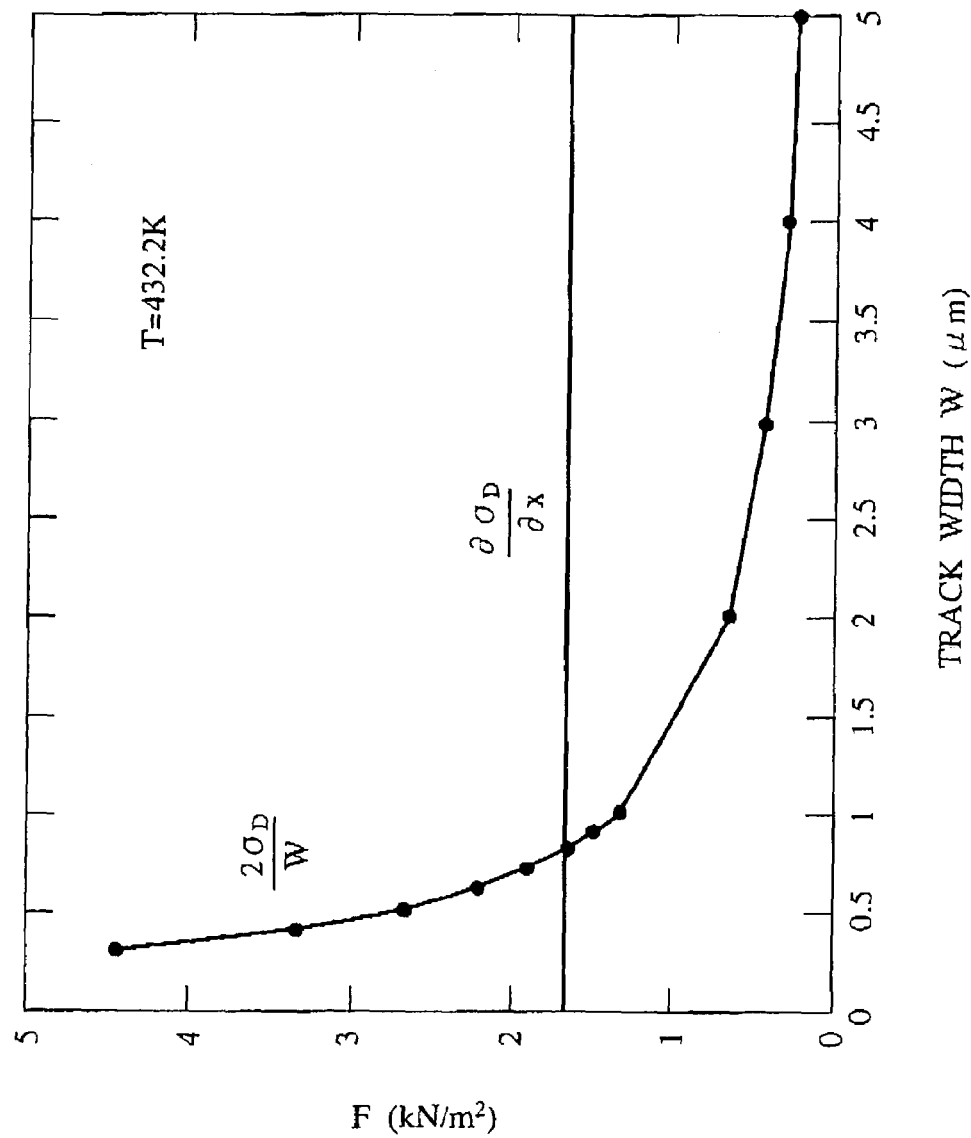
FIG. 34 is a view showing a size relation of items between right and left sides of an equation (12) described in the specification at a temperature (432.2° K.) of a start of magnetic domain wall movement by using a track width (mark width) w as a parameter when the Gd—Fe—Co film is used for the first magnetic layer.

FIG. 34 shows plotting of a magnitude relation of items between right and left sides of the equation (12) based on a parameter of the track width (mark width) w of the magneto-optical recording medium using the Gd—Fe—Co film.

In the drawing, an abscissa indicates a track width (mark width) w. FIG. 34 shows comparison of size relations between the left and right sides of the equation (12) at a temperature of a start of magnetic domain wall displacement of FIG. 33. In FIG. 34, a curve indicating the right side of the equation (12) and a straight line indicating the left side crosses each other at a track width w=0.9 µm. That is, it can be understood that in the case of the Gd—Fe—Co film, even if there is a magnetic domain wall on the track boundary, magnetic domain wall displacement occurs at the same temperature when the track width becomes to be equal to or more than 0.9 µm.

Figure 35:
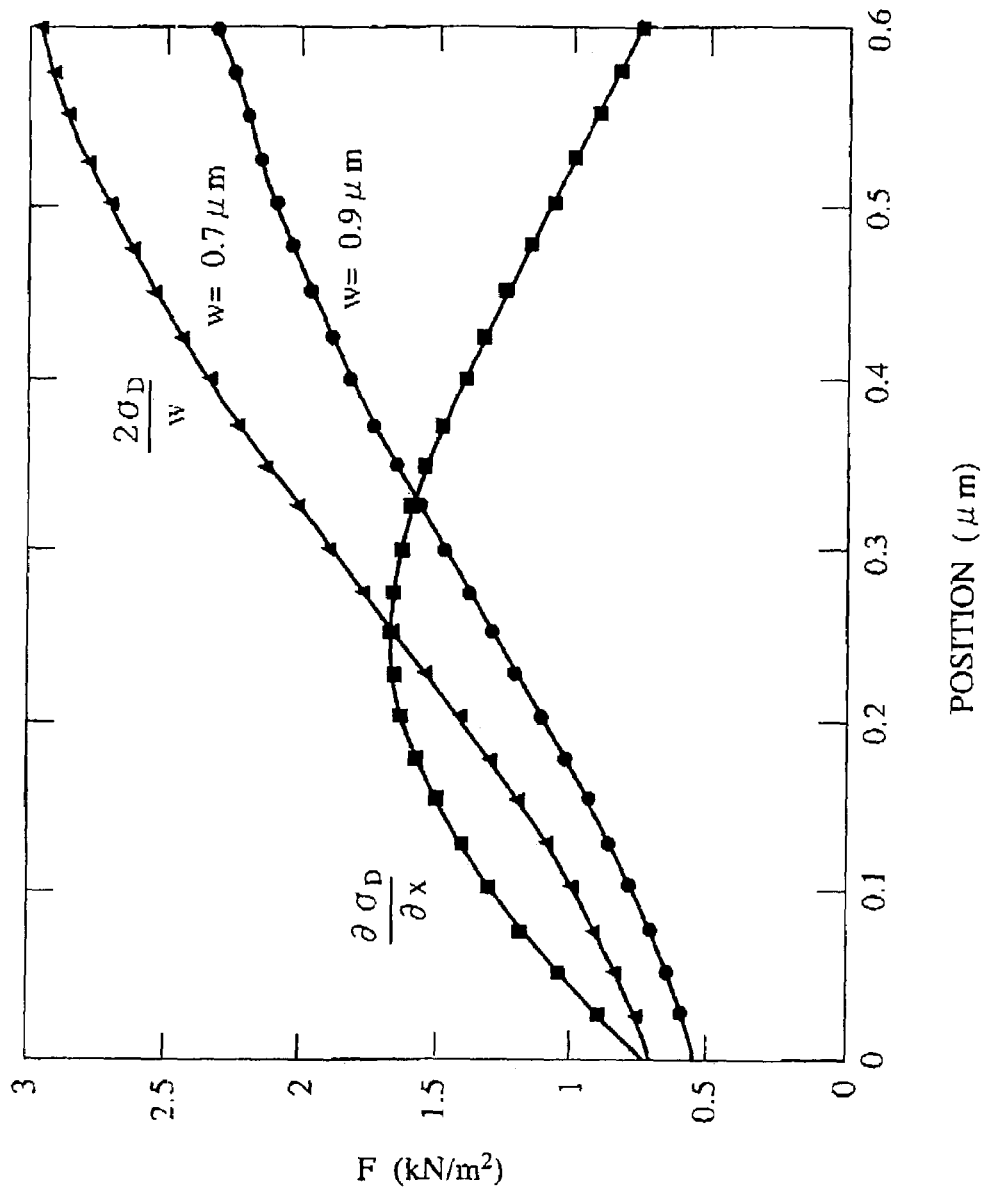
FIG. 35 is a view showing a size relation between the left and right sides of the equation (12) on a track direction position coordinate when track widths are 0.7 μm, and 0.9 μm when the Gd—Fe—Co film is used for the first magnetic layer.

Furthermore, FIG. 35 shows plotting of a size relation between the left and right sides of the equation (12) on a track direction position coordinate when track widths are 0.7 µm, and 0.9 µm in the case of the Gd—Fe—Co film. It can be understood that at the track width of 0.7 µm, compared with the case of FIG. 33, a magnetic domain wall displacement starting position is greatly shifted to a beam center side. This shifting of the magnetic domain wall displacement starting position deteriorates jitters in a reproduced signal and, in the case of the Gd—Fe—Co film, quality deterioration of the reproduced signal impedes achievement of a higher density.

Figure 36:
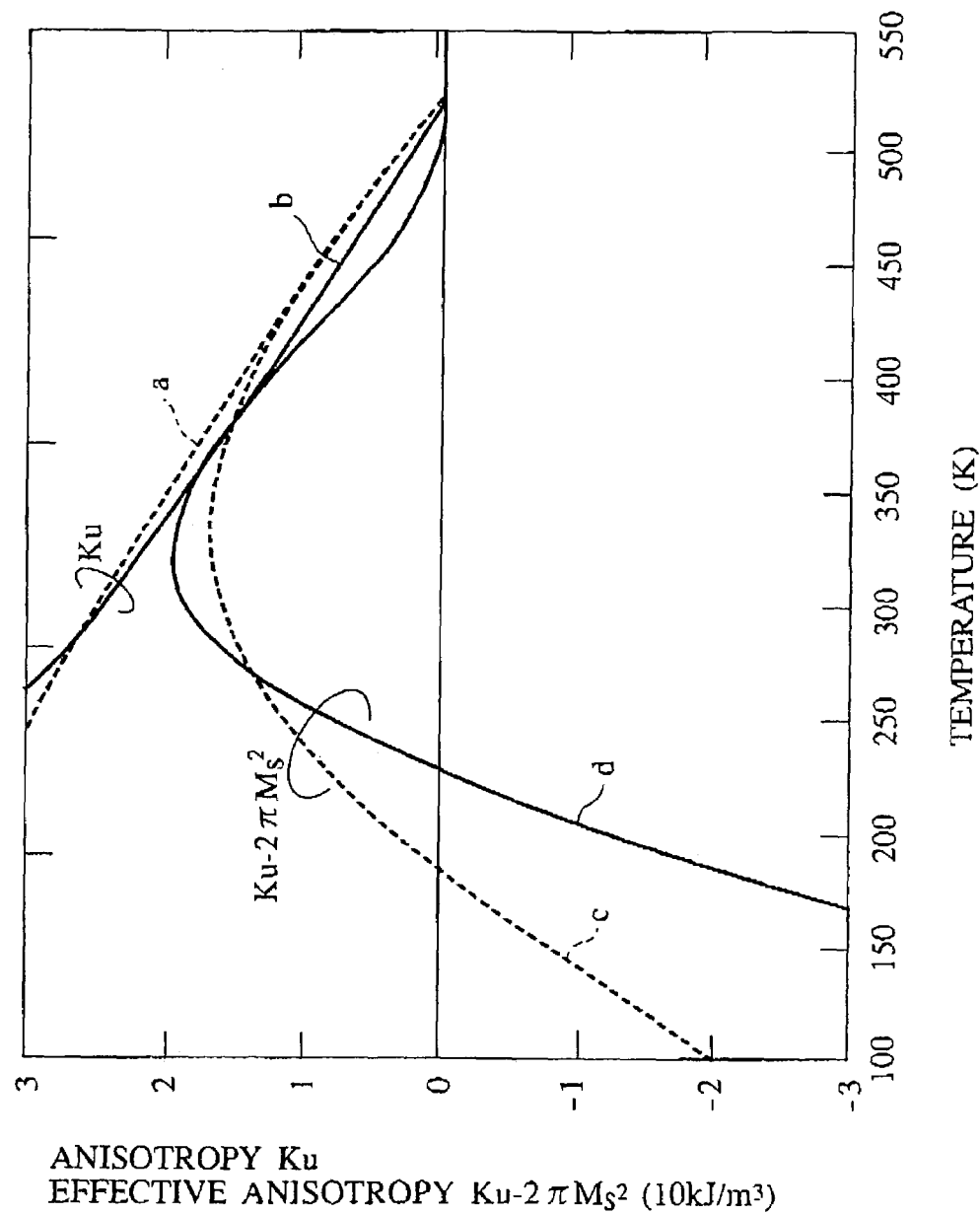
FIG. 36 is a view showing comparison of a temperature change of perpendicular magnetic anisotropy of the Gd—Fe film with that of the Gd—Fe—Co—Bi film used as the material of the first magnetic layer in a case where in each of the third and fourth embodiments of the invention, a plurality of heavy rare earth-iron family metal amorphous thin films forming the first magnetic layer are formed as a laminated film of three to five layers different from one another in composition and at least one of the layers is made of a heavy rare earth (HRE)/transition metal (TM) amorphous thin film having small exchange energy between rare earth (RE) and transition metal (TM), and in the case of the magneto-optical recording medium of each of the modified examples 3 and 4 of the third and fourth embodiments.

In order to solve the above-described problem, in each of the third and fourth embodiments of the invention, a plurality of heavy rare earth/iron family amorphous thin films forming the first magnetic layer are made of 3 to 5 laminated films different from one another in composition, and at least one of its layers is made of a heavy rare earth (HRE)/transition metal (TM) amorphous thin film having small exchange energy between rare earth (RE) and transition metal (TM), and in the modified examples 3 and 4 of the third and fourth embodiments of the invention, magnetic properties of the magnetic domain wall displacement layer (first magnetic layer 33, 43) are adjusted by using a Gd—Fe—Co—Bi film. Here, as an example, Bi is added to the Gd—Fe—Co film by 10 at. %. FIG. 36 shows comparison of a temperature change of perpendicular magnetic anisotropy of the Gd—Fe—Co—Bi film with that of the Gd—Fe—Co film. That is, dotted lines indicate a temperature change of perpendicular magnetic anisotropy of the magnetic domain wall displacement layer (first magnetic layer 33, 43) of the Gd—Fe—Co film shown in FIGS. 33, 34 and 35. On the other hand, a solid line indicates a temperature change of perpendicular magnetic anisotropy of the magnetic domain wall displacement layer (first magnetic layer 33, 43) of the magnetic domain well displacement layer (first magnetic layer 33, 43) in which exchange energy is reduced between the rare earth (RE) and the transition metal (TM). In the drawing, reference codes a and b denote true anisotropy Ku, and σ and d effective anisotropy $Ku-2\pi M_s^2$. It can be understood that the temperature change of the anisotropy of the Gd—Fe—Co—Bi film indicated by the solid line is sharper compared with that of the anisotropy of the Gd—Fe—Co film indicated by the dotted line.

Figure 37:
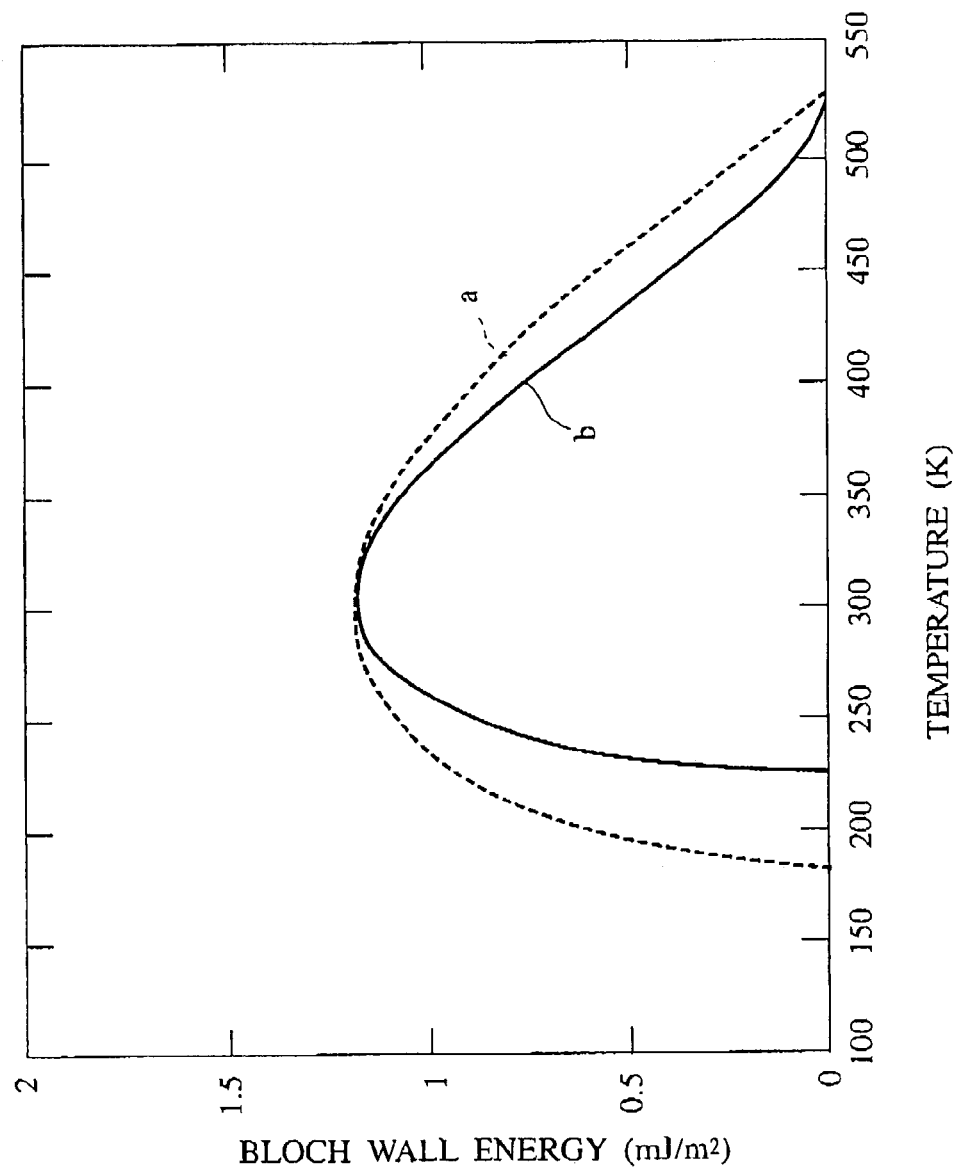
FIG. 37 is a view showing comparison of a temperature change of Bloch magnetic domain wall energy of the Gd—Fe film with that of a Gd—Fe—Co—Bi film used as the material of the first magnetic layer in a case where in each of the third and fourth embodiments of the invention, a plurality of heavy rare earth-iron family metal amorphous thin films forming the first magnetic layer are formed as a laminated film of three to five layers different from one another in composition and at least one of the layers is made of a heavy rare earth (HRE)/transition metal (TM) amorphous thin film having small exchange energy between rare earth (RE) and transition metal (TM), and in the case of the magneto-optical recording medium of each of the modified examples 3 and 4 of the third and fourth embodiments.

The sharp anisotropic temperature change in the temperature area of 350K or higher where the magnetic domain wall movement is started brings about a sharp change in Bloch magnetic domain wall energy shown in FIG. 37. In FIG. 37, a dotted line a corresponds to the GD—Fe—Co film of each of FIGS. 33, 34 and 35, and a solid line b to the Gd—Fe—Co—Bi film of FIG. 36. A sharp reduction of Bloch magnetic domain wall energy increases the left side of the equation (9), i e., a magnetic domain wall driving force. Thus, irrespective of presence/non-presence of a magnetic domain wall on a track boundary, characteristics of magnetic domain enlargement and reproducing by magnetic domain wall displacement are greatly improved.

Figure 38:
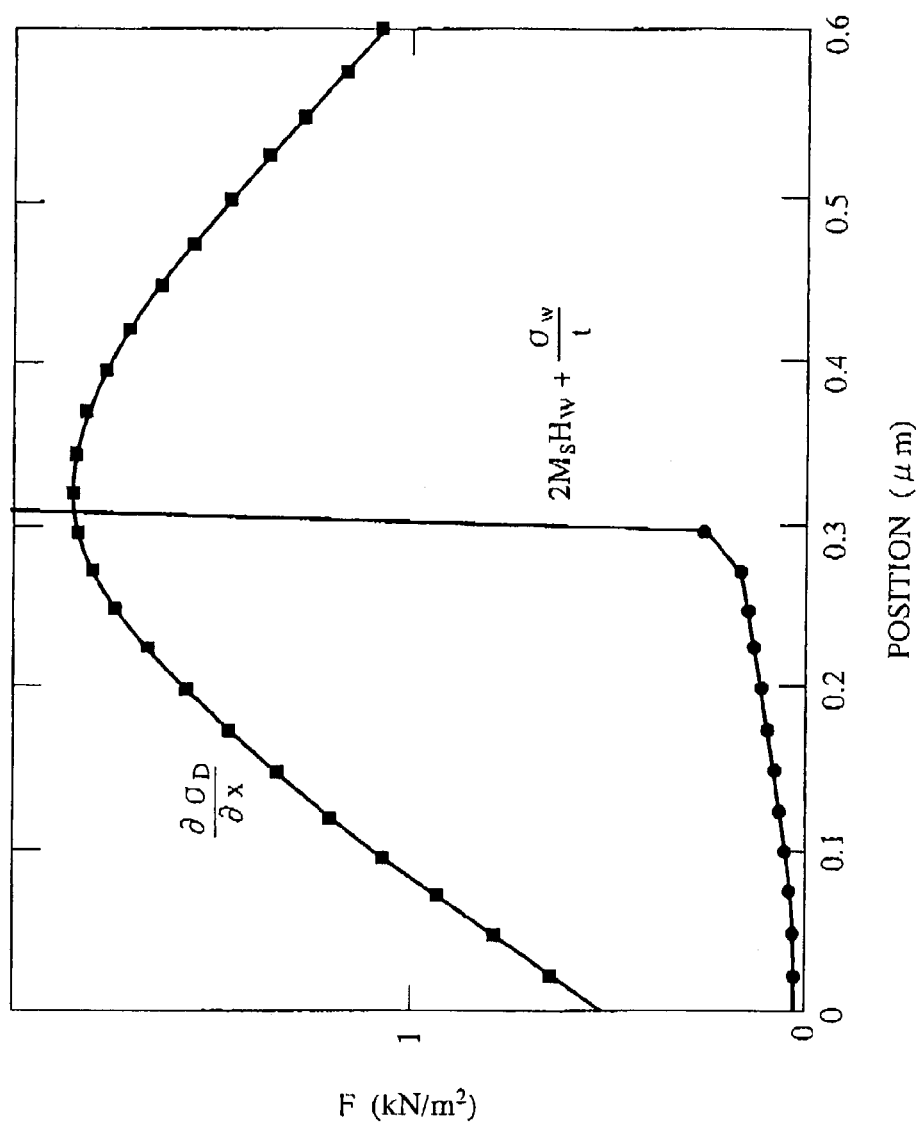
FIG. 38 is a plot of a magnetic domain wall driving force generated by a temperature gradient and a force blocking the magnetic domain wall driving force with respect to a position in the case of using, as a magnetic domain wall displacement layer (first magnetic layer), the Gd—Fe—Co—Bi film used in a case where in each of the third and fourth embodiments of the invention, a plurality of heavy rare earth-iron family metal amorphous thin films forming the first magnetic layer are formed as a laminated film of three to five layers different from one another in composition and at least one of the layers is made of a heavy rare earth (HRE)/transition metal (TM) amorphous thin film having small exchange energy between rare earth (RE) and transition metal (TM), and in the case of the magneto-optical recording medium of each of the modified examples 3 and 4 of the third and fourth embodiments.

FIG. 38 shows a magnetic domain wall driving force and its blocking force corresponding to those of FIG. 33. That is, a magnetic domain wall driving force of the magnetic domain wall displacement layer (first magnetic layer 33, 43) using a Gd—Fe—Co—Bi film and its blocking force are plotted with respect to a position. As shown in FIG. 38, it can be understood that the use of the Gd—Fe—Co—Bi film brings a position of starting magnetic domain wall displacement close to the edge side of a beam spot, and a force $2M_sH_w+\sigma_w/t$ for blocking the magnetic domain wall displacement is sharply reduced. Accordingly, by using the Gd—Fe—Co—Bi film, jitters in a reproduced signal are reduced to enable high-density recording/reproducing.

Figure 39:
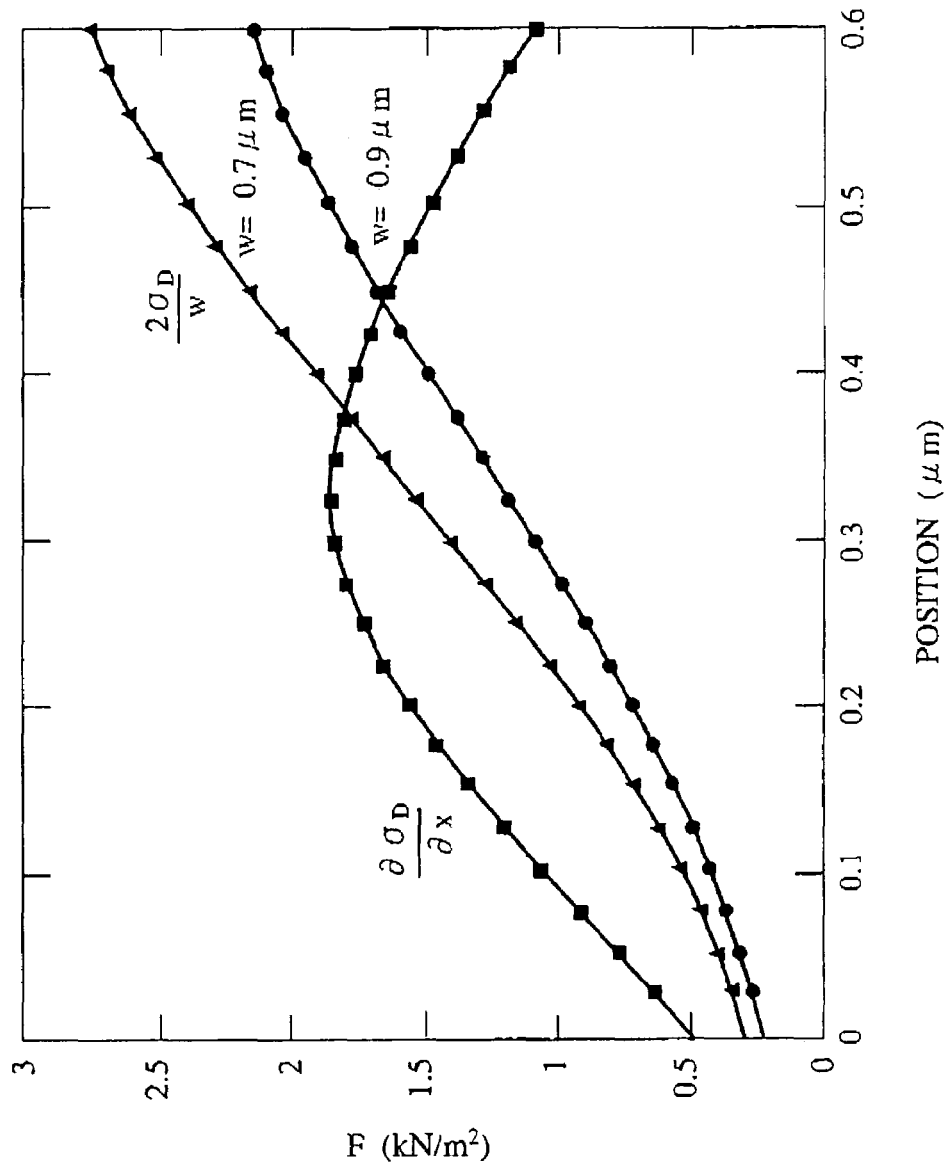
FIG. 39 is a view showing a size relation between the left and right sides of the equation (12) of track widths of 0.7 μm and 0.9 μm with respect to position coordinates in a track direction, in the case of using, as a magnetic domain wall displacement layer (first magnetic layer), the Gd—Fe—Co—Bi film used in a case where in each of the third and fourth embodiments of the invention, a plurality of heavy rare earth-iron family metal amorphous thin films forming the first magnetic layer are formed as a laminated film of three to five layers different from one another in composition and at least one of the layers is made of a heavy rare earth (HRE)/transition metal (TM) amorphous thin film having small exchange energy between rare earth (RE) and transition metal (TM), and in the case of the magneto-optical recording medium of each of the modified examples 3 and 4 of the third and fourth embodiments.

From FIG. 39, it can be understood that because of the use of the Gd—Fe—Co—Bi film, the magnetic domain wall displacement is started earlier even at a track width of 0.7 μm. Thus, even if magnetic disconnection by a method other than annealing is incomplete, the magnetic domain wall displacement is smoothly realized to increase a track density, whereby high-density recording can be realized.

As described above, as in the case of Bi, addition of Sn to the Gd—Fe—Co film can also improve characteristics of the magnetic domain wall displacement layer (first magnetic layer 33, 43). That is, effects similar to those of the case of using the Gd—Fe—Co—Bi film can be obtained by using a Gd—Fe—Co—Sn film. Furthermore, a spin of Fe may be reduced by adding Ni or replacing Fe by Co. Thus, a Gd—Co—Ni film may also be used. Moreover, replacement of Gd of the Gd—Fe—Co film by heavy rare earth of a larger atomic number is effective for improvement.

As apparent from the foregoing, according to the third and fourth embodiments and the modified examples 3 and 4 thereof, it is possible to provide a high-performance magneto-optical recording medium which enables high-density recording by reducing jitters in a reproduced signal, and improving quality of the reproduced signal. Furthermore, it is possible to provide a high-performance magneto-optical recording medium which facilitates an increase of mass productivity, and enables high-density recording by increasing a track density.

It should be understood that many modifications and adaptations of the invention will become apparent to those skilled in the art and it is intended to encompass such obvious modifications and changes in the scope of the claims appended hereto.

What is claimed is:

1. A magneto-optical recording medium having multiple magnetic layers comprising:
   a first magnetic layer;
   a second magnetic layer; and
   a third magnetic layer,
   the first to third magnetic layers being sequentially formed from a side irradiated with a laser beam, during recording, an information signal being recorded in a form of a magnetic domain in the third magnetic layer having an easy magnetization axis in a vertical direction by an external magnetic field while the laser beam irradiation is executed, then the magnetic domain being exchanged through the second magnetic layer with the first magnetic layer and, during reproducing, magnetization of the second magnetic layer being lost by a temperature raised by the laser beam irradiation, and magnetic domain wall displacement being generated to enlarge the magnetic domain formed by the exchange coupling in the first magnetic layer,
   wherein the first magnetic layer is formed by using a material with a base of a Gd—Fe film or a Gd—Fe—Co film in order to set a normalized magnetic field obtained by normalizing a magnetic domain wall driving field based on saturation magnetization higher than 1, an element concentration ratio (at. % ratio) of Gd to one of Fe and Fe—Co is set in a range of $28.0 \leq Gd \leq 29.0$, the second magnetic layer is formed by using a material with a base of a Tb—Fe film or a Dy—Fe film, and adding at least one of Co, Al and Cr, the third magnetic layer is formed by using a material with a base of one of a Tb—Fe—Co film and a Dy—Fe—Co film, an element concentration ratio (at. % ratio) of one of Tb and Dy to Fe—Co is set in a range of one of $23.5 \leq Tb \leq 25.5$ and $25.5 \leq Dy \leq 28.5$, and addition amounts of Co and a nonmagnetic element to each magnetic layer are adjusted to set Curie temperatures Tc11, Tc12, and Tc13 of the first, second and third magnetic layers to $Tc13 \leq Tc11 \leq Tc12$.

2. A magneto-optical recording medium having multiple magnetic layers comprising:
   a first magnetic layer;
   a second magnetic layer;
   a third magnetic layer; and
   a fourth magnetic layer,
   the first to fourth magnetic layers being sequentially formed from a side irradiated with a laser beam, during recording, an information signal being recorded in a form of a magnetic domain in the fourth magnetic layer having an easy magnetization axis in a vertical direction by an external magnetic field while the laser beam irradiation is executed, then the magnetic domain being exchanged through the second and third magnetic layers with the first magnetic layer and, during reproducing, magnetization of the third magnetic layer being lost by a temperature raised by the laser beam irradiation, and magnetic domain wall displacement being generated to enlarge the magnetic domain formed by the exchange coupling in the first magnetic layer, wherein the first magnetic layer is formed by using a material with a base of one of a Gd—Fe film and a Gd—Fe—Co film in order to set a normalized magnetic field obtained by normalizing a magnetic domain wall driving field based on saturation magnetization higher than 1, an element concentration ratio (at. % ratio) of Gd to one of Fe and Fe—Co is set in a range of $28.0 \leq Gd \leq 29.0$, each of the second and third magnetic layers is formed by using a material with a base of one of a Tb—Fe film and a Dy—Fe film, and adding at least one of Co, Al and Cr, the fourth magnetic layer is formed by using a material with a base of one of a Tb—Fe—Co film and a Dy—Fe—Co film, an element concentration ratio (at. % ratio) of one of Tb and Dy to Fe—Co is set in a range of one of $23.5 \leq Tb \leq 25.5$ and $25.5 \leq Dy \leq 28.5$, and addition amounts of Co and a nonmagnetic element to each magnetic layer are adjusted to set Curie temperatures $Tc21$, $Tc22$, $Tc23$ and $Tc24$ of the first, second, third and fourth magnetic layers to $Tc24 > Tc21 > Tc22 > Tc23$.

3. A magneto-optical recording medium having multiple magnetic layers comprising:

a first magnetic layer;

a second magnetic layer; and a third magnetic layer, the first to third magnetic layers being sequentially formed from a side irradiated with a laser beam, during recording, an information signal being recorded in a form of a magnetic domain in the third magnetic layer having an easy magnetization axis in a vertical direction by an external magnetic field while the laser beam irradiation is executed, then the magnetic domain being exchanged through the second magnetic layer with the first magnetic layer and, during reproducing, magnetization of the second magnetic layer being lost by a temperature raised by the laser beam irradiation, and magnetic domain wall displacement being generated to enlarge the magnetic domain formed by the exchange coupling in the first magnetic layer, wherein the first magnetic layer is formed by using a material with a base of one of a Gd—Fe film and a Gd—Fe—Co film in order to set a normalized magnetic field obtained by normalizing a magnetic domain wall driving field based on saturation magnetization higher than 1, an element concentration ratio (at. % ratio) of Gd to one of Fe and Fe—Co is set in a range of $28.0 \leq Gd \leq 29.0$, the second magnetic layer is formed by using a material with a base of one of a Tb—Fe film and a Dy—Fe film, and adding at least one of Co, Al and Cr, the third magnetic layer is made of two films, a Tb—Fe—Co film and a Gd—Fe—Co film, and anti-parallel coupling is maintained which becomes stable when directions of magnetizations of the two films are opposite to each other in a temperature area in which reproducing is executed by magnetic domain wall displacement in the first magnetic layer.

4. A magneto-optical recording medium having multiple magnetic layers comprising:

a first magnetic layer;

a second magnetic layer;

a third magnetic layer; and a fourth magnetic layer, the first to fourth magnetic layers being sequentially formed from a side irradiated with a laser beam, during recording, an information signal being recorded in a form of a magnetic domain in the fourth magnetic layer having an easy magnetization axis in a vertical direction by an external magnetic field while the laser beam irradiation is executed, then the magnetic domain being exchanged through the second and third magnetic layers with the first magnetic layer and, during reproducing, magnetization of the third magnetic layer being lost by a temperature raised by the laser beam irradiation, and magnetic domain wall displacement being generated to enlarge the magnetic domain formed by the exchange coupling in the first magnetic layer, wherein the first magnetic layer is formed by using a material with a base of one of a Gd—Fe film and a Gd—Fe—Co film in order to set a normalized magnetic field obtained by normalizing a magnetic domain wall driving field based on saturation magnetization higher than 1, an element concentration ratio (at. % ratio) of Gd to one of Fe and Fe—Co is set in a range of $28.0 \leq Gd \leq 29.0$, each of the second and third magnetic layers is formed by using a material with a base of one of a Tb—Fe film and a Dy—Fe film, and adding at least one of Co, Al and Cr, the fourth magnetic layer is made of two films, a Tb—Fe—Co film and a Gd—Fe—Co film, and anti-parallel coupling is maintained which becomes stable when directions of magnetizations of the two films are opposite to each other in a temperature area in which reproducing is executed by magnetic domain wall displacement in the first layer.

* * * * *